(12) United States Patent  
Constantinidis et al.

(10) Patent No.: US 8,050,313 B2  
(45) Date of Patent: Nov. 1, 2011

(54) SINGLE CHIP LOW POWER FULLY INTEGRATED 802.15.4 RADIO PLATFORM

(75) Inventors: Nicolas Constantinidis, Cresserons (FR); Guillaume Crinon, Douvres-la-Deliverande (FR); Alexandre Rouxel, Mathieu (FR); Alan Westwick, Austin, TX (US); Gary Franzosa, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 974 days.

(21) Appl. No.: 11/968,113

(22) Filed: Dec. 31, 2007

(65) Prior Publication Data

US 2009/0168848 A1 Jul. 2, 2009

(51) Int. Cl.
*H04B 1/38* (2006.01)
*H04B 1/16* (2006.01)

(52) U.S. Cl. ..................................... 375/219; 455/343.5

(58) Field of Classification Search .................. 375/130, 375/140, 146, 147, 219, 222, 295, 316, 279–281, 375/308, 329, 332; 329/304; 332/103; 455/343.1, 455/343.2, 343.3, 343.4, 343.5; 370/311; 340/7.32, 7.33

See application file for complete search history.

(56) References Cited

U.S. PATENT DOCUMENTS

| 6,128,307 | A | * | 10/2000 | Brown | 370/412 |
| 2003/0198200 | A1 | * | 10/2003 | Diener et al. | 370/329 |
| 2007/0195808 | A1 | * | 8/2007 | Ehrlich et al. | 370/408 |
| 2008/0164975 | A1 | * | 7/2008 | Butler et al. | 340/10.1 |

* cited by examiner

*Primary Examiner* — Tesfaldet Bocure
(74) *Attorney, Agent, or Firm* — Trop, Pruner & Hu, P.C.

(57) ABSTRACT

A single chip radio platform is disclosed for communicating with an RF channel. An RF front end is provided having a receive/transmit capability to receive an RF carrier modulated with digital data and convert the data to analog baseband data, and modulate an RF carrier with baseband data. A digital signal processor (DSP) engine is provided for interfacing with the RF front end to form in conjunction therewith the PHY layer, and interfacing with the MAC layer to demodulate the baseband data and in the transmit mode to generate the baseband data for modulation and transmission by the RF front end. A microcontroller unit (MCU) is provided for performing the functionality of the MAC, network and application layers and interfacing with the DSP. Clock circuitry is provided including a stable reference clock for generating a first fixed clock for providing MCU clocks for the operation of the MCU, and for providing a reference for a local oscillator at substantially the channel frequency for use by the RF front end and a DSP clock for use by the DSP, both the MCU clocks, the local oscillator and the DSP clock having the stability of the first fixed clock. Periodic power management circuitry is provided for controlling the operation of the radio platform to operate in a sleep.

10 Claims, 43 Drawing Sheets

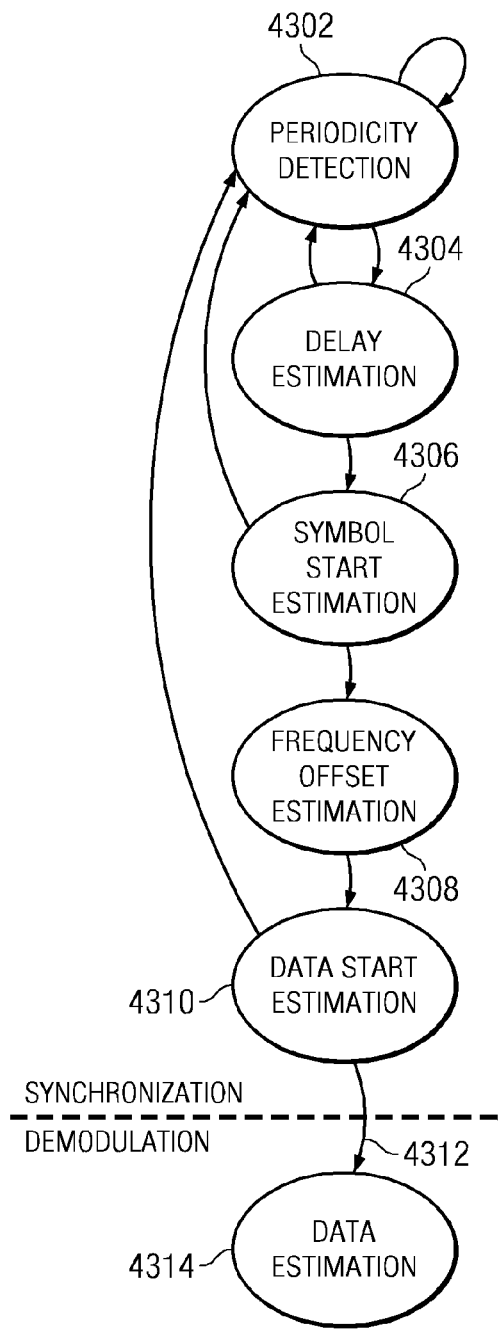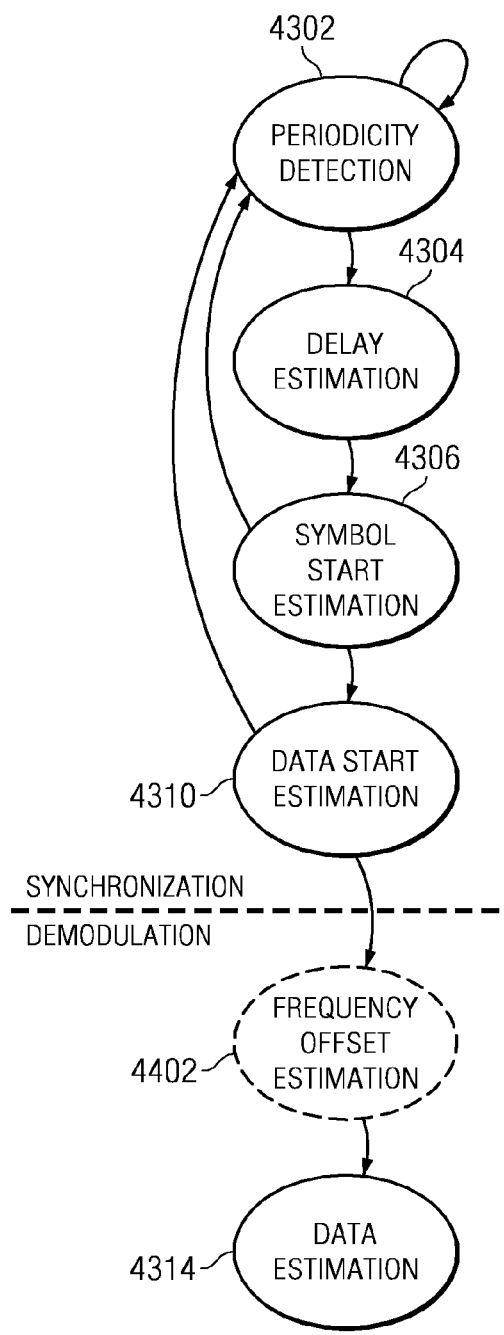
FIG. 43
FIG. 44

SINGLE CHIP LOW POWER FULLY INTEGRATED 802.15.4 RADIO PLATFORM

CROSS-REFERENCE TO RELATED APPLICATIONS

The present invention is related to U.S. patent application Ser. No. 11/968,105, filed Dec. 31, 2007, entitled "HARDWARE SYNCHRONIZER FOR 802.15.4 RADIO TO MINIMIZE PROCESSING POWER CONSUMPTION," which is incorporated herein by reference.

TECHNICAL FIELD

The present invention pertains in general to low power radio platforms and, more particularly, to a single chip radio platform based on the IEEE 802.15.4 communication standard with embedded applications.

BACKGROUND

Embedded control and monitoring functionalities have found their way into most electronic devices and the associated applications. However, this creates significant data flow that must somehow be connected to a central data gathering site. Thus, the need for connectivity of these various applications has given an explosive rise to connectivity solutions. In the early days of network connectivity, the network mesh utilized a wired connection, since these allow power and the reliable transmission of signals from a controller to its peripherals. However, in certain situations, it is difficult to physically dispose a peripheral in the controller and the wiring issues become more complex. To this end, wireless technology has seen a rise as the obvious solution although it has its own set of challenges, i.e., propagation, interference, security, regulations, and others.

One of the first solutions to the wireless issue was the rise of the IEEE Std. 802.11 Wireless Local Area Networks (WLAN). However, these WLANs are designed for high-end data networking. Among the system requirements of a WLAN are seamless roaming, messaging forwarding, longest possible range and capacity for a large population of devices. For some applications such as low data rate thermostats, etc., this would be overkill. Thus, other standards have come out for low data rate wireless personal area networks (LR-WPAN), which are designed for low-cost and very low-power short range wireless communications. These WPANs are designed to function in the Personal Operating Space (POS), extending up to ten meters in all directions and covering the area around a person whether stationary or in motion.

WPANs are utilized to convey information in the general vicinity of a user, which requires transmitting over relatively short distances. They typically consist of a central controller like device which is termed a Full Function Device (FFD) and peripherals which are referred to as Reduced Function Devices (RFD). The FFDs are powered and have the ability to relay packets, monitor multiple RFDs, etc. By comparison, the RFDs are very power efficient and have only the ability to communicate with the FFD.

In general, the IEEE came out with the 802.15 working group as defining three classes of WPANs. These are differentiated by data rate, battery drain and Quality of Service (QoS). IEEE Std. 802.15.3 is designated for high-data rate WPANs which can be utilized for multimedia applications. IEEE Std. 802.15.1 has been designated for use with medium-rate WPANs. These are designed for applications such as cable replacements for consumer electronic devices centered on mobile phones and Personal Digital Assistants (PDA) with a QoS suitable for voice applications. The last class of WPAN, the one that is the primary subject of this application, is the LR-WPAN class associated with the IEEE Std. 802.15.4. This is intended to serve applications enabled only by the low power and cost requirements not targeted to the other WPANs. These applications have a very low data rate and QoS that are typically not compatible with the higher data rate WPANs.

Typically, the IEEE 802 communication standards define a layered reference model that allows encapsulation of different levels of abstraction within a well defined functionality. 802.xx communication standards define only the bottom two layers of the International Standard Organization's (ISO's) Open System Connection (OSC) protocol reference model. These two layers are the physical (PHY) layer and the data link layer, which is the media access control (MAC) layer. Thereafter, additional layers are provided. These are the network layer and the application layer. These are referred to as the "upper layers." To define these upper layers, various alliances have been formed that define the application for the particular 802.xx. communication standard. In the case of 802.15.4, one of these alliances is the ZigBee alliance. This is an organization that has developed a low power layer ISO/OSI reference model. These can be used for various things such as wireless sensors. Thus, ZigBee is a standards-based network protocol supported solely by the ZigBee alliance that uses the transport services of the IEEE 802.15.4 network specification. The ZigBee alliance is responsible for the Zig-Bee standard, and the IEEE is responsible for the physical transport specification. The ZigBee alliance provides the network protocol that rides on the transport specification, i.e., hence the layering concept.

The IEEE 802.15.4 standard defines multiple PHYs which span across three license-free frequency bands. One PHY spans the 868\9 15 MHz frequency band and the other PHY is dedicated to the 2.4 GHz frequency band, the one most commonly used and the one which will be described herein. The 2.4 GHz frequency band supports a total of 16 channels, channels 11 to 26. The data rate of the 2.4 GHz band allows a maximum data rate of 250 kbps. In general, the PHY layer is the interface to the physical radio and the generation of a radio link. The responsibilities of the PHY include receiver energy detection, link quality indication and clear channel assessment, in addition to transmitting and receiving packets across the electromagnetic medium. The ability to "Sniff" the air for other nodes is also an important aspect of the ZigBee specification.

The MAC layer is the layer that controls what is happening on the radio link. This provides control of access to the radio channel and employs the services of CSMA-CA (Carrier Sense Multiple Access-Collision Avoidance) to avoid collisions on the radio link. Network association and de-association are also duties that are handled by the MAC sublayer. Flow control, acknowledgement and retransmission of data packets, frame validation and network synchronization also falls in the domain of the MAC sub-layer. It is also the primary interface from the PHY to the upper application layers of the ZigBee application. It should be understood that ZigBee is just one application that utilizes the 802.15.4 transport standard and other applications could also be associated with that standard.

Low power RFDs have been developed to dispose the radio for the 2.4 GHz solution on a chip in the form of an offset-quadrature phase shift key (O-QPSK) modulation/demodulation scheme in conjunction with a PHY and a MAC. Typically, the application layer will be formed with the use of a second application layer chip. However, some single chip solutions have actually combined the PHY, MAC and at least a portion of the application layer onto a single chip to provide a single chip solution for a given alliance based application. The challenge to the designers of the single chip solution is to provide a low power radio, sufficient modulation/demodulation capability to handle the requirements of the 802.15.4 standard, in addition to the processing necessary to effectuate the MAC and application layers. In some applications, the MAC is constructed in hardware, as well as the PHY, with the application running mostly in software through the use of some type of microcontroller system.

The industry strives to develop single chip solutions for any type of application, if possible. One area that holds a great deal of promise is software-defined radio (SDR) concepts. The idea behind the SDR is to move the software as close to the antenna as possible. This can improve flexibility, adaptability and reduce the time-to-market. However, the ZigBee solution utilizing the 802.15.4 standard requires very low power operation. This low power operation can be at odds with the concept of a fully software-defined solution. The reason for this is that, as more functionality is moved over to the software side of the operation, the amount of processing power will increase. Processing power is directly correlated to power consumption, since the typical processing engine is a digital signal processor (DSP).

Another aspect associated with the ZigBee operation and its low power operation is the fact that it only operates a certain portion of the time. For example, the reduced function module (RFD) (the slave module) will only come on at certain times to "Sniff" the channel to determine if a transmission has occurred, which transmission is associated with a beacon signal. This requires the RFD to have fairly accurate timing information associated with it such that it can anticipate when a beacon signal will be transmitted with information. Thus, the RFD will turn on for a short period of time to Sniff the channel to determine if a packet is transmitted, process the packet if it exists and then turn off to wait for the next "window." During this time, it is not possible to Sniff multiple packets, as only a single packet may be transmitted on that beacon for a particular RFD. Thus, it is important that the radio portion of the RFD be turned on, stabilized and perform a synchronization operation with a received packet and be able to obtain the following data which is termed a "payload." Since there will not be another packet, after receipt of the packet, the radio will then turn off again. It must then have sufficient accuracy to only turn on when it anticipates another packet may be transmitted. It can be appreciated that the less time the radio is on and operating, the less power that will be consumed. If there is a 20% error in the time that the radio is required to be turned on due to timing considerations, this can significantly increase power. Thus, the need for accurate timing while the radio is off is important.

SUMMARY

The present invention disclosed and claimed herein, in one aspect thereof, comprises a single chip radio platform for communicating with an RF channel operating at a channel frequency and using OQPSK data modulation employing a spreading sequence and containing radio platform layers associated with a physical layer (PHY), a media access layer (MAC), a network layer and an application layer. An RF front end is provided having a receive/transmit capability to receive in a receive mode an RF carrier modulated with digital data and convert the data to analog baseband data, and in a transmit mode, modulate an RF carrier with baseband data. A digital signal processor (DSP) engine is provided for interfacing with the RF front end to form in conjunction therewith the PHY layer, and interfacing with the MAC layer in the receive mode to demodulate the baseband data and in the transmit mode to generate the baseband data for modulation and transmission by the RF front end. A microcontroller unit (MCU) is provided for performing the functionality of the MAC, network and application layers and interfacing with the DSP. Clock circuitry is provided including a stable reference clock for generating a first fixed clock for providing MCU clocks for the operation of the MCU, and for providing a reference for a local oscillator at substantially the channel frequency for use by the RF front end and a DSP clock for use by the DSP, which the local oscillator and DSP clocks are not fixed frequency, both the MCU clocks, the local oscillator and the DSP clock having the stability of the first fixed clock. Periodic power management circuitry is provided for controlling the operation of the radio platform to operate in a sleep mode to power down the RF front end, the DSP and the MCU and in a run mode for powered operation thereof, and to control switching from the sleep mode to the run mode at specific times based on a continuously running internal clock so as to be able to receive an RF signal generated at periodic and defined times.

BRIEF DESCRIPTION OF THE DRAWINGS

For a more complete understanding, reference is now made to the following description taken in conjunction with the accompanying Drawings in which:

FIGS. 43 and 44 illustrate state diagrams for the operation of the synchronization and demodulation operations;

DETAILED DESCRIPTION

Figure 1:
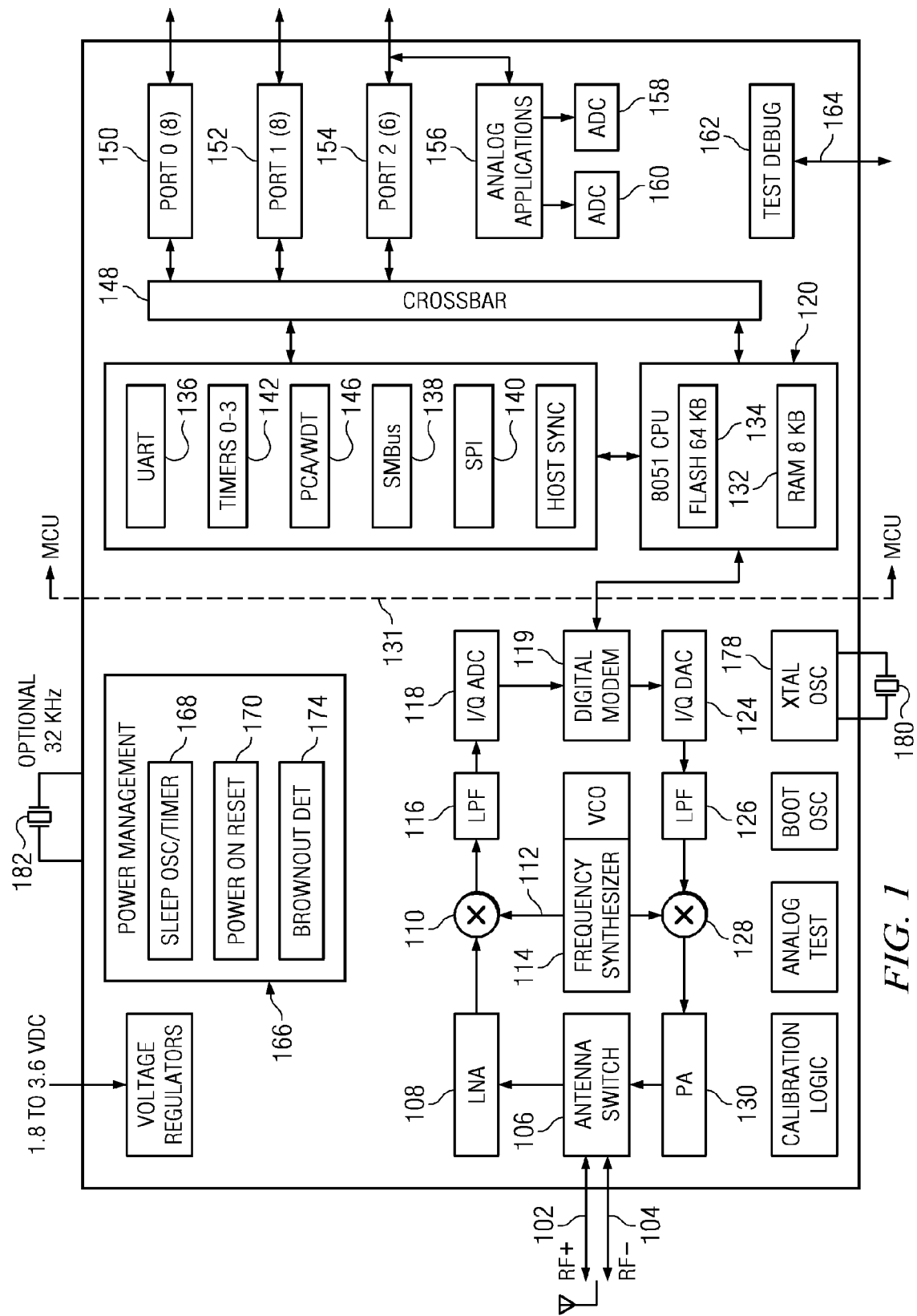
FIG. 1 illustrates an overall diagrammatic view of the RF platform.

Referring now to the drawings, wherein like reference numbers are used herein to designate like elements throughout, the various views and embodiments of a single chip low power fully integrated 802.15.4 radio platform are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated an overall diagrammatic view in block form of the single chip low power RF platform. The primary input to the device is the antenna input which is comprised of a positive antenna input 102 and a negative antenna input 104. This is input to an antenna switch 106 that is operable to switch between a transmit and a receive mode. In the receive mode, the antenna switch 106 is connected to the input of a low noise amplifier (LNA) 108. This is then input to a down converter 110, a mixer, which has a local oscillator input on an input 112 connected to a frequency synthesizer/VCO 114 to provide I- and Q-clocks thereto. The I- and Q-components of the baseband signal are then input to a dual low pass filter 116, the output of which is input to a dual analog-to-digital converter 118, the dual aspect not shown for simplicity purposes. At this point in the signal flow, there will be two components, the in phase component and the out of phase component, i.e., the I and Q components. Demodulation is then effected in a digital modem 119 and the data then interfaced to a central processing core 120, which is basically a CPU based on the 8051 architecture disposed to the right of a dotted line 131. This is a conventional architecture which has been utilized in microcontrollers for some time.

When the antenna switch is in the transmit mode, the signal path is from the CPU 120 to the digital modem 119 for modulation of the data that is transmitted onto the in phase and out of phase channels, to provide the I- and Q-components, with only a single path illustrated for simplicity purposes. The data modulation scheme utilizes an offset quadrature phase-shift keen (O-QPSK) modulation scheme. The system generates a raw baseband bit stream wherein the bits are then examined by groups of four-bits. Each four-bit sequence is then mapped to one symbol out of 16 possible symbols. Each symbol is in turn mapped to a 32-chip pseudo random sequence. These sequences are pseudo random and nearly orthogonal. The 16 different 32-chip random sequences corresponding to the 16 possible symbols are specified in the 802.15.4 standard. Once the chips have been defined, it is then only necessary to determine the digital value of that shape and convert it to an analog value. The digital chip values are then converted to analog data with a digital-to-analog converter 124 (dual although illustrated as a single DAC) for both the I- and the Q-channels for output to a low pass filter 126 (a dual filter, although illustrated a single filter, which is realized with the same physical filter 116 with the poles and zeros changed) and then to an up converter 128 that utilizes the frequency synthesizer 114 as the local oscillator input. The up converted signal is then amplified by a power amplifier 130 for output to the antenna switch 106 which operates in the transmit mode for output of the modulated carrier to the antenna ports 102 and 104.

The 8051 CPU 120 has associated therewith onboard RAM 132, which is a non-volatile storage space for use during operational mode. A non-volatile memory 134 is provided to store data and instructions when the system is powered down. This is typically configured with on-board Flash memory. The CPU 120 operates on instructions directly form the NVRAM 134.

There are various input/output functions associated with the operation of the chip. There are provided a number of serial bus interface blocks, to effect, for example, a UART in block 136, an SMbus serial protocol interface in a block 138 and a serial port interface protocol in a block 140. There can also be provided different interface protocols, dependant upon the hardware configuration. Various timers in block 142 are provided in addition to watchdog timers in a block 146. A configurable port interface in the form of a crossbar switch 148 is provided that allows a user to configure the various output ports for various functions. The CPU 120 interfaces with the crossbar switch 148 to allow digital information to be transmitted therebetween such that digital information can be output on a configured port or received from a configured port. In addition, any of the peripheral function blocks comprised of the blocks 136-142 can be selectively interfaced through the crossbar switch 148 to any of the plurality of digital ports 150, 152 and 154. These ports 150-154 can be configured to be input ports or output ports. Additionally, some of the pins to which the ports 150-154 can be interfaced can also be associated with analog input/output functions as well as digital. When utilizing the chip as, for example, a sensor, various pins would be utilized with the sensor inputs, these typically being analog inputs. These analog applications would then be handled by a block 156 for interface to one of two ADCs 158 and 160.

One portion of the functionality of the chip is to provide for testing and debugging with a block 162. This is typically done through a port interface 164 which is typically configured with a JTAG interface, a conventional interface. Additionally, this interface 164 is also the interface utilized to transfer data to and from the Flash 134 for programming the chip. This particular single chip solution is externally programmable such that the program can be modified without changing a mask.

One of the key functions associated with the particular single chip solution is low power operation. A power management section 166 is provided to provide a sleep oscillator time function in a block 168, a power-on reset operation in a block 170 and a brownout detect operation in a block 174. There is also provided an onboard crystal oscillator 178 that interfaces with an external crystal 180. Internally, there is also provided a 32 KHz clock as the sleep oscillator which can either be free running or utilize the 32 KHz external crystal 182.

In general, the RF radio portion is an O-QPSK radio wherein the PHY layer is realized with a Digital Signal Processor (DSP), this being the digital modem 119. The MAC portion of the system is partially configured in software and is handled by the CPU 120. Additionally, as will be described herein below, the CPU 120 also handles the application layer. Therefore, the single chip solution utilizes an RF front end, a software DSP-based PHY and a software MCU-based MAC/application.

Figure 2:
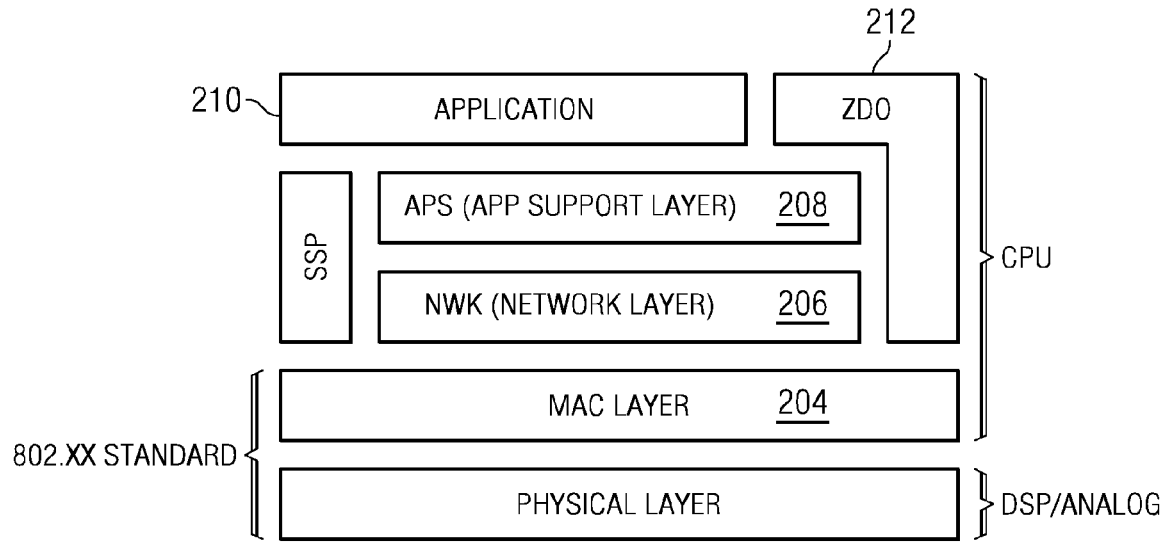
FIG. 2 illustrates a diagrammatic view of the network layering for the ZigBee application.

Referring now to FIG. 2, there is illustrated a diagrammatic view of the multi level stack for the application implemented in the single chip RF platform solution described herein above. For simplicity, the application implemented on the 802.15.4 transport will be described as the ZigBee application. However, it should be understood that any type of application could be implemented, wherein the DSP is used for a portion of the PHY, primarily the modem with the remaining portion of the PHY realized as an analog solution, such that the MAC and applications are configured therein and the MAC and the layers disposed there above are implemented in the MCU such that the MAC and applications are configured therein. Additionally, some aspects of the MAC could be implemented in the DSP.

The DSP, which was described herein above as incorporating the functionality of digital modem 119, is utilized to realize a portion of a physical layer 202. The PHY layer 202 is governed by the IEEE standard, IEEE 802.15.4 in the present example. The PHY works for, but does not directly report to the above layers associated with the ZigBee. In this implementation, there will be provided, in addition to the PHY layer, a MAC layer 204. Above the MAC layer is provided the network layer, a layer 206 which will implement different ZigBee network routing algorithms. Above the network layer will be application layers, one layer 208 providing the application support layer and layer 210 providing the actual application that operates on the ZigBee support layer. There is provided a ZigBee Device Object (ZDO) layer 212 also. All of the layers above the MAC layer are defined by the ZigBee alliance, with the MAC layer and physical layer 204 and 202, respectively, defined by the 802.xx layers, the 802.15.4 standard in the present example.

With respect to the PHY 202, it is responsible for such tasks as data transmission and reception, Clear Channel Assessment (CCA) for CSMA-CA (Carrier Sense Multiple Access—Collision Avoidance), activation and deactivation of the radio transceiver (the radio transceiver being the physical medium to which the PHY 202 interfaces), Energy Detect (ED) within the current channel, channel frequency selection, and the Link Quality Indicator (LQI) for received packets. In this example, only the 2.4 GHz PHY will be discussed, it being noted that the standard also provides for an 868/915 MHz frequency range.

For all intents and purposes, the control layer over the PHY 202 is the MAC layer 204, as everything the PHY does has to somehow flow through the MAC layer of the stack. The function of the PHY is to provide an interface between the MAC sublayer and the physical radio channel. In general, the operation of the PHY layer 202 and the MAC layer 204 are well defined in the standard.

The MAC layer 204, as noted herein above, basically oversees the operation of the PHY. The MAC layer 204 is generally responsible for providing a reliable link between two peer MAC entities, handling the CSMA-CA mechanisms for channel access, Personal Access Network (PAN) association and PAN disassociation, beacon synchronization, beacon generation, device security and overseeing the Guarantee Time Slot (GTS) mechanism. Logically, the MAC layer 204 is similar to the PHY layer 202 in that the MAC layer 204 has multiple sublayers to provide various layer-management functions. These will not be discussed herein in detail, as they are all part of the standard.

As noted herein above, when the RF platform is powered up, a power-on reset will occur and the program associated with the operation of the DSP and CPU will be downloaded to RAM for operation. The use of a DSP provides a fairly powerful processing engine for the purpose of executing modulation/demodulation algorithms that are operable to interface between the quadrature input/output of the receiver and the data domain of the MAC layer 204. At the MAC layer, the processing is less intense and, therefore, a standard architecture such as the 8051 architecture, a well known architecture, can be utilized to facilitate the processing necessary for the MAC operation. This 8051 architecture employs a pipelined architecture that greatly increases the instruction throughput over standard 8051 architectures. The portion of the platform that is associated with the 8051 microcontroller core, comprised of the 8051 CPU 120, the functional blocks, crossbar switch 148 and the various port I/O functions, is disclosed in U.S. Pat. No. 7,171,542, issued Jan. 30, 2007, entitled RECONFIGURABLE INTERFACE FOR COUPLING FUNCTIONAL INPUT/OUTPUT BLOCKS TO LIMIT NUMBER OF I/O PINS, which is incorporated herein in its entirety herein by reference.

Figure 2A:
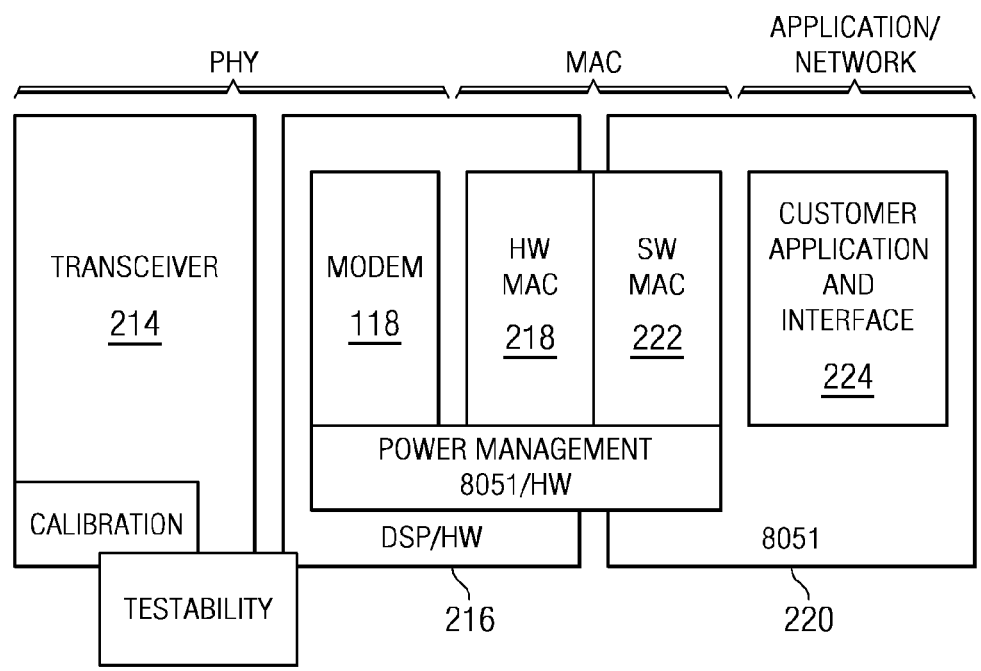
FIG. 2A illustrates the general layout of the chip relative to the different layers in the stack.

Referring now to FIG. 2A, there is illustrated a layout for the chip depicting the different sections and how they relate to the different layers. An analog transceiver 214 which provides the interface between the antenna and digital modem for transmission and the acquisition module (described herein below) associated with the receive channel. The transceiver 214 is basically the radio portion of the chip. This forms the analog portion of the PHY. The digital portion of the PHY is comprised basically of the digital modem 119 which is facilitated with a DSP in a DSP/hardware block 216. The DSP/hardware block 216 includes the digital modem 119 which is a portion of the PHY, in conjunction with the transceiver 214. The block 216 also includes a portion of the MAC that is formed in hardware portion 218. The power management function is also facilitated partly in the block 216 and partly in an MCU block 220. The block 220 includes a portion of the MAC, the software MAC in a block 222 and also includes a portion of the power management functionality. MCU block 220 is also illustrated as containing the customer application 224 and the interface, as was described herein above. Thus, it can be seen that the software defined radio (SDR) extends from the customer interface all the way to the analog transceiver 214. By incorporating the modem in a DSP architecture, it can be configured with software to facilitate not only the 802.15.4 standard but other 802.xx standards, if desired. Further, the customer application can be changed in the MCU block 220. However, to move the SDR farther toward the antenna could result in a level of processing that would require a much more powerful DSP and thus result in excessive power consumption requirements. By realizing the digital modem 119 in the DSP and substantially all of the analog radio in the analog transceiver 214, a balance between power consumption and versatility is achieved to allow realization of a ZigBee single chip solution.

Figure 3:
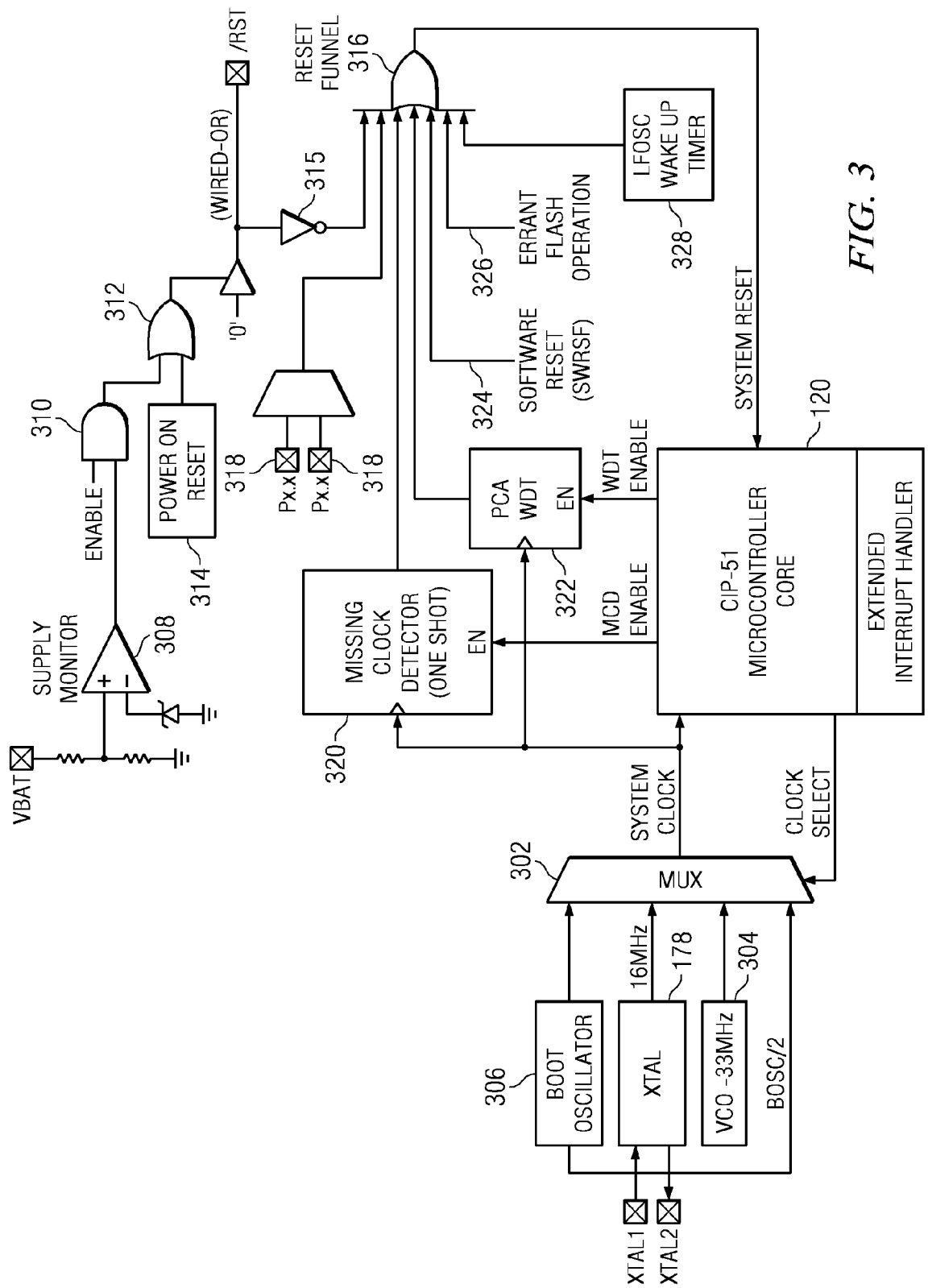
FIG. 3 illustrates a block diagram of the on-chip clock and reset circuitry

Referring now to FIG. 3, there is illustrated a schematic diagram of the clock functionality that is associated with the operation of the RF platform. As will be described hereinbelow, the 16 MHz clock is routed along a separate path to create a 2.4 GHz clock with a PLL so as to provide a separate clock for the radio/DSP section. The crystal oscillator 178 is operable to generate, in this embodiment, a 16 MHz clock frequency which is input to a multiplexer 302. The multiplexer 302 is operable to select between an internal on-chip Voltage Control Oscillator (VCO) 304, the crystal oscillator 178 and a boot oscillator 306 for operation thereof in the MCU section. The CPU 120 controls the selection of the particular clock. The output of the multiplexer 302 comprises the system clock. The clock select line typically is realized with a Special Function Register (SFR). The boot oscillator 306 is a 32 MHz oscillator that requires relatively little start-up time, compared to crystal oscillators that typically require a start-up time before they are settled and ready for use. The low frequency clock, the boot oscillator, is also utilized for power management whereas the VCO 304, in addition to providing the system clock for the CPU 120, also provides the clock for the radio operation. It should be understood that the crystal oscillator 178 provides the time base for the VCO 304, although not illustrated. A supply monitor 308 is provided that monitors the battery level. When a power-down transition or power irregularity causes VDD to drop below a reset voltage, the power supply monitor will drive a reset pin low and hold the CPU 120 in a reset state. The output of the supply monitor is input to one input of AND gate 310, the other input thereof connected to an enable signal, the output thereof input to one input of an OR gate 312, the other input connected to a power-on reset 314. The output of the OR gate 312 will gate the reset pin to pull it to a logical "0." During power-up, the RF platform is held at a reset state and the reset pin is driven low until VDD settles above the reset voltage. A delay occurs before the device is released from reset.

During a reset, the reset pin being pulled low is input through an inverter 315 to a multiple input OR gate 316, this being the reset funnel gate. The output of the gate 316 provides a system reset to the CPU 120. This also can be reset from external signals on pins 318. The reset funnel can also be reset with a missing clock detector circuit 320, a watchdog timer 322, a software reset on a line 324 and reset on a line 326 associated with an errant flash operation. In addition, there is also provided a reset from a wake up timer that is associated with the low frequency oscillator, this indicated by a block 328. The missing clock detector 320 is a one-shot circuit that is triggered by the system clock. If more than a certain period of time passes between rising edges on the system clock, the one-shot will time out and generate a reset. In general, the state of the reset pin is unaffected by this type of reset. The programmable watchdog timer 322 can be used to prevent software from running out of control during a system malfunction. This function can be enabled or disabled by software. The state of the reset pin is unaffected by this reset also. The software reset is a bit that forces a reset by writing a "1" to the particular location associated therewith.

Radio Transceiver

The radio front end of the RF platform provides the interface between the antenna and the digital modem. In the receive mode, the signal is received and converted into the analog in phase and quadrature phase outputs and, the transmit mode, analog in phase and quadrature signals are up converted on the carrier for transmission. This is a highly integrated radio utilizing few external components or tunings.

The antenna switch 106 provides the main interface between the receiver, the transmitter and the antenna. The antenna switch allows multiple configurations for interfacing the antenna with the receiver/transmitter during the respective mode of operation. This provides an RF interface which is described in detail in U.S. patent application Ser. No. 11/538,043, filed Oct. 2, 2006, entitled RF INTERFACE FOR ACCOMMODATING DIFFERENT ANTENNA IMPEDANCES, which is incorporated herein by reference in its entirety.

Overall the antenna switch 106 provides a flexible RF interface between the radio and the external antenna. This interface configures two configurable input/output connections, the connections 102 and 104. The associated flexibility provides the engineer the ability to design either a single-ended or differential antenna interface and also allows the engineer to eliminate extra transmit/receive (T/R) switches when utilizing an external power amplifier. Further, this provides the designer the ability to improve performance by using diversity antennas if desired.

Figure 4:
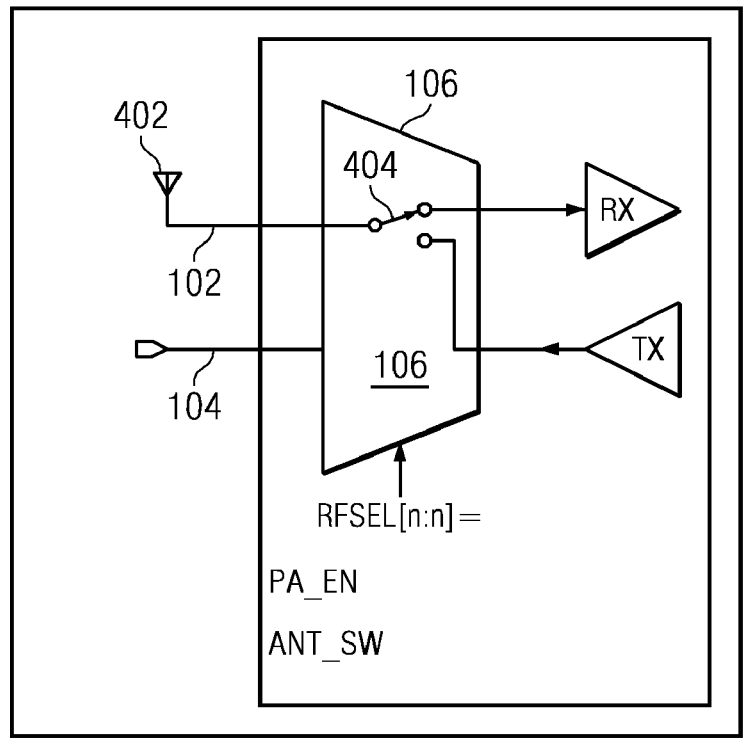
FIG. 4 illustrates a diagrammatic view of a standard RF interface mode.

Referring now to FIG. 4, there is illustrated a diagrammatic view of the standard RF interface mode. In this mode, the antenna switch 106 is operable to provide a single switch between a single antenna 402 connected to the input 102. The internal switch is represented by reference numeral 404. This merely switches, in receive mode, the antenna 402 to the receive chain and, in the transmit mode, connects the transmit chain to the antenna 402. This is a true single-ended interface, such that component sensitive, PCB-insensitive balun circuits are not necessary. A 50 ohm antenna at a simple LC match circuit followed by an AC coupling capacitor (not shown). All amplifier bias currents are internally coupled, eliminating external bias components.

Figure 5:
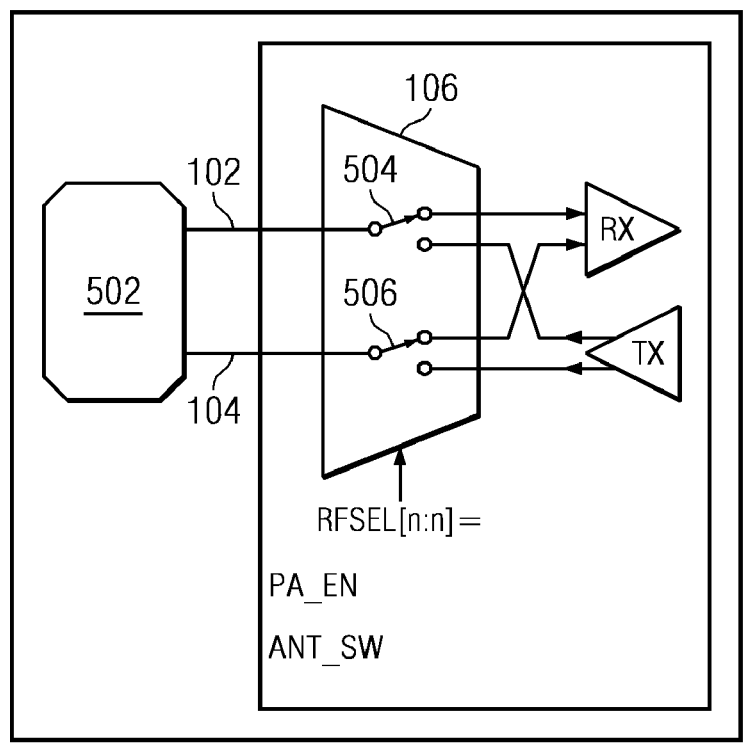
FIG. 5 illustrates a diagrammatic view of a differential interface mode.

Referring now to FIG. 5, there is illustrated operation in the differential interface mode. In this mode, a loop antenna 502 is utilized having two inputs, one connected to the input 102 and one connected to the input 104. Thus, these two pins are used simultaneously to drive a balanced load. As with the single-ended mode, a simple LC matching network is necessary on each pin to fine tune a conjugate match. This will require two switches, a switch 504 associated with pin 102 and a switch 506 associated with pin 104. The switches 504 and 506 will be both switched to differential inputs of the receive chain during the receive mode and, during the transmit mode, differential outputs in the transmit chain will be connected to respective ones of the switches 504 and 506 which will be switched for connection to the loop antenna 502.

Figure 6:
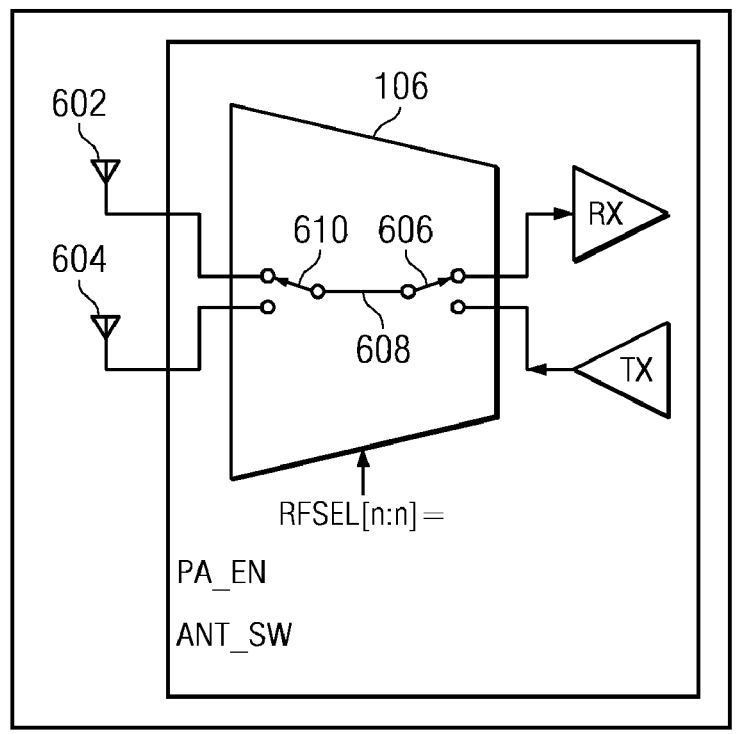
FIG. 6 illustrates a block diagram of a diversity mode.

Referring now to FIG. 6, there is illustrated the diversity mode of operation. In this mode, the designer is able to utilize two different antennas, an antenna 602 and an antenna 604, either with different polarizations or mounted in different locations. The software is operable to select the best antenna based on RSSI or other criteria. This requires a first switch 606 to connect an intermediate node 608 to either the input of the receive chain during receive mode or to the output of the transmit chain during transmit mode. The antenna 602 and the antenna 604 are selected between via a switch 610 coupled between the node 608 and either of the antennas 602 or 604.

Figure 7:
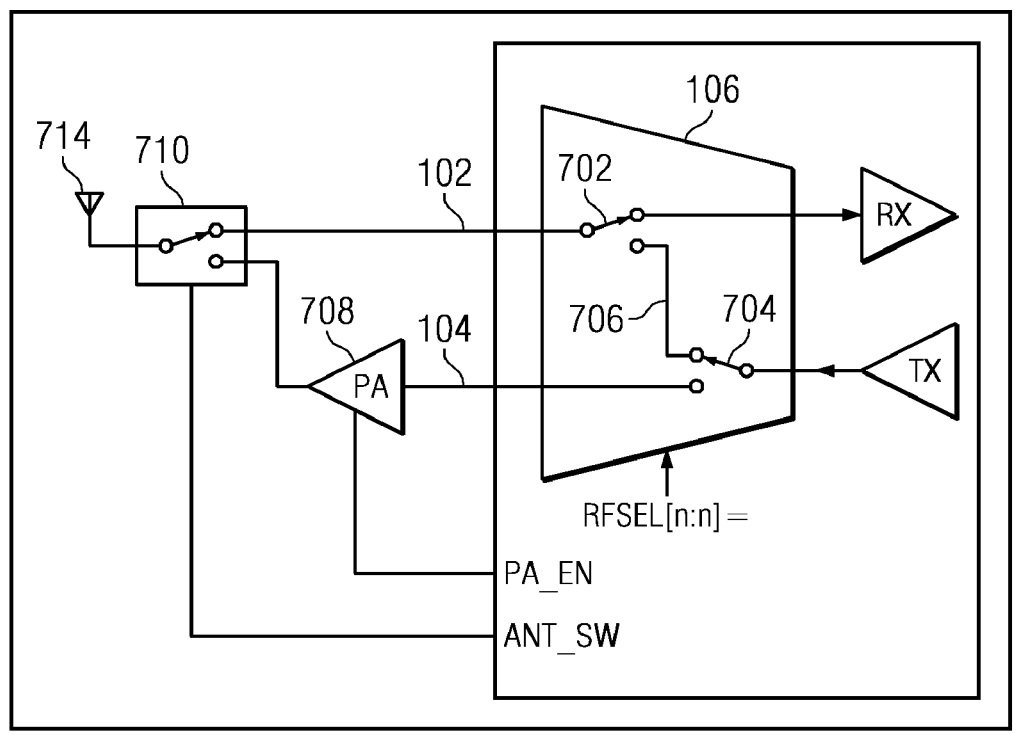
FIG. 7 illustrates a block diagram of the operation of the power amplifier in an external power amplifier mode.

The transmitter output, illustrated in FIG. 7, is operable to drive an external PA in the event that it is desired to increase the transmit range. In this mode, there are provided two switches 702 and 704 in the antenna switch 106. The switch 702 is operable to switch the node 102 between the input to the receive chain and an intermediate node 704. The switch 704 is operable to switch the output of the transmit chain between node 104 and the intermediate node 706. The node is connected to the input of an external power amplifier 708, the output thereof connected to one input of a switch 710. The other input of the switch 710 is connected to the output of the switch 702. The output of switch 710 is connected to an antenna 714. The external power amplifier 708 is connected to an enable output such that it is only enabled during transmission for power consumption. The switch 710 has a switch control output from the RF platform.

Figure 8:
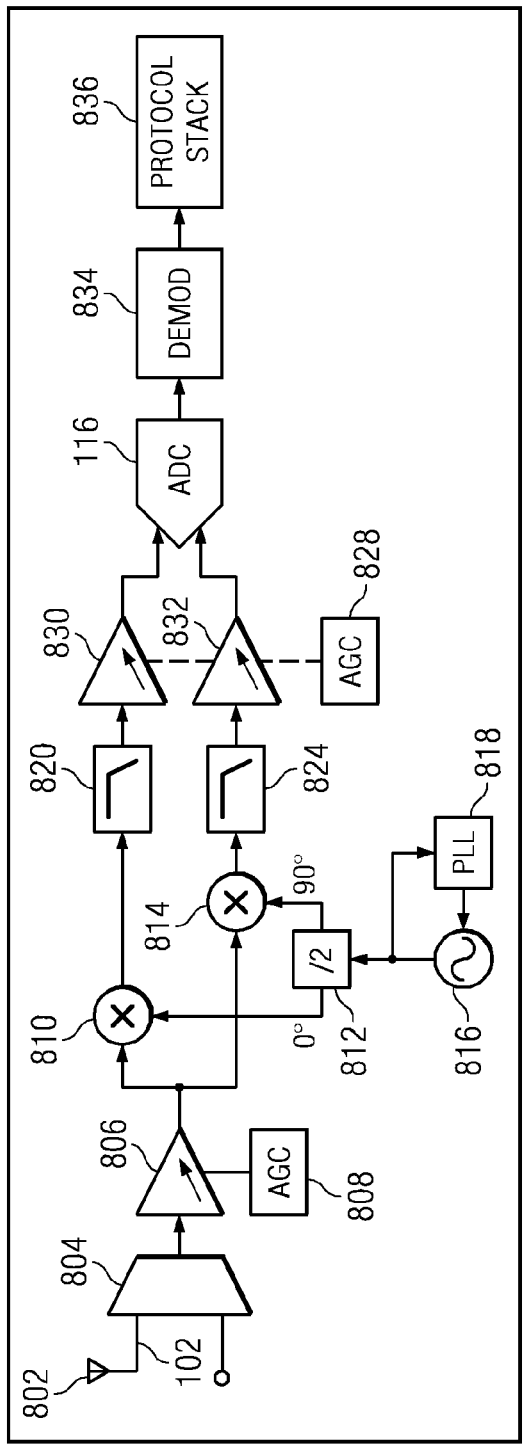
FIG. 8 illustrates a diagrammatic view of the receiver.

Referring now to FIG. 8, there is illustrated a diagrammatic view of the receiver portion of the RF platform. In general, the receiver comprises a simple, direct down conversion architecture. This architecture leverages the digital signal processing power available in CMOS, thus reducing the number of analog stages and eliminating any external signal paths. The output of the receiver is a stream of demodulated 802.15.4 symbols, ready for further processing by the protocol stack in the 8051 microcontroller core. As noted herein above, this particular amplifier is designed for the 2.4 GHz band and, therefore, the PHY utilizes the architecture set forth in the 802.15.4 standard for that band. The signal is received on an antenna 802, which is selected for input to the receive chain by multiplexer 804. The output of this multiplexer 804 is input to the input of a Low-Noise Amplifier (LNA) 806 that is controlled by an AGC circuit 808 to vary the gain thereof. The operation of the AGC circuit 808 is described in U.S. patent application Ser. No. 11/618,425, filed Dec. 29, 2006, and entitled AUTOMATIC GAIN CONTROLLER FOR RF TRANSCEIVER, which is incorporated herein by reference in its entirety. Once amplified by the LNA 806, the receive signal is down converted in frequency by a quadrature mixer, which is comprised of a first in-phase mixer 810 which receives an input from a quadrature divider 812 of 0° and provides down converted output. A second mixer 814 receives the output of the LNA 806 and the 90° shifted output of the quadrature divider 812 to provide a local oscillator input that is 90° out of phase as compared to a local oscillator input of mixer 810. This provides the quadrature component "Q" wherein the in-phase component is defined as "I." Thus, the I and Q channels have been defined. The local oscillator is provided by an oscillator 816 which is generated with a Phase Lock Loop (PLL) 818 referenced to the 16 MHz crystal oscillator. In general, the quadrature mixer is operable to process a received signal by mixing it (multiplying it) with the local oscillator signal of the same frequency, resulting in a double-frequency sum term and a zero-frequency difference term. The low pass response of the mixers 810 and 814 in the receive chain provide for rejection of the double-frequency component, resulting in only the down converted difference in the output thereof. After down conversion, the receive signal resides at baseband, which is suitable for analog-to-digital conversion and demodulation. However, prior to that, the receive signal in the I- and Q-channels is low pass filtered by respective low pass filters 820 and 824 to filter the signal with a −3 dB frequency of approximately 1 MHz. The primary purpose of the filters 820 and 824 is to reject interference energy from nearby sources, such as a BlueTooth, ISM, or other 802.15.4 transmitters (these typically are referred to as interferers). The secondary purpose is to bandwidth limit the noise power received through the antenna 802 in order to improve the signal-to-noise ratio at the demodulator input. The low pass filters are automatically calibrated on power-up, eliminating bandwidth or gain errors due to manufacturing tolerance or temperature and voltage variation.

The receive path for each I- and Q-channel has a variable gain under the control of an automatic gain control algorithm represented by block 828 which operates in conjunction with the AGC block 808, which, as described herein above, is described in U.S. patent application Ser. No. 11/618,425, filed Dec. 29, 2006, and entitled AUTOMATIC GAIN CONTROLLER FOR RF TRANSCEIVER, which is incorporated herein by reference in its entirety. The AGC algorithm monitors the receive signal level at the DSP and then controls a variable gain stage 830 associated with the I-channel and a variable gain stage 832 associated with the Q-channel at the output of the low pass filters 820 and 824, respectively. The goal of the AGC algorithm is to maintain a given signal level at the AGC and DSP for reliable demodulation while preserving headroom and avoiding signal saturation when high-power interferers are present. Gain is automatically adjusted on a frame-by-frame basis. The algorithm resides in the DSP, such that no additional code is necessary to manage the AGC function in the protocol stack. The output of the gain stages 830 and 832 are input to the ADC block 116 to provide a digital output to a demodulation block 834, which is part of the digital modem 119. This is part of the DSP engine. Thus, 802.15.4 demodulation is performed internally by a dedicated DSP engine and demodulated symbol data is then passed therefrom to the 8051 core for further processing by the protocol stack, illustrated by block 836. As described herein above, the MAC layer is operable to contain the portion of the protocol stack for processing of the data. However, a portion of this protocol stack will include ZigBee application sublayers, as described herein above.

In general, a single frequency synthesizer is provided for generating the local oscillator frequency necessary for down- and up-conversion of the receive and transmit signals respectively. The synthesizer, voltage-control oscillator (VCO) and all tank and loop filter components are integrated on the chip. This VCO operates at twice the channel frequency or approximately 4800-5000 MHz. The output is then divided by two to generate an accurate quadrature signal to drive the up-or down-conversion mixers 810 and 814, in the receiver, for example. Thus, the block 812 provides the divide-by-2 operation. Both the transmitter and the receiver are direct-conversion architectures and, therefore, the divided local oscillator frequency is always equal to the transmit or receive channel frequency. The PLL 818 phase detector operates at 1 MHz and is based on the 16 MHz crystal oscillator. Further, the VCO features a self-tuning algorithm. This algorithm coarse tunes the VCO before locking the PLL 818 resulting in reduced settling times. This algorithm also automatically corrects the VCO, resulting in reliable operation across a wide variety of manufacturing tolerance and environmental conditions. The PLL 818 is described in U.S. patent application Ser. No. 11/050,131, filed Feb. 3, 2005, which is incorporated herein by reference in its entirety.

Figure 9:
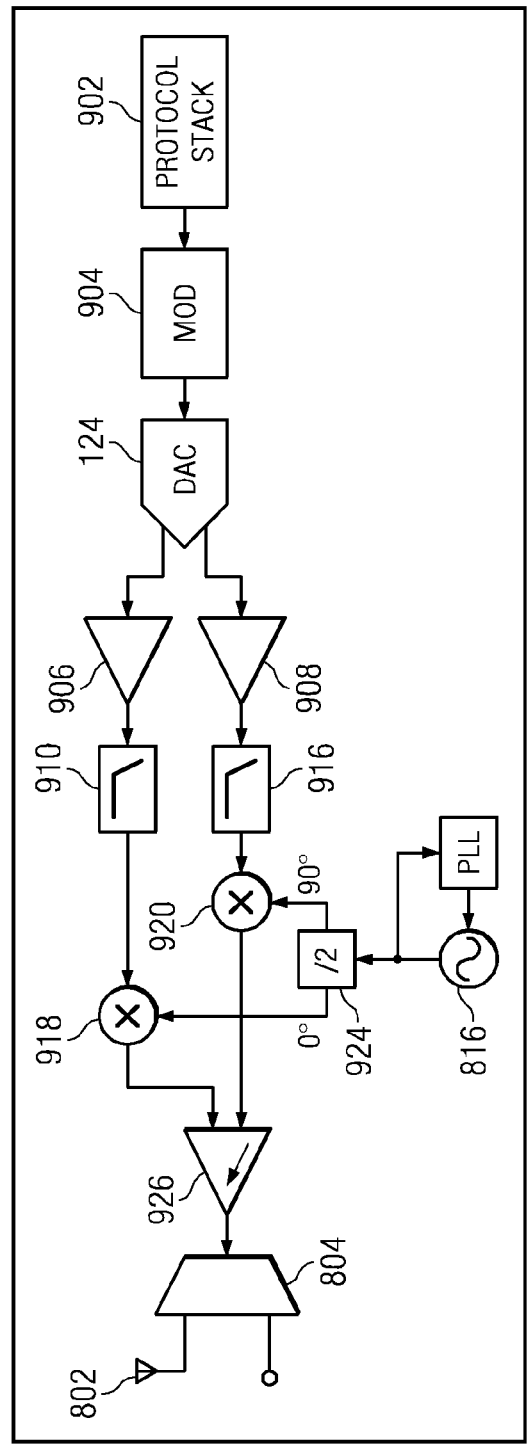
FIG. 9 illustrates a diagrammatic view of the transmitter.

Referring now to FIG. 9, there is illustrated a diagrammatic view of the transmitter. Symbol data from the 8051 core is provided by a protocol stack 902 that is implemented in the 8051 core. This data is modulated, up converted to RF and amplified for over-the-air transmission through the antenna 802. The multiplexer 804 is operable to select the transmit chain during the transmit mode of operation. Initially, the protocol stack 902 generates a Protocol Service Data Unit (PSDU) by assembling the protocol data from the higher layers. This PSDU then goes to the DSP engine to be mapped from symbols to an 802.15.4 chip sequence. The chip sequence is comprised of half-sine pulse shaped waveforms with the shape defined with data in the digital domain, this digital data then converted to the analog domain and amplified. The signal is low pass filtered and is then up converted from a zero IF frequency baseband to the RF transmitter frequency. The modulation operation is performed by a modulation block 904 to provide the digital output data to the DAC 124 which provides the data on the I- and Q-channels respectively. This is amplified by respective amplifier stages 906 and 908 and then low pass filtered with respect to filters 910 and 916. The output of filter 910 is input to the input of an up converter 918 and the output of filter 916 is input to an up converter 920. The local oscillator 816 is input to a divide-by-2/quadrature block 924 to provide the in-phase and out-of-phase local oscillator inputs. This effectively up converts the two channels which are then input to an output power amplifier 926 with variable gain for output of the I- and Q-channels in a combined signal.

The 2.4 GHz modulated signal, after amplification by the power amplifier 926 directly drives the antenna through the RF interface or multiplexer 804. The highest power setting of this stage satisfies the −3 dBm 802.15.4 minimum transmit power requirement. Lower power settings may be utilized as needed to improve battery life.

Figure 10:
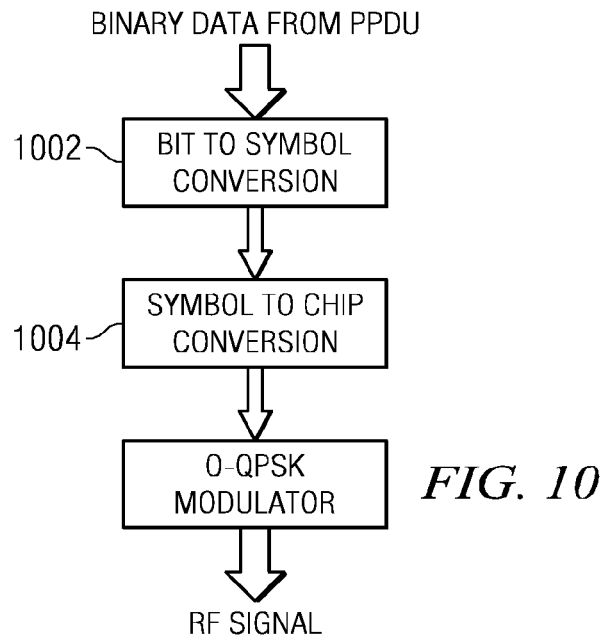
FIG. 10 illustrates a diagrammatic view of the mapping of the binary data to the I- and Q- O- QPSK output signals.

As noted herein above, the PHY level of the IEEE 802.15.4 protocol stack is responsible for the establishment of the RF link between two devices. The PHY is also responsible for bit modulation, demodulation and synchronization between the transmitter and receiver. Finally, the PHY is also responsible for packet level synchronization. As noted herein above, the primary example that is being discussed is the use of the 2.4 GHz PHY layer. The modulation scheme for this frequency band is O-QPSK modulation, whereas the lower bands utilize a BPSK modulation scheme, which is not being discussed herein. The O-QPSK modulation scheme utilizes an M-ARY quasi-orthogonal modulation technique. In this embodiment, it is 16-ARY quasi-orthogonal modulation technique. This particular modulation technique for data modulation utilizes a particular 32-chip, pseudo-random sequence to represent four bits and simultaneously accomplish the spreading modulation. The data modulation is performed by means of cyclic rotation and/or conjugation (inversion of chips with odd indices) of the sequence. The pseudo-random sequence is started in different places depending upon the modulating data transmitting four bits in each symbol period. While thirty two bits could be transmitted by the choice of 32 chips, four were chosen for the 2.4 GHz. The transmitted 32-chip pseudo-random sequence is allowed to start only at every fourth chip of a sequence. Symbols 0-7 represent cyclic shifts in multiples of four chips. Symbols 8-15 use the same shifts as symbols 0-7, respectfully, but use a conjugated sequence (i.e., the odd indexed chips are inverted). The 802.15.4 2.4 GHz standard specifies a symbol rate of 62.5 ksymbols per second with four bits in each symbol; therefore, 250 kb/s service is obtained. The 32-chip pseudo-random sequence to be transmitted is split between the orthogonal I- and Q-channels of the O-QPSK modulator with the even-indexed chips placed on the I-channel and the odd-indexed chips placed on the Q-channel. A one-half chip delay is placed in the Q-channel, creating the offset for O-QPSK operation because 32 (no complex) chips are transmitted in one symbol time (16 ts), the overall chip rate of 2 Mc/s. The chip rate in either the I-channel or Q-channel, however, is 1 Mc/s. The bit double processing consists of assembling four bits into a symbol, converting that symbol to a cyclically rotated 32-chip sequence. This is illustrated in Table 1.0. Then, that chip sequence is modulated onto the I- or Q-channel, respectively. This process is illustrated in FIG. 10 wherein the original binary data is received and then converted in a block 1002 from a bit to a symbol, i.e., each 4-bit sequence is parsed into a symbol. Thereafter, the symbol is then converted to a chip sequence in block 1004 (this being a simple look up operation) and then the chips are modulated onto the I- and Q-channels in the manner described herein above. This modulation requires converting the chip sequence into a stream of half-sine pulse shaped waveforms, which shape is a programmable feature.

TABLE 1.0

Symbol to chip mapping

| Data Symbol (decimal) | Data Symbol (binary) (b3 b2 b1 b0) | Chip Values (c0 c1 ... C30 C31) |
|---|---|---|
| 0 | 0000 | 11011001110000110101001000101110 |
| 1 | 0001 | 11101101100111000011010100100010 |
| 2 | 0010 | 00101110110110011100001101010010 |
| 3 | 0011 | 00100010110110110011100001101010 |
| 4 | 0100 | 01010010001011101101100111000011 |
| 5 | 0101 | 00110101001000101110110110011100 |
| 6 | 0110 | 11000011010100100010111011011001 |
| 7 | 0111 | 10011100001101010010001011101101 |
| 8 | 1000 | 10001100100101100000011101111011 |
| 9 | 1001 | 10111000110010010110000011110111 |
| 10 | 1010 | 01111011100011001001011000000111 |
| 11 | 1011 | 01110111101110001100100101100000 |
| 12 | 1100 | 00000111011110111000110010010110 |
| 13 | 1101 | 01100000111011110111000110010001 |
| 14 | 1110 | 10010110000011101111011100011100 |
| 15 | 1111 | 11001001011000000111011110111000 |

Figure 11A:
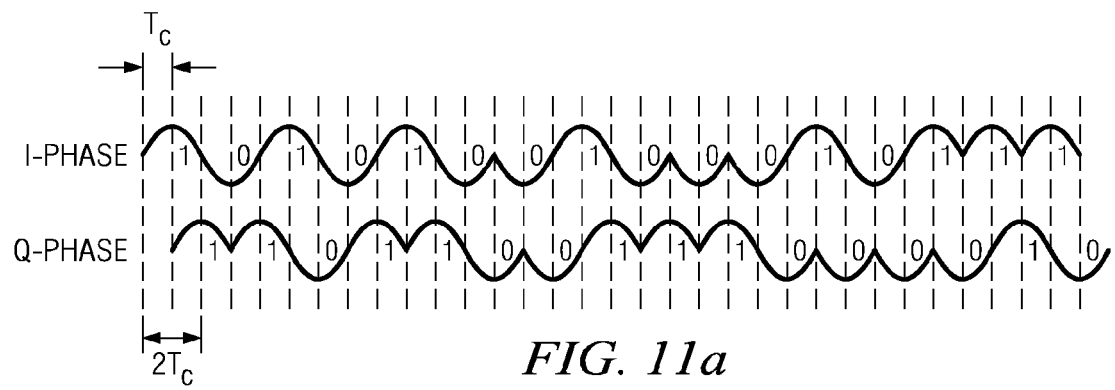
FIGS. 11a and 11b illustrate a diagrammatic view of the analog output symbol information.

In general, the data is converted into symbols and then those symbols converted into a pseudo-random (PN) noise sequence. Since each byte of information consists of eight bits which then can be divided into a pair of 4-bit nibbles, this will result in an upper nibble and a lower nibble for each byte of data. The PN sequences in Table 1.0 provide one PN sequence for each nibble, each sequence comprised of a plurality of chips, there being 32 chips. These bits are then shifted out of the antenna the least-significant bit first after being half-sine pulse shaped and modulated utilizing O-QPSK encoding. In general, the odd data values in chip sequence are disposed in the I-channel and the even data chips are disposed in the Q-channel. This is illustrated in FIG. 11a for the chips symbols associated with the "0" symbol. Each of the 32 bits in the pertinent chip value is modulated 90° out of phase, which is where the term quadrature comes into play. Even count chips ($c_0$, $c_2$, $c_4$, etc.) are modulated on the in-phase (I) carrier while odd chip counts ($c_1$, $c_3$, $c_5$, etc.) are modulated on the quadrature-phase (Q) carrier. This results in the 180° phase angle of chip c0 occurs at the 90° peak of chip $c_1$.

Figure 11B:
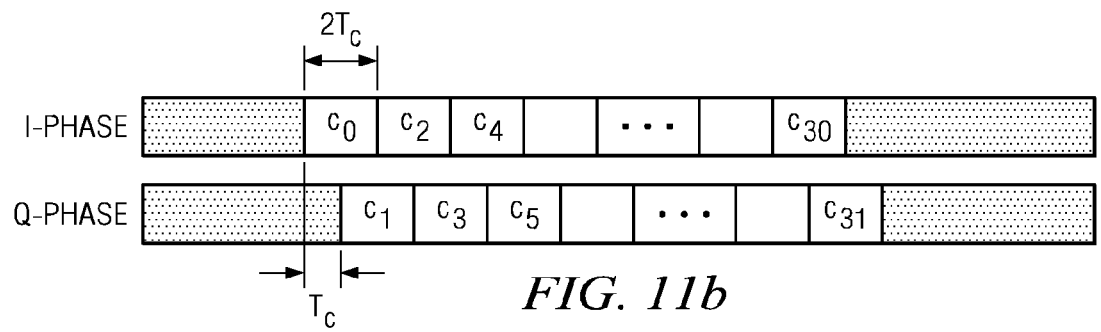

To be able to obtain a symbol data rate of 62.5 ksymbols/s at 2.4 GHz as specified in Table 1, requires that the chip rate be 32 times the symbol data rate, since one symbol is 32 chips. Thus, one must be able to transmit the 32 chips in the same time period that the four bit nibble is transmitted, which is the same as one symbol. That equates to 32 times the symbol rate (32*62,500), which provides a 2-Mchips/s chip rate to obtain a 62.5-ksymbol/s symbol rate in the 2.4 GHz frequency band. The 802.15.4 standard specifies that the Q-phase chips are delayed by $T_c$ with respect to the I-phase chips, where $T_c$ is the inverse of the chip rate. Each chip is $2T_c$ wide. This is illustrated in FIG. 11b. Although the herein above description is standard and well known, it will be useful in discussing the modulation herein below.

Microcontroller

The portion of the RF platform that provides the MAC in application layers is that provided by the microcontroller or microcontroller unit (MCU) system. At the core of the MCU system is the microcontroller 120. The microcontroller 120 is fully compatible with a standard instruction set associated with the 805 standard. This allows standard 803x/805x assemblers and compilers to be utilized to develop software therefore. As noted herein above, the MCU system is described in detail in U.S. Pat. No. 7,171,542, issued Jan. 30, 2007, entitled RECONFIGURABLE INTERFACE FOR COUPLING FUNCTIONAL INPUT/OUTPUT BLOCKS TO LIMIT NUMBER OF I/O PINS which was incorporated herein by reference herein above in its entirety. This MCU has a superset of all peripherals included and associated with the standard 8051 controller core. Included are four 16-bit counter timers, an enhanced full-duplex UART, an enhanced SPI, 256 bytes of internal RAM, a 128 byte special function register (SFR) address space and 22 port I/O. The system also includes on-chip debug hardware and interfaces directly with the analog and digital subsystems providing complete data acquisition or control-system solution in a single integrated circuit. Thus, the top application layer is associated with the sub layer associated with the ZigBee operation can provide for specific functional applications, such as sensors. For example, a thermostat could utilize an external temperature sensing device or transducer for sensing temperature and this would provide an analog output to one of the analog ports of the MCU. This is handled by the associated one of the ADCs 158 or 160 for capturing the information. This information is sensed by sampling the portion with the associated ADC and then transmitting this digital information across the antenna. The application could, for example, be set to periodically wake up, capture the information and then transmit it and then go back to sleep, to conserve energy. Additionally, there could be a mode wherein a rapid change in the temperature would cause the system to wake up. There are many applications that can be implemented; it is only noted that the application is contained within the MCU and all that is required is external sensors in order to effectuate the application such that a single chip solution is provided for all the programming necessary for the application disposed on the chip. Therefore, when the chip is powered up, all the programming will be loaded into the various registers and the system is fully functional to provide both the functionality for the operation of the application, the interface thereof with the radio and transmission of that data to a central location.

Figure 12:
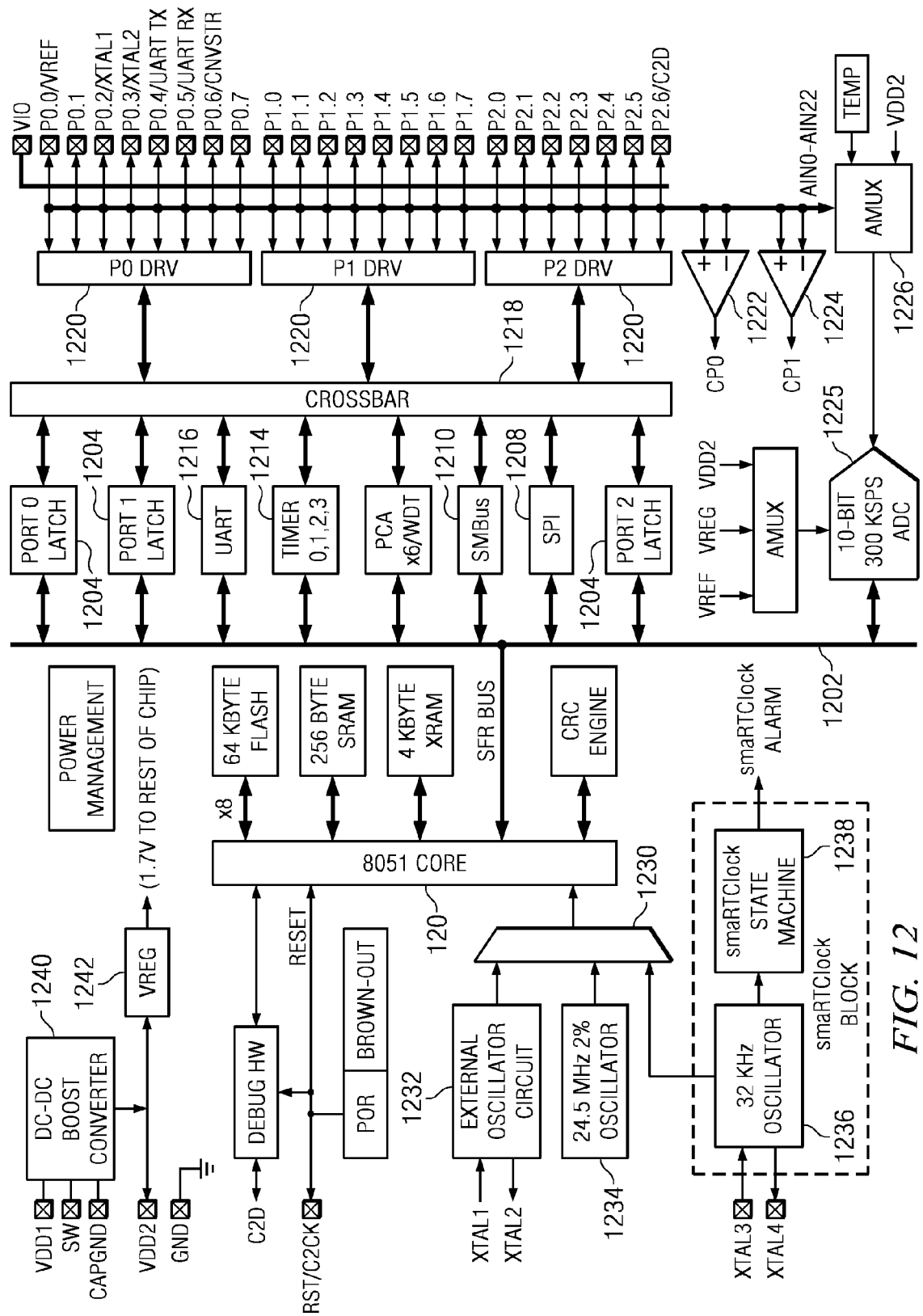
FIG. 12 illustrates a diagrammatic view of the MCU.

Referring now to FIG. 12, there is illustrated a diagrammatic view of the MCU system. At the heart of the MCU system is the 8051 processor core 120. This is connected to a system bus 1202 which allows the 8051 core 120 to interface with various special function registers (SFR) and to various peripherals such as port latches 1204, the serial peripheral interface (SPI) 1208, a SMBus lock 1210, a timer block 1214, a UART 1216 and various other peripheral blocks (not shown). Each of these is interfaced between the SFR bus 1202 and a crossbar block 1218. The crossbar block 1218 is a programmable crossbar that allows each of the peripheral functional blocks to be interfaced to select ones of the data ports. There are illustrated a plurality of port drivers 1120 associated with data ports, the data ports operable to be configured as digital input/output data ports or analog input ports. When configured as analog input ports, the analog input can be provided as input to one of two comparators 1222 and 1224 or an analog multiplexer 1226. The output of the analog multiplexer 1226 is input to an analog-to-digital converter 1225, the output of which is interfaced with the bus 1202.

There is provided a clocking section which is comprised of multiple clock blocks that are selected by multiplexer 1230 for selecting the system clock that runs the core processor 122. The source can be from an external oscillator circuit 1232, which interfaces to external crystals, to an internal precision oscillator 1234, which requires no crystal or to a low frequency 32 KHz oscillator 1236, this either configured as a crystal oscillator or, alternatively, as a free running oscillator. This oscillator 1236 is operable to operate in a sleep mode, and associated with that clock is a state machine 1238 which provides various alarms and the such that can be serviced by the rest of the circuitry when it is in the sleep mode, i.e., in the low power or power down mode.

The power is provided via a boost converter 1240 to allow for higher voltages than that associated with the input battery or $V_{DD}$. This can essentially raise the voltage. Alternatively, the voltage can be directly input thereto. The output of the boost converter 1240 or the direct input is regulated by regulator 1242, this is on on-chip regulator. Again, this is described in detail in U.S. Pat. No. 7,171,542, with the boost converter 1240 described in U.S. patent application Ser. No. 11/618,433, filed Dec. 29, 2006, and entitled "MCU WITH ON-CHIP BOOST CONVERTER CONTROLLER," which is incorporated herein by reference in its entirety.

Figure 12A:
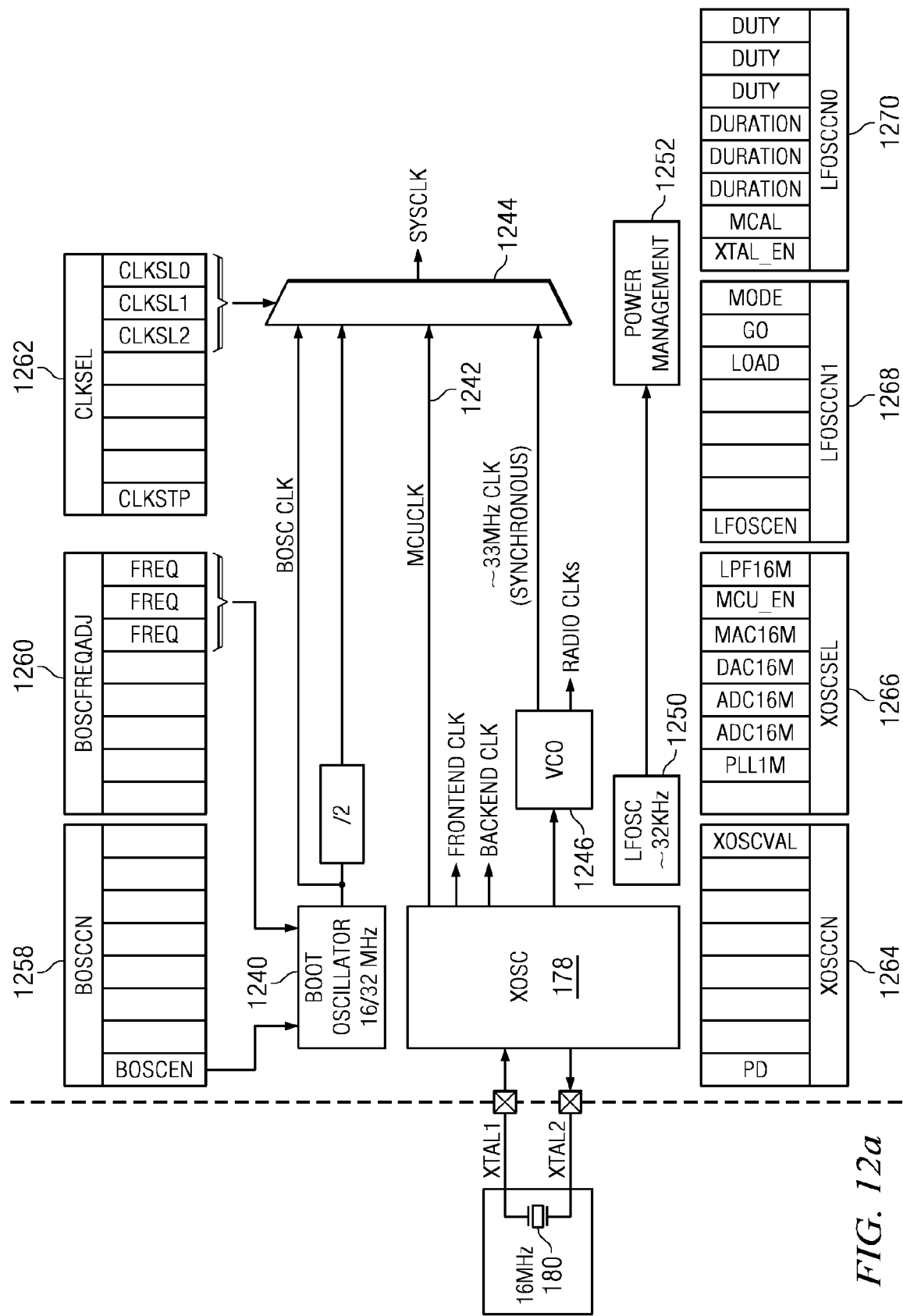
FIG. 12a illustrates a diagrammatic view of the clock generation portion of the MCU.

Referring now to FIG. 12a, there is illustrated a detail of the oscillator section. As described herein above, the stable clock signals are provided with the crystal oscillator 178 that is interfaced with an external crystal 180. This is a 16 MHz crystal, such that an MCUCLK signal is output on a line 1242 to provide a 16 MHz MCU clock signal. This is input to a multiplexer 1244 which provides the system clock output. Additionally, there is provided an onboard VCO 1246 that will be utilized in the frequency synthesizer for the RF section. This generates the local oscillator frequencies necessary for down- and up-conversion of the received and transmitted signals, respectively. This is the voltage control oscillator that operates as part of a phase lock loop utilized in the crystal oscillator 178 as the reference frequency. One output of the VCO is a synchronous 33 MHz clock which is also input to the multiplexer 1244 for use as one of the system clock signals. A boot oscillator 1247 is provided that operates at either 16 or 32 MHz, which is operable to turn on faster than the crystal oscillator during power up. This provides both a boot oscillator clock output and a divided down clock output for input to the multiplexer 1244 such that, upon selection thereof, the appropriate system clock signal can be provided. In addition, there is provided a low frequency oscillator 1250 that operates at 32 kHz. This provides a clock signal to a power management block 1252. During the sleep mode, this clock can operate at a very low power and provide a timing signal to the various timing blocks therein for wake up purposes, etc.

The clocks are controlled by various SFRs. The boot oscillator 1247 is controlled by a boot oscillator control SFR 1258 that has an enable bit therein which, if at a logic "0" powers on the boot oscillator and, if at a logic "1" powers down the boot oscillator. A boot oscillator frequency adjust 1260 sets the frequency value for the oscillator with the three least significant bits. A clock select SFR is operable to control the multiplexer 1244. The most significant bit provides a clock stop operation that stops the clocks and requires an external pin wake up for one of the counters in the power management block 1252 reaching zero to restart the clocks. The two least significant bits determine the input that is selected for the SYSCLK output, bits 2 and 3 provides a divide function that generates one pulse for every eight external pulses and synchronizes the final pulse to the system clock and bits 5 and 4 provide a divider select for an external clock from the crossbar or timer. A crystal oscillator SFR 1264 provides for power down of the external oscillator at the most significant bit and it provides a valid bit indicating whether the external oscillator output is valid or not at the least significant bit. An external oscillator selection SFR 1266 controls which of the clocks is turned on or off. These are clocks that are other than the system clock. For example, the low pass filter operates with a 1 MHz clock and this is either turned on or off and the MCU clock can be turned on or off for the purpose of power management. There can be selected either a 1 MHz clock or a 16 MHz clock for operation of the MCU, and the DAC has a 16 MHz clock which can be turned on or off. The ADC also has a 2 MHz or a 16 MHz clock that can be selected or the clock can be turned off. This requires two bits. A phase lock loop, which is part of the VCO 1246, can also have a 1 MHz clock turned on or off, all of this divided by the bits in the SFR 1266.

There are a number of low frequency oscillator SFRs, one of which is shown as SFR 1270. This is the frequency oscillator control which sets the calibration duty cycle, the calibration accuracy and whether it is in a calibration mode or a calibration start or a self clearing mode. Additionally, the general purpose I/O (GPIO) port is also set as a port P0.4 or P0.5, this being an enable signal. Additional controls can be provided for controlling the symbol count of values. These are not illustrated.

Baseband Architecture

Figure 13:
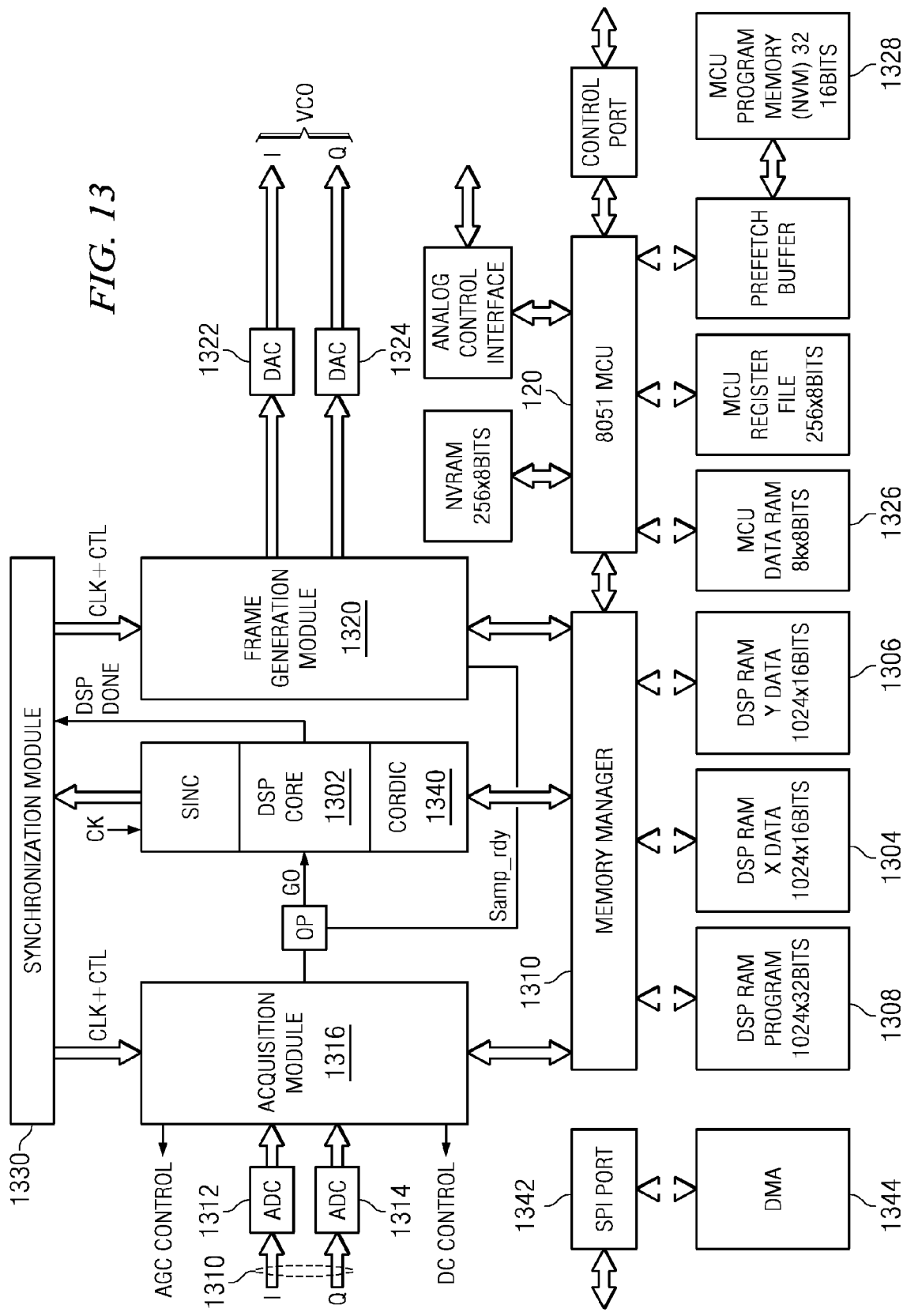
FIG. 13 illustrates a block diagram of the baseband architecture.

Referring now to FIG. 13, there is illustrated a global overview of the baseband architecture. The baseband architecture is the architecture that, on the receive side, is operable to receive the raw baseband signal on the I- and Q-channel and process it to extract the data therefrom. In the transmit mode, the MAC generates a frame of data, i.e., a 128-byte word (at maximum length) as a packet and sends it to the baseband system for the purpose of generating the data for modulating the VCO on the associated I- and Q-channels on the transmitter outlet.

The heart of the system is a DSP core 1302 which interfaces with three memory blocks, an X-data memory block 1304, a Y-data memory block 1306 and a program data memory block 1308. The memory blocks 1304-1308 are interfaced through a memory manager or arbiter block 1310. The memory manager block 1310 allows multiple devices to access the memory resources. One other resource that can access this is the MCU 120. Data can be transferred to the data blocks from the MCU during transmission or retrieved therefrom after the modulation, as will be described herein below.

In the transmit mode, the MCU 120 is operable to store data in the Y-data memory 1306. The DSP 1302 is then operable to generate the chip sequence associated with each four-bit section of the frame sequence and then a frame generation module 1320 is operable to generate the digital values associated with each half sine shaped waveform associated with each chip in accordance with a predetermined wave shape. This will be output from the frame generation module 1320 in the digital domain for both the I- and the Q-channels. They will be converted to analog values with respective DACs 1322 and 1324 for output to the VCO for modulation thereof.

The MCU 120, as noted herein above, has data RAM 1326 associated therewith in addition to the non-volatile Flash 1328. Upon boot up, it is noted that the Flash 1328 contains program instructions. This must be downloaded to the program memory 1308 for use by the DSP. This is typically facilitated through a Direct Memory Access (DMA) architecture. This allows the flash memory to be accessed without utilizing the system bus associated with the MCU operation. During operation, a synchronization module 1330 provides hardware synchronization for the overall operation of the receive mode and the transmit mode. The synchronization module 1330 is basically comprised of a 32-bit counter and comparators for generating Start/Stop signals for the various other modules and the clocks at the appropriate time, this being a hardware operation that takes some of the load off of the overall processing of the DSP 1302 and the acquisition module 1316.

The DSP 1302 has associated with some additional hardware overhead such as a Cordic 1340 which is an acronym for "Coordinate Rotation Digital Computer" which basically allows for some algorithms to be implemented in hardware. Additionally, the memory manager 1310 is accessible through a serial peripheral interface 1342 which has associated with it a small amount of RAM 1344.

In general, the baseband organization utilizes the DSP core 1302 for a number of operations therein. The DSP utilizes during the operation thereof the three memory spaces associated with the X-data memory 1304, Y-data memory 1306 and the program data memory 1308. It is noted that the program, X-data and Y-data memories can be read in a single cycle. The DSP does not include an interrupt manager module. In order to share data/command/status with the DSP, the system must write/read/data/command/status in the X-data or Y-data memory spaces utilizing the memory manager 1310. No other communication channel is provided. Each access to one of these memory spaces will stop DSP execution (if running) during a single cycle. The DSP has four memory states. The first is the IDLE state which is where the DSP waits for a "go" signal to start the program stored at address "0". The second state is the run state wherein the DSP will run until the execution of a STOP instruction results in a transfer to the IDLE state. The next state is the WAIT state wherein the DSP will wait for a single cycle during an external memory access request. For external control and monitoring purposes, the DSP has three main I/O signals which are the "go" input state wherein a pulse on this input will change DSP state from IDLE to RUN (if IDLE state preceded). The second state is the SAMP_RDY state which is an input, wherein a pulse on this input will change the state from RUN to WAIT (if RUN state exists previously), this occurring for a single cycle duration. The third external control is an output control and this is the DSP_DONE I/O signal, wherein a pulse is generated by the DSP on this line for the state transition from RUN to IDLE.

Figure 14:
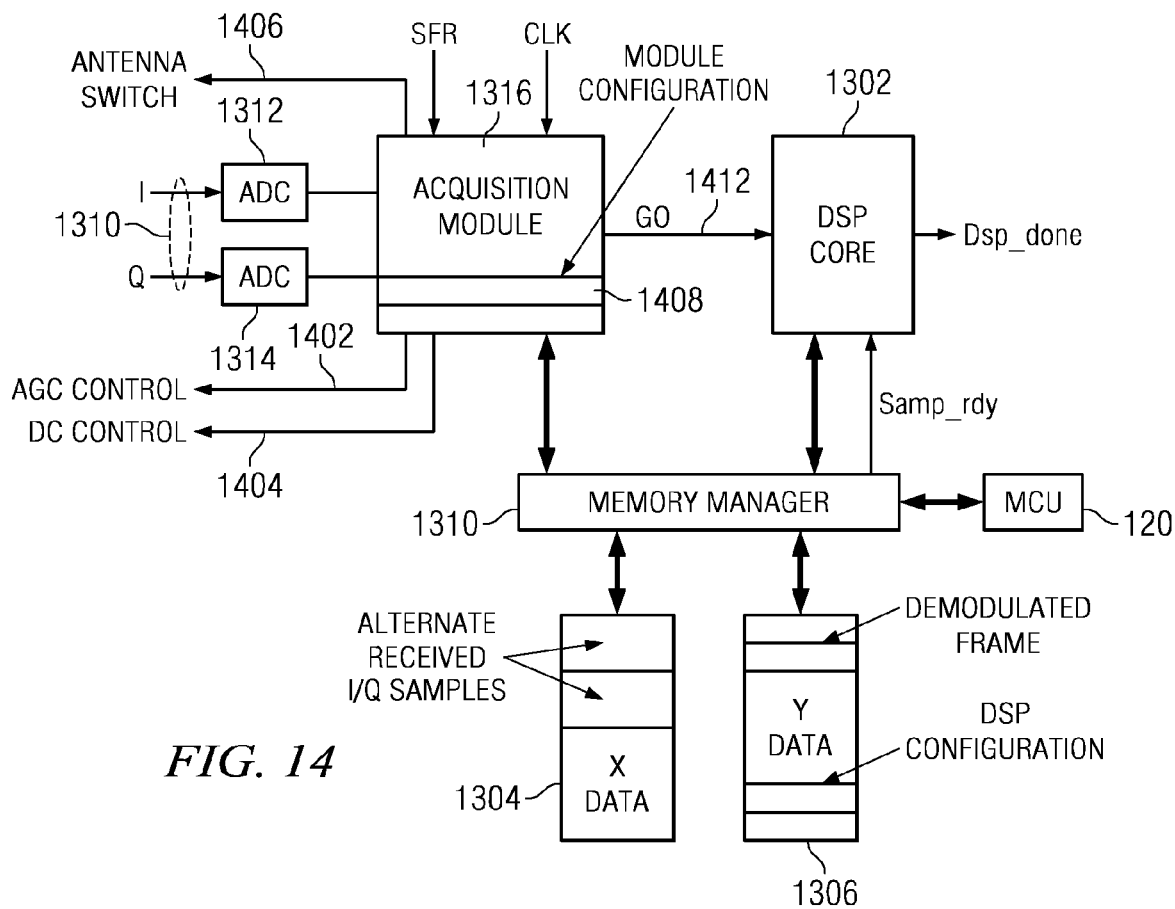
FIG. 14 illustrates a block diagram of the receive operation of the baseband architecture.
Figure 15:
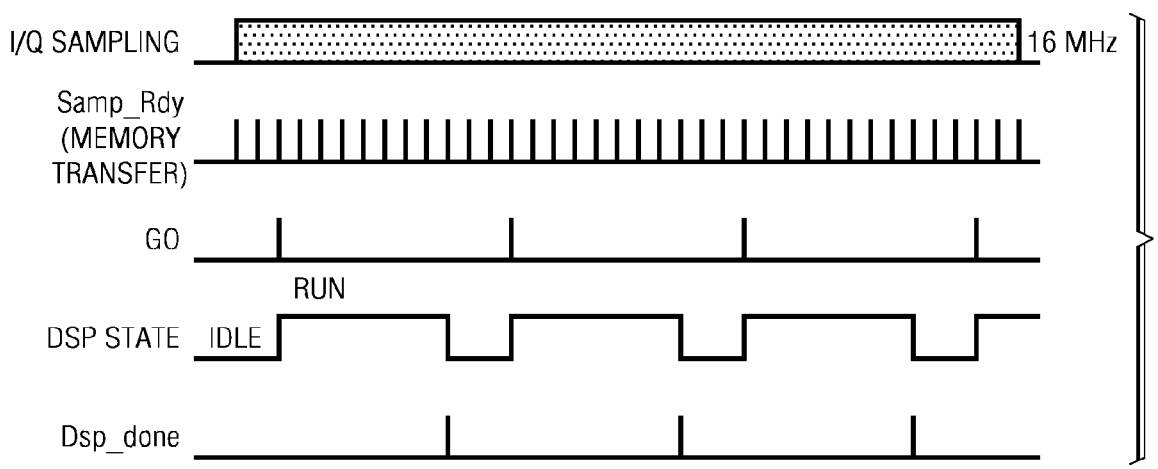
FIG. 15 illustrates a timing diagram for the receive operation.

Referring now to FIG. 14, there is illustrated a modified block diagram of the baseband architecture of FIG. 13 illustrating only the receive operation. In the receive operation, the acquisition module 1316 is operable to generate AGC controls on a line 1402, a DC offset control on a line 1404 and control the antenna switch on a line 1406 such that it is placed in the receive mode. The synchronization module provides controls for the acquisition module to initiate a receive cycle. The acquisition module 1316 is a configurable module with an area 1408 therein that is operable to store configuration information which can be altered, if desirable. The acquisition module 1316 is clocked at the 16 MHz rate and the sampling rate on the input on the I- and Q-channels 1310 also operates at the 16 MHz rate. The ADCs 1312 and 1314 sample the data and convert the samples to the digital domain to provide the digital baseband signal. The acquisition module 1316 is a hardware module that is comprised of combinatorial logic. The data is basically sampled and then stored in the X-data and Y-data memories. There are multiple buffers provided in these memories such that one buffer can be filled and then the DSP core 1302 given the signal on a line 1412 for the purpose of processing the data resulting of demodulation of the incoming data. At the same time, the acquisition module 1316 will switch over to another buffer to continue receiving the data at the same rate. The timing operation is illustrated in FIG. 15 wherein the sampling occurs at 16 MHz rate such that there are 16 samples taken for each "chip" received and then this is decimated to a 2 MHz rate. The "go" signal is generated to wake the DSP up every 128 cycles or samples, this being when the buffer is full. Memory transfer occurs at a 2 MHz rate. The DSP is initially in the IDLE state and, when the "go" signal is generated by the acquisition module 1316, indicating that the buffer is full and ready to be processed, the DSP will change the state to the RUN state. The purpose for this is to allow the hardware to do the acquisition, fill the memory and only allow the DSP to operate the minimum amount of DSP clock cycles that are required in order to process the data. The DSP will process the data until all of the data is processed. It is important that the DSP process all of the data in the memory prior to a next buffer being full. The DSP 1302 must operate at a sufficient clock speed to complete such processing in the appropriate amount of time. Once the buffer is processed, the DSP will be returned to the IDLE state and wait for the next Buffer Full rate. The DSP 1302 generates an interrupt to the MCU 120 which will allow the MCU 120 to extract the demodulated data from storage. Thus, the acquisition module 1316 continually fills the buffers and flips to another buffer when one is full, and then indicates to the DSP core that a particular buffer is full, such that the DSP core 1302 can then process that data through the demodulation algorithm. When the DSP has completed its task, it indicates to the MCU 120 that it can extract the demodulated data.

Figure 16:
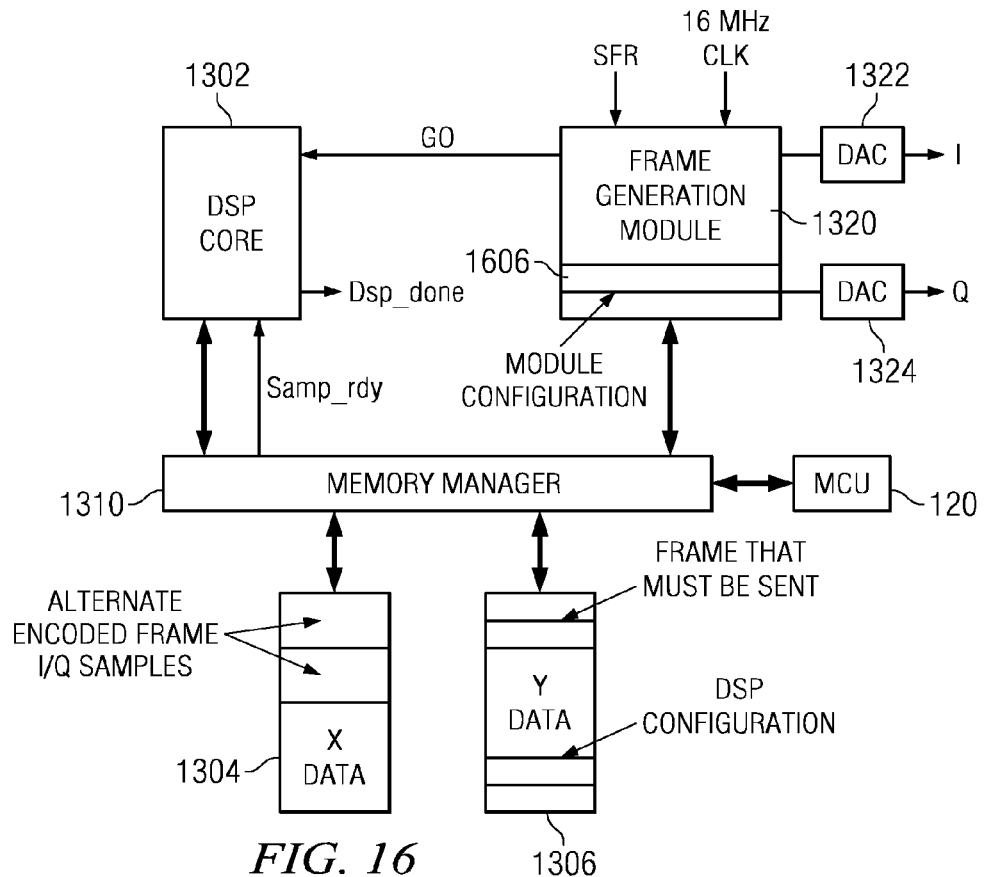
FIG. 16 illustrates the transmit operation for the baseband architecture.

Referring now to FIG. 16, there is illustrated a diagrammatic view of the transmit portion of the baseband module. In this operation, the MCU 120 is operable to store in a location in the X-data or Y-data memory 1304 and 1306 a frame of data, which frame of data is restricted to a maximum of 128 bytes. This is part of the MAC operation that is implemented in the MCU 120. Once the data has been input, i.e., the frame buffer is full, the synchronization module receives a signal from the MCU 120 and then starts the designated task in the frame generation module 1320, which will then provide a signal to the DSP core 1302 that it is to switch from the IDLE mode to the RUN mode. In general, as will be described in more detail hereinbelow, the frame generation module has associated therewith a plurality of tasks that are carried out in hardware. The memory transfer operates such that the frame of data stored in the memory by the MCU 120 is accessed by the DSP core, processed in sequence to convert each one of the four-bit sections of the frame to a symbol, do a lookup and convert it to the associated 32-bit chip sequence, 16 chips for the I-channel and 16 chips for the Q-channel. These are stored in the memory in an alternating fashion. The frame generation module 1320 then accesses the chip sequence stored in the memory and utilizes a shaping block or algorithm to create the shape for each of the chips, this being a half sine shape. This is a pre-stored shape value that is configured in a configuration area 1606 in the frame generation module 1320.

Figure 17:
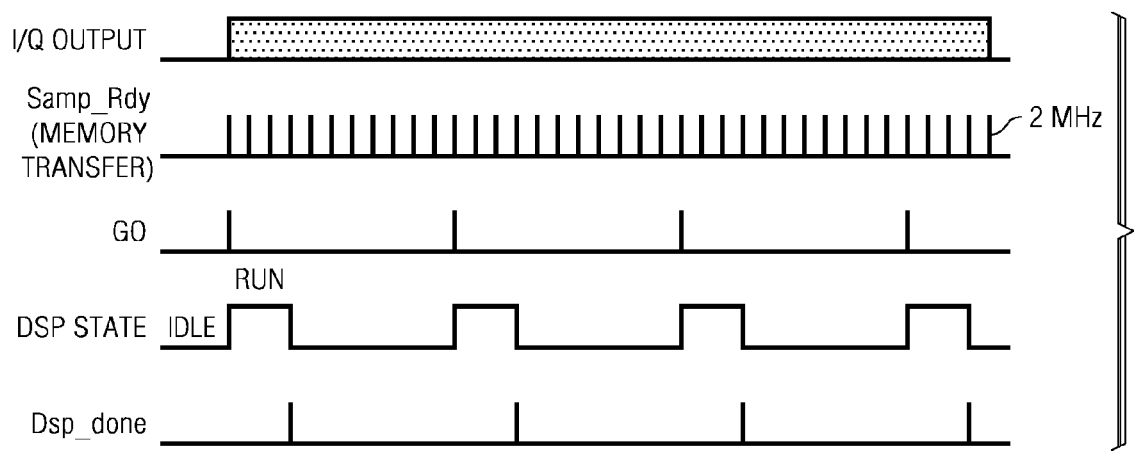
FIG. 17 illustrates a timing diagram for the transmit portion of the baseband architecture.

Referring to FIG. 17, there is illustrated a timing diagram depicting the operation of the transmission operation.

Figure 18:
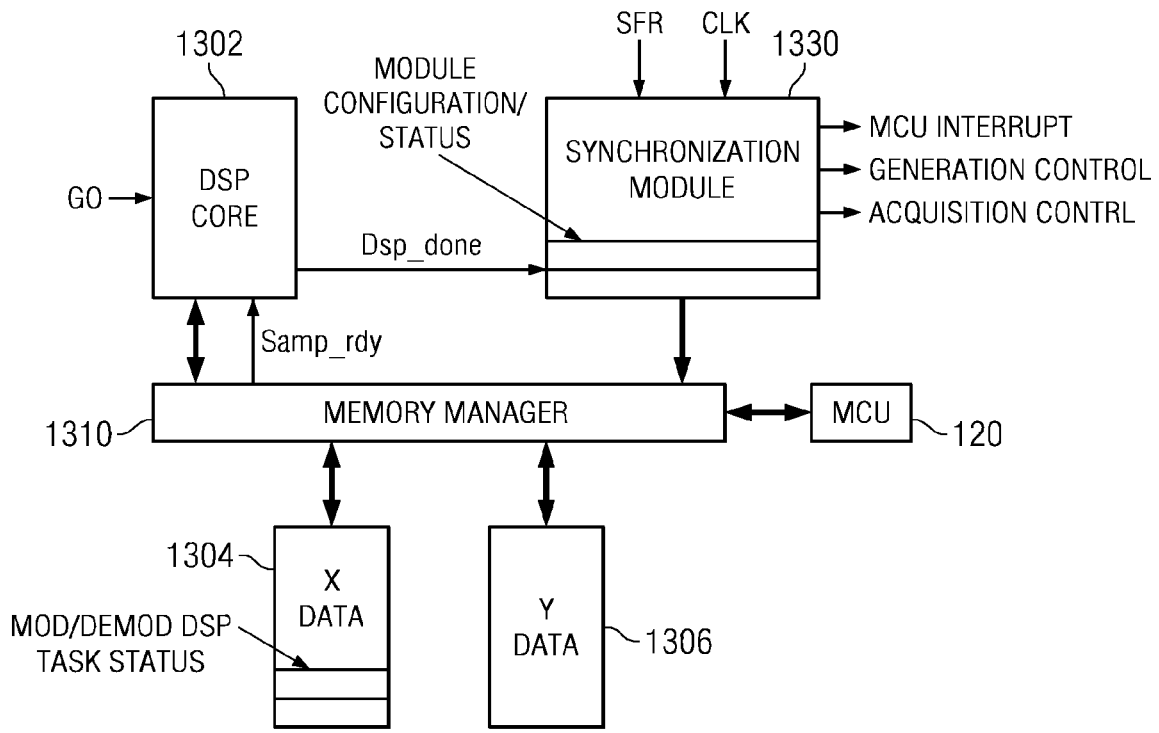
FIG. 18 illustrates the interface of the DSP with the synchronization module.

Referring now to FIG. 18, there is illustrated a diagrammatic view of the operation of the synchronization module 1330. The synchronization module 1330 is operable to receive the DSP_DONE signal and generate the MCU interrupt, the generation control and the acquisition control, such that it controls all of the operations thereof. This module will start and stop the acquisition module according to synchronization constraints, start and stop the frame generation module according to synchronization constraints, and interface with the memory management unit to read the X- or Y-data RAM to determine DSP status. This DSP status stored in a location in the RAM and controls the interrupt generation.

Figure 19:
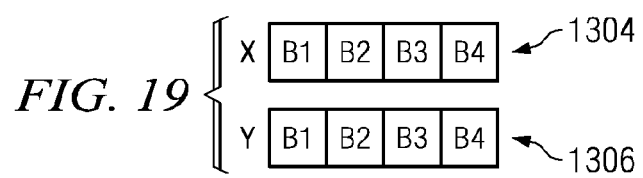
FIG. 19 illustrates a diagrammatic view of the buffers during the receive operation.

Referring now to FIG. 19, there is illustrated a diagrammatic view of the memory buffers in memories 1304 and

1306. As will be described herein below, during the symbol synch and start up procedure for the modulator in the modem, there are provided four buffers for both the I- and Q-channels which are stored respectively in the X-data memory 1304 and the Y-data memory 1306. The buffers are labeled B1, B2, B3 and B4. The purpose for this, as will be described herein below, is to allow the algorithm to look at historical data, while the earliest buffer is being written over with new information. It should be understood, however, that more buffers could be utilized. The acquisition module 1316, in general, continually samples the data at 16 MHz, decimates it down to a 2 MHz sampling rate and stores it in memory at that 2 MHz rate. Thus, samples are continually being stored into one buffer, an indication being provided to the DSP that the buffer is full and then data is stored in the next sequential buffer. This continues up to the highest order buffer and then goes back to buffer B1.

Figure 20:
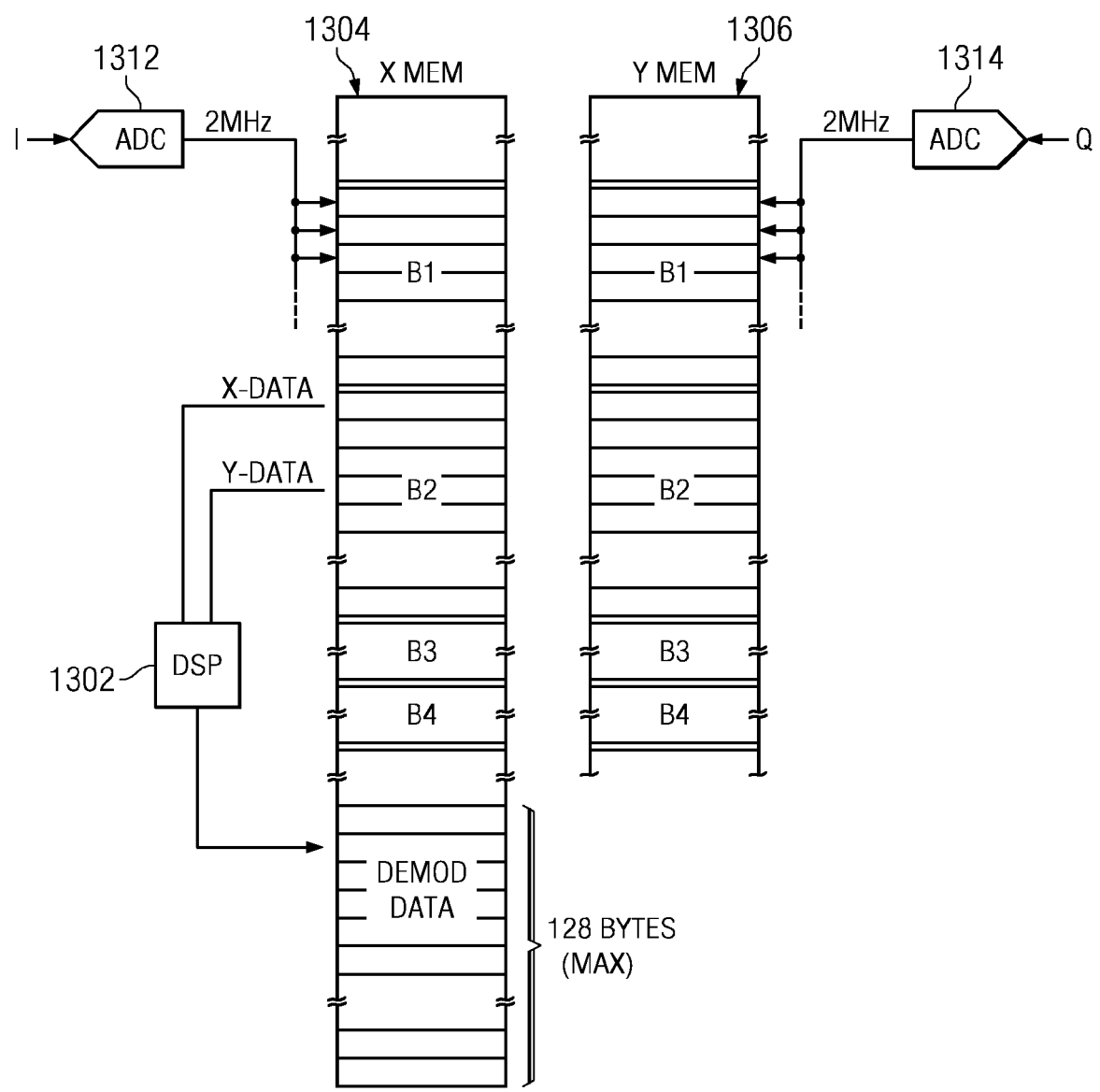
FIG. 20 illustrates a further detail of the operation of the buffers.
Figure 21:
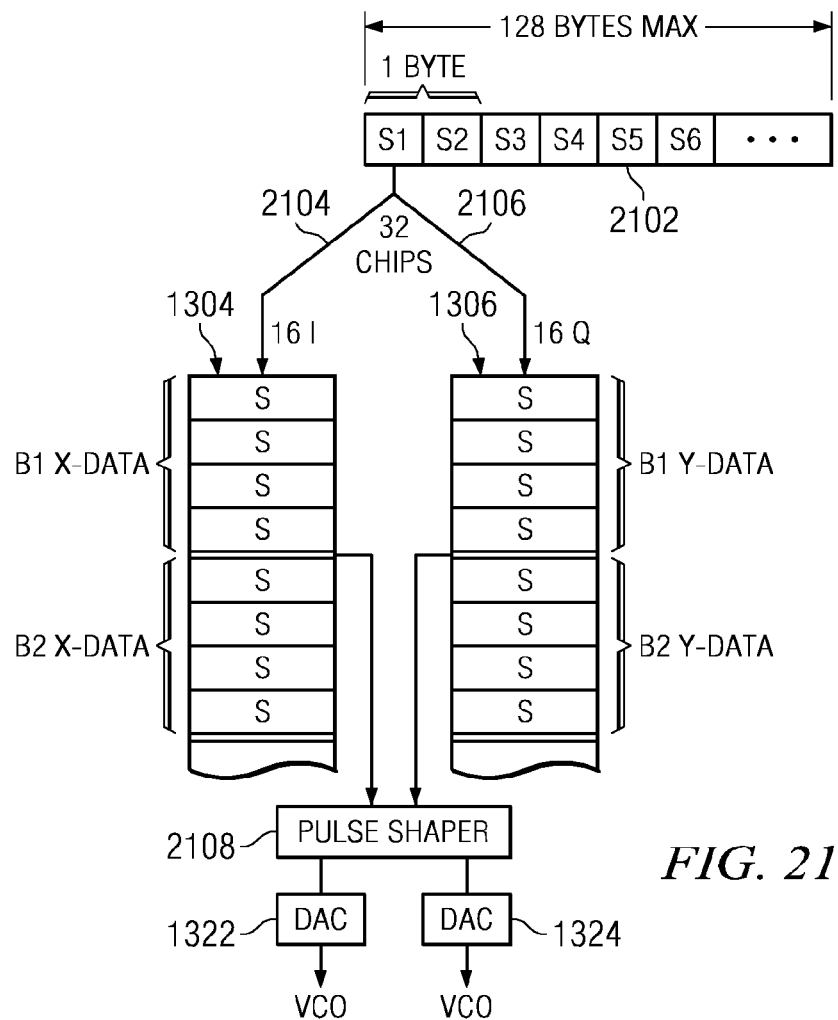
FIG. 21 illustrates a diagrammatic view of the memory buffers utilized during the transmit operation of the radio.

Referring now to FIG. 20, there is illustrated a more detailed diagrammatic view of the memories 1304 and 1306. In the X-data memory 1304, it can be seen that there are provided four different regions for buffer B1-B4. Each of the X-data and Y-data memories is 16 bits wide with the ability of each buffer to hold 128 samples. The memory is loaded, as noted herein above, at a 2 MHz rate. Such that the data is loaded at that rate. Once, for example, B1 is full, the next sample of data will be stored in the first row of buffer B2, while at the same time generating a control signal to the DSP to begin demodulating the information in B1. The timing diagram for this was set forth in FIG. 15. It can be seen that the DSP is required to complete the processing of this data before buffer B2 is filled. This operation, as will be described hereinbelow, comprises the operations of detecting the presence of data on the channel, performing a symbol sync and then demodulating the data. Once the demodulated data is determined, it is stored in a portion of the X-data memory 1304 (or the Y-data memory 1306) as demodulated data. A complete frame of demodulated data will constitute 128 bytes maximum in length. After the data has been fully demodulated, an interrupt is sent to the MCU such that the MCU 120 can then access this portion of the memory. It should be noted that the length is variable and the first byte demodulated comprises the length of the packet. Thus, once the first byte is demodulated after synchronization, the resultant bytes for the rest of the packet are demodulated, after the last of which, the interrupt is generated and the receive operation is terminated Referring now to FIG. 21, there is illustrated a diagrammatic view for the transmit operation. In the transmit operation, the MCU 120 performs the MAC operation, which is primarily realized in software. This MAC operation is operable to generate the packet of data. As noted herein above, the first portion of the data packet comprises the synchronization information. This is approximately 4 bytes in length. Once the 128 maximum length packet has been generated, it is stored in a frame buffer in the Y-data memory 1306, for example. However, it should be understood that the frame buffer can occupy any portion of the memory.

Once the data is generated, it is then necessary to parse the data into symbols. Each symbol will essentially be 4 bits long or a nibble. Therefore, each byte will be divided into two symbols. Each of these symbols must then be converted into the 32-chip representation associated with the pseudo random sequence. This is basically a table look-up operation. The odd and even chips are then designated for either the I-channel or the Q-channel. This is basically the spreading operation. This is facilitated with the use of the DSP.

Referring back to FIG. 21, the frame buffer is represented by reference numeral 2102. This is 128 bytes maximum in length with a plurality of sequential symbols generated in the parsing operation. It can be seen that two symbols comprise a single byte. Each symbol is operated on by the DSP to spread the symbol into 32 chips, each chip being represented by a half sine shape wave form. The 32 chips are then divided into the even chips along a path 2104 and the odd chips are arranged along a path 2106. Path 2104 provides the 16 chips for the I-channel and path 2106 provides the 16 chips for the Q-channel.

There are provided two buffers, a B1 buffer and a B2 buffer, for the transmit operation. Each of these buffers comprises an X-data portion and a Y-data portion. Since each of the buffers stores 16 chips, represented by either a logic "1" or a logic "0" value, only 16 bits are required for the width of the buffer. Each buffer is operable to store four symbols, this value being for organizational purposes, it being understood that the depth of a buffer could be larger. Thus, the first four symbols will be stored in the B1 buffer and the second four symbols will be stored in the B2 buffer and so on. The buffers will then alternate as will be described herein below.

The first operation is to push data into the buffers from the DSP during the spreading operation. The second operation is to extract the data from the buffers, i.e., the chip representation of the symbols, and input it to a pulse shaper 2108 which is operable, for each of the I- and Q-channels, to go to a programmable look-up table, the region 1606 in FIG. 16, and extract the digital values that uniquely define the shape of a "1" or a "0" chip. These values are then output to the respective DACs 1322 and 1324 for output to the up-conversion path. In the alternating configuration, data is input to one buffer from the DSP while the pulse shaper 2108 is extracting data from the other buffer. Once the pulse shaping operation is complete with the four symbols in the accessed buffer, then a control signal is sent to the DSP that this buffer is now free and the next four symbols can be spread and stored and the chip representation of the four symbols stored therein while the pulse shaper then alternates to the other of the buffers.

Figure 22:
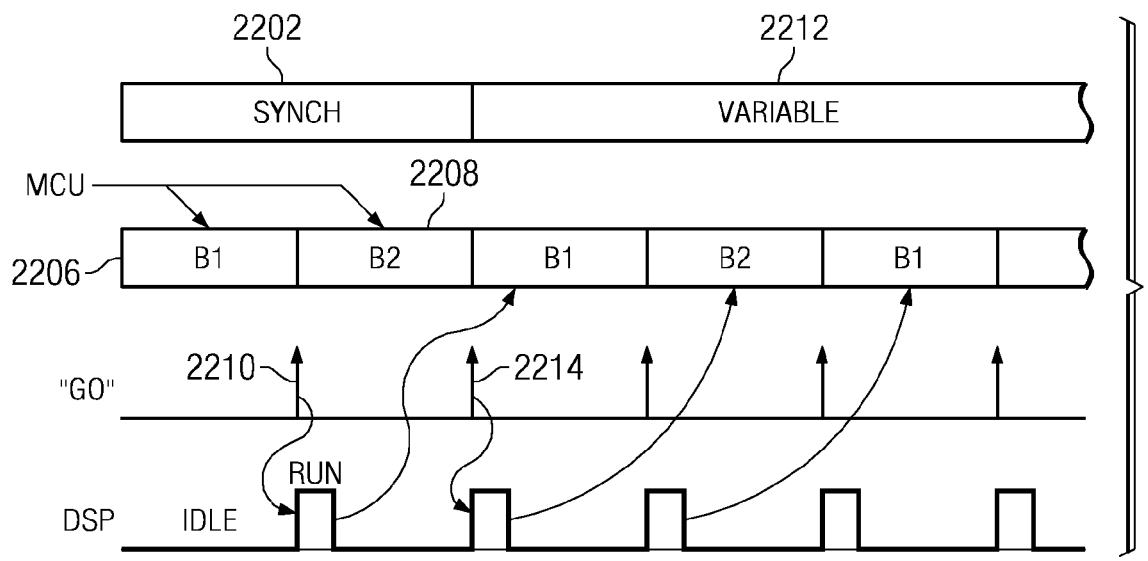
FIG. 22 illustrates a timing diagram for the buffer transfer operation during transmit.

Referring now to FIG. 22, there is illustrated a diagrammatic of a packet of data and its relationship to the buffers. Initially, there is provided a synch field 1202 which is basically unvarying. This synch field is the information that is embedded in the data packet that precedes the "payload" or data that is being sent from one node to another. This allows a receiving node to recognize the packet and determine where the start of the data begins. This should be distinguished from symbol synchronization, which will be discussed in more detail hereinbelow.

Since this synch field is pre-defined, it is not necessary for the DSP to perform any type of look-up. Rather, the MCU 120 loads the values of the synch portion in the first two buffers, since the synch portion comprises eight symbols. However, this could be any length for any other application, noting that the 802.15.4 standard defines the length in this example. Thus, the transmit operation will be initiated when the MCU has generated the frame, stored it in the frame buffer, and stored the chip representation of the synch portion 1202 in the transmit buffers followed by a signal sent to the synchronization module to initiate the operation embodied by the frame generation module. Of course, the operation could be that the DSP will generate the chip representation for the synch portion, but this would unnecessarily consume power to run the DSP.

In the transmit operation, when the MCU 120 has generated the packet (128 bytes maximum in length), a start signal will be sent from the MCU 120 to the synchronization module 1316, which will then initiate operation of the frame generation module 1320 to access the first buffer, the B1 buffer, represented by reference numeral 1206. This is basically the first four symbols. These will be pulse shaped and sent to the up-conversion path. Once all of the symbols have been processed, a control signal, the "go" signal, will be generated to the DSP. It is important to note that the DSP could not operate on the other buffer, the B2 buffer, because it has already been populated with the chip representation of the synch signal 1202. Therefore, the first time it can run is when the first four symbols in buffer B1 have been processed and then the buffer B1 is available. At this time, the control signal 2210 will cause the DSP to transition from an IDLE mode to a RUN mode. This will result in processing of the next four symbols after the synch portion 1202 for the spreading operation for storage in the B1 buffer, i.e., the DSP will access the chip table to determine the 32-bit chip representation for each of the 4-bit sequences representing a symbol and store them in the buffer B1. The portion after the synch field 1202 is the variable portion, a portion 2212, representing the payload or data portion. Once the first buffer, B1, is filled, the DSP will transition to the IDLE state and then generate a signal DSP_done indicating that the operation is complete. The frame generation module, during this period, is executing a task and processing the information in the B2 buffer 1208, after which time it generates another control signal 2214 to then indicate to the DSP that the B2 buffer is now empty, after which time the next 4 symbols in the data portion 2212 are accessed and processed and the chip representation thereof stored in the B2 buffer. This continues onward until the last of the symbols in the packet has been processed. Of course, the MCU 120 provides an indication of the length of the packet or, alternatively, the value stored in the first byte in the variable portion 2212 can be examined, this providing an indication of the length of the packet.

Figure 23:
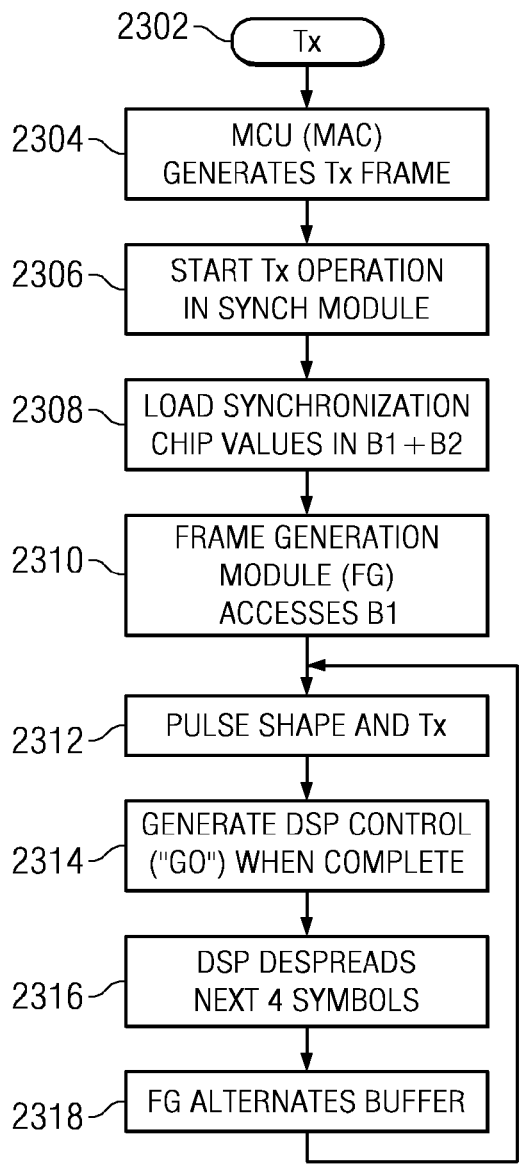
FIG. 23 illustrates an overall flow chart for the transmit operation.

Referring now to FIG. 23, there is illustrated a flow chart depicting the transmit operation in general. This is initiated at a block 2302 and then proceeds to a function block 2304 wherein the MCU (MAC) generates the transmit frame. The program then flows to a function block 2306 to initiate the transmit operation in the synchronization module. The program then flows to a function block 2308 to load the synchronization chip values in B1 and B2. Again, as noted herein above, the DSP could be utilized to generate the spreading sequence for this portion. However, this unduly utilizes DSP processing time. The program then flows to a function block 2310 wherein the frame generation module accesses the first buffer B1. This is the initial operation, noting that frame buffer B2 is full and the DSP can therefore not be operated on the contents of the frame buffer to store the spreading sequence information into buffer B2. The program then proceeds to a function block 2312 to form the pulse shaping and transmission operation. The program then flows to function block 2314 wherein the DSP control signal "go" is generated indicating that the pulse shaping operation on the particular buffer is complete, this being the B1 buffer in the first operation, such that this buffer is now available to the DSP. This indicates to the DSP, after at least the first buffer is cleared, that it can access the frame buffer, extract the next four symbols and perform the dispreading operation for storage in the available buffer. This is indicated in a function block 2316. At the same time, the frequency generation module alternates the buffer for the pulse shaping and transmission operation, as indicated by function block 2318, the output of which loops back to the input of block 2312. This continues until the last of the bytes in the packet stored in the frame generation region of the memory is processed.

Figure 24:
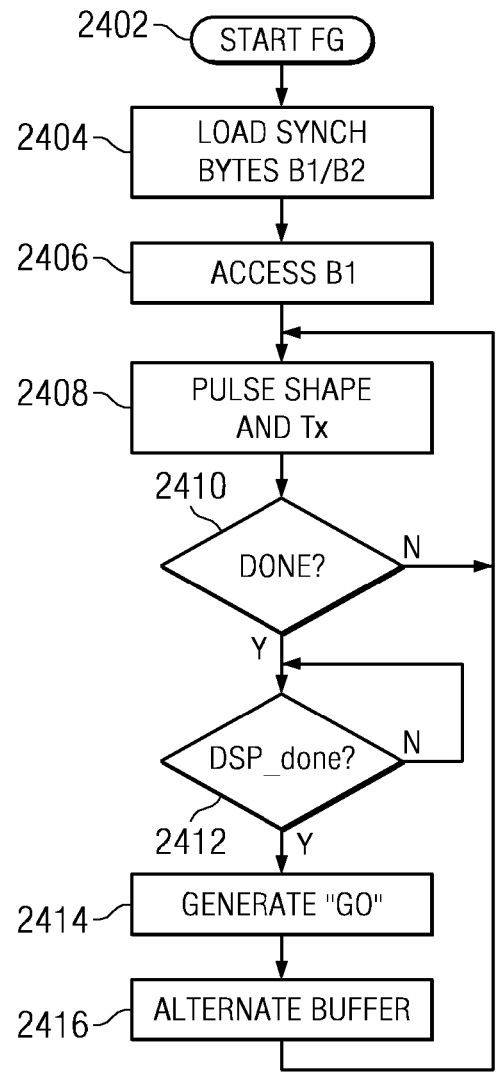
FIG. 24 illustrates a flow chart for the frame generation module.

Referring now to FIG. 24, there is illustrated a flow chart depicting the operation of the frame generation module 1320. This is initiated at a block 2402 and then proceeds to a function block 2404 wherein the MCU 120 has loaded the bytes associated with the synchronization portion 2202 into buffers B1 and B2. The program then flows to a function block 2406 to access the B1 buffer and then to a function block 2408 to perform the pulse shaping. As noted herein above, the frame generation module is a state machine. Thus, it performs predetermined tasks based upon inputs and outputs and certain events. Thus, the access operation occurs in one state of the state machine and then the system goes to the next state to do the pulse shaping operation. This pulse shaping operation, as disclosed herein above, is merely accessing a pre-stored programmable configuration area 1606 in the frame generation module 1320. The program flows to a decision block 2410 to determine if the pulse shaping is completed. The pulse shaping will continue on the particular buffer until complete, at which time the frame generation module will generate the "go" control signal, as indicated by a function block 2414. The program then flows to a function block 2416 to then shift to the alternate buffer, the one that has been filled by either the MCU or the DSP, and then back to the input of function block 2408 to begin the pulse shaping and transmission operation on that buffer.

Synchronization Module

Figure 25:
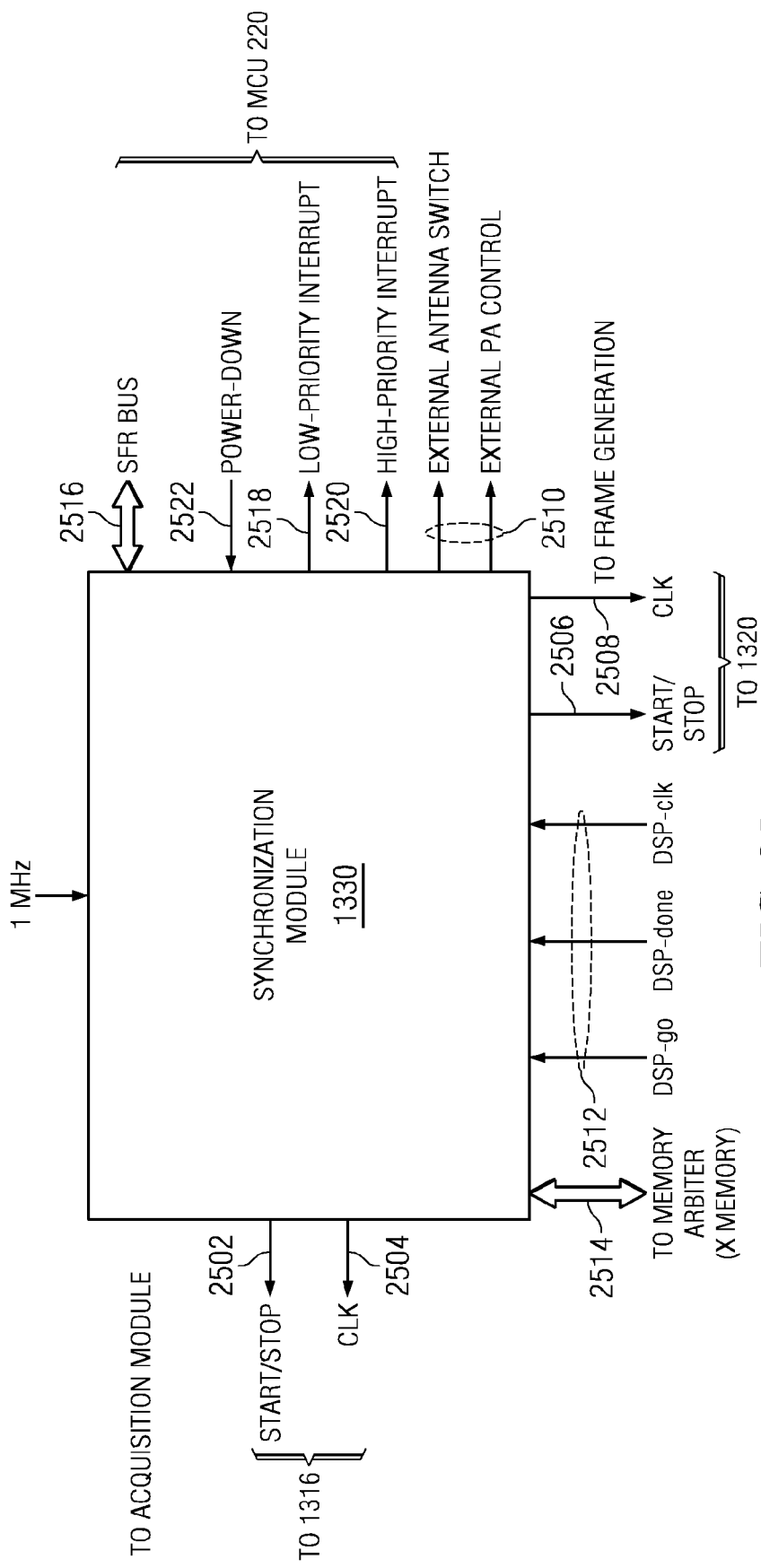
FIG. 25 illustrates a diagrammatic view of the synchronization module.

Referring now to FIG. 25, there is illustrated a block diagram of the synchronization module 1330. As noted herein above, the synchronization module 1330 is operable to provide the clock and control signals for the acquisition module 1316 and the frame generation module 1320. It is a hardware based state machine that is initiated in response to a signal from the MCU 120 and generates interrupts to the MCU 120 associated with the process. For example, during a receive operation, the acquisition module would be initiated at one point in time and, at the end of the receipt of a packet, an interrupt will be generated to the MCU 120 that the operation has been completed or even aborted as no data was available. The MCU 120 controls the radio portion and is then operable to turn the receiver off so that the transmitter can be turned on by the MCU and then the synchronization module initiates a transmission operation, for the purpose of sending an acknowledgement signal, if that is appropriate at that point in the sequence, this sequence defined by the 802.15.4 standard. The general module is organized around a 32-bit counter that operates at a frequency of 1 MHz. This clock is derived from the 16 MHz clock as compared to the VCO for the radio utilized to generate the Local Oscillator which is derived from a phase lock loop utilizing the 16 MHz clock as a reference. Thus, the 1 MHz clock is stable whereas the overall VCO can vary to accommodate the need to operate on different channels. This allows an accurate clock to be generated that is based on a crystal.

In general, the module is operable to, when utilized in an FFD, to provide periodic beacon generation. This is basically the Coordinator. It is used for back-off alignment, synchronization for an acknowledgement transmission, resynchronization for the Coordinator, MAC time out for the Coordinator, interrupt generation to optimize power management, etc. Any controls that are necessary to turn on or off the frame generation module, etc., are generated by the synchronization module. The timing constraints for any process are contained within the state machine of the synchronization module. Thus, the MCU 120 is required only to start a process and then the MCU 120 can either perform another process or it can go to sleep. Once a process is complete or close to being complete, an interrupt can be generated to either interrupt the operation of the MCU 120 or wake the MCU 120 up to allow it to perform its process, such as turning off a portion of the radio or accessing data stored in a memory for processing thereof.

The acquisition module 1316 receives a start/stop signal on a line 2502 and a clock signal on a line 2504. The frame generation module 1320 receives a start/stop signal on a line 2506 and a clock signal on a line 2508. There are also provided some external antenna and power amplifier controls on line 2510. The synchronization module 1330 also interfaces with the DSP core 1302 to receive signals that are input thereto such as the DSP clock, the output indicating that the DSP has completed its process, the DSP_done and the DSP_go. These are on lines 2512. The synchronization module 1330 also interfaces with the data memories 1304 and/or 1306 through the bus 2514. The MCU is interfaced with via an SFR bus 2516 and provides as outputs a low priority interrupt on line 2518 and a high priority interrupt on line 2520. Additionally, a power down signal during the power management operation is received on a line 2522. Thus, the synchronization module can be controlled with configuration information that is provided via special function registers via the SFR bus 2516, and the synchronization module can communicate with the MCU 120 via interrupts.

Figure 26:
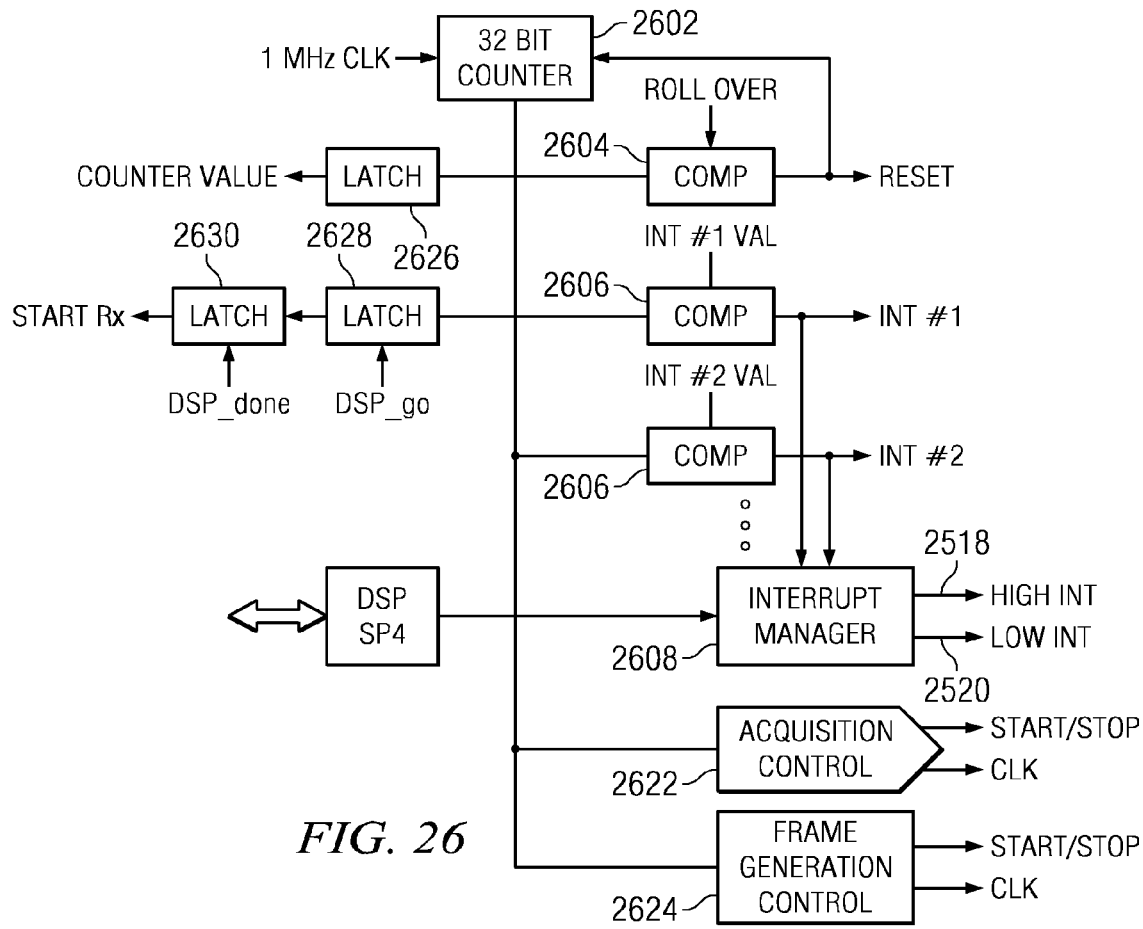
FIG. 26 illustrates a more detailed diagrammatic view of the synchronization module.

Referring now to FIG. 26, there is illustrated a more detailed diagram of the state machine defining the synchronization module 1330. A 32-bit counter 2602 operates off a 1 MHz clock. A first comparator 2604 is provided that is a rollover counter. A rollover value is programmable from the MCU 120, and is provided to determine when the counter rolls over. This provides a reset value. There are provided five CPU interrupt comparators 2606 that receive interrupt values on inputs for comparison with the counter value. When these interrupt values are reached, then the interrupt is generated. This interrupt is passed to an interrupt manager 2608 to generate the high priority and low priority interrupts on lines 2518 and 2520, respectively. When the system is receiving information, i.e., in the receive mode, an acquisition control block 2622 controls the start and stop of the acquisition and provides a clock thereto. The acquisition module 1316, as described herein above, is a hardware based system that, without the clock signal, will not operate. Therefore, clock and control signals for the operation of the acquisition module are received therefrom. This is also the case with respect to the frame generation module 1320 which receives control and clock information from a frame generation control block 2624. Again, these are hardware based state machine operations. There is also provided a latch 2626 that is operable to latch the counter value for various purposes. There is also provided a latch 2628 which is latched whenever the DSP_go signal is generated and a latch 2630 that latches the output of the latch 2628 upon the generation of the DSP_done signal. This is used to generate a receive or start value.

Figure 27:
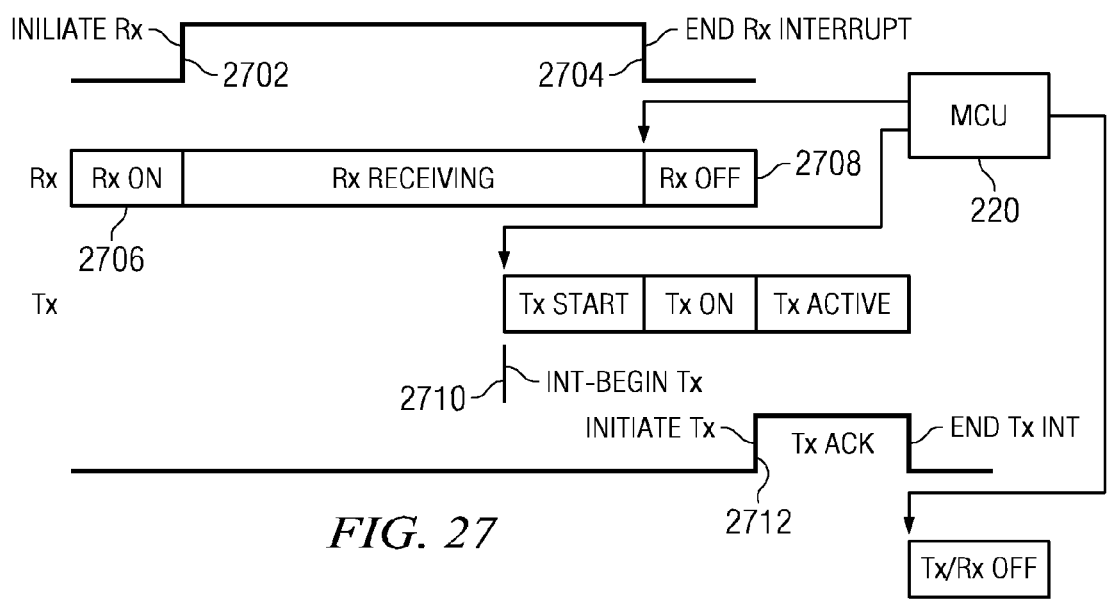
FIG. 27 illustrates a signal flow diagram for the synchronization module.

Referring now to FIG. 27, there is illustrated a diagrammatic view of one operation that is controlled by the synchronization module. The synchronization module is basically initiated at a point 2702 for the purpose of initiating control signals to the acquisition module 1316 for the receive operation. The acquisition module 1316, once initiated, will turn on and basically receive packets and store them in the X-data and Y-data memories 1304 and 1306. This acquisition operation will continue until a timer has determined that this operation is complete, at which time an end of receive will occur at a point 2704 at which time an end of transmission interrupt will be generated to the MCU. Prior to initiating the receive operation, the MCU will turn on the receiver as indicated by a section 2706. Once the receiver has been turned on and is stabilized, this being an anticipatory operation by the MCU 120, then data will be received, i.e., it will be valid data. Once the end of transmission has been indicated, i.e., no more data is being transmitted, then an interrupt will be generated. At this time, the MCU 120 will receive the interrupt and the acquisition module 1316 will have the operation thereof stopped, i.e., it will not store additional samples. The MCU 120 will then turn the receiver off, as indicated by a section 2708. However, prior to the end of the reception interrupt and the termination of the operation for a given task in the acquisition module 1316, a start operation will be initiated in the transmitter with an interrupt 2710. This interrupt will essentially begin transmission by turning on the transmitter and making sure that it is stable. The transmitter is then actually turned on when the receiver is turned off, i.e., it is now in the transmit mode. However, before turning the transmitter on, there are certain calibration operations and the such that are required for any radio. At the time the receiver is turned off and the transmitter is turned on, there will be a certain period of time wherein the transmitter is active. At this time a transmission of an acknowledgement signal is initiated at a point 2712. This point 2712 indicates when the frame generation module 1320 is started. Prior to this time, the acknowledgement signal was generated by the MCU 120 and stored in the DSP data memory for access by frame generation module and DSP core 1302 for generating the appropriate acknowledgement data packet. This acknowledgment data packet size is 5 bytes as the payload. Of course, there is also required the overhead for generating the acknowledgement signal for transmission back to the Coordinator.

At the end of the acknowledgement signal, an end of transmission interrupt will be generated for the MCU 120, at which time the transmitter and receiver are both turned off. Of course, if additional packets are required to be received or to be transmitted, the synchronization module 1330 will generate additional signals to the MCU or to the acquisition module. Again, all that is required for the MCU are the interrupts to indicate the end of a particular state or the beginning of a particular state. The MCU recognizes these interrupts and services the interrupts with the appropriate process. With the use of the synchronization module, it can be seen that the various operations of the acquisition module and frame generation module can be controlled with merely start and stop operations. Therefore, the synchronization module provides at least one state machine that is counter based and the acquisition module and frame generation module provide two additional state machines that are hardware based. All of these operate to minimize the amount of time that the MCU core 120 is operating. Thus, the acquisition module 1316 allows menial tasks to be handed off to hardware. This is also the case with respect to the frame generation module.

In one mode of operation, there is provided the ability to operate with a beacon. IEEE Standard 802.15.4 allows the implementation of such a superframe structure. This feature is managed by the Coordinator, which Coordinator is an FFD with network device functionality that is capable of providing synchronization services through the transmission of periodically recurring beacons and the creation of the superframe structure. Each beacon contains information that will assist network devices to synchronize to the network. This information includes a network identifier, a beacon periodicity, and superframe structure. The superframe is divided into 16 contiguous time slots, the first time slots beginning at the beginning of the beacon frame.

Network devices that wish to communicate with the Coordinator must attempt to do such in the time between two successive beacons. This period of time is called the contention access period (CAP). To communicate with the Coordinator, each network device is required to access the channel using a CSMA-CA. The Coordinator can assign dedicated portions of the superframe to a specific network device requesting it. These segments of time are called guaranteed time slots (GTSs). This capability supports applications with a particular bandwidth requirement or needing lower communications latency. GTSs are all grouped toward the end of the superframe wherein this time between beacons is the contention free period (CFP).

In beacon based systems, the network will be referred to as a beacon-enabled network. This is typically a star network which requires a network device wishing to send data to the Coordinator to listen for a beacon, i.e., the beacon must first be detected before additional processing can occur, i.e., send information to the Coordinator or receive information therefrom. If a GTS has not been assigned to a particular device, the device will transmit its data frame in the contention access period in accordance with CSMA-CA procedures. If, alternatively, the device has a GTS assigned, it waits for the appropriate point within the superframe structure to transmit its data frame. After receiving the data frame, the Coordinator sends back an acknowledgement to the network device, at which point the data transfer is completed. This will be described in more detail herein below.

When the Coordinator has data pending to be transmitted to a network device, it sets a special flag in its beacon, i.e., it places its address in the data packet transmitted in the beacon. Once the appropriate network device detects that the Coordinator has data pending for it, it then sends back a data request package. Then the Coordinator responds with an acknowledgement followed by a data frame. The transaction is completed by an acknowledgement sent from the network device.

In order to associate with a particular network, a network device will perform an active or passive channel scan and then issue an association request to a Coordinator, if one is found. Depending upon the capabilities and the requirements of the application controlling the Coordinator, this Coordinator can accept or reject the association request with the appropriate response.

The MAC of the requesting device will then send an association command that is acknowledged by the Coordinator which merely acknowledges receipt of the packet. After receiving the association request, the Network Layer of the Coordinator then needs to determine if it has sufficient resources to allow another device in its network. The Coordinator needs to make this decision in the time specified or the requesting device will declare a time out.

An important feature of the association process is the ability to request a short 16-bit allocated address to the Coordinator. This enables better bandwidth utilization since it reduces the total length of a packet (16-bit as opposed to 64-bit addresses). If the associating device does not request a 16-bit address allocation, the device will participate in the network using its extended 64-bit unique address.

As noted herein above, the superframe enables the implementation of the GTS, noting that a single GTS can extend over one or more superframe time slots. The management of GTSs is performed only by the coordinator, which controls how many of the 16 available time slots are assigned to the contention-free period (the rest are assigned to the contention access period). The Coordinator may allocate up to seven GTSs. The GTS allocation/deallocation mechanism can be initiated by the network device or by the Coordinator. At reception of the GTS request message, the Coordinator determines if space is available within the superframe structure based on the remaining length of the contention period and the number of time slots requested. When the Coordinator is responding to a GTS request, it will generate a beacon with its GTS fields indicating the time slot allocated and the number of slots assigned. In general, the operation of association and disassociation is set forth in the 802.15.4 Standard.

Synchronization control with a Coordinator is achieved with the use of various primitives. A first synchronization primitive allows a network device to search for beacons in a beacon-enabled network or to poll for the Coordinator for any pending data in a non-beacon-enabled network. The search process initiated with a synch request which is facilitated by activating the radio receiver and waiting, for a given amount of time for a beacon frame to arrive from the Coordinator. In a beacon-enabled network, the search for beacons can be performed in one of two modes: a mode in which the MAC of the network device will continuously track the Coordinator beacons; or a mode in which the MAC will locate the beacon only once. In both cases, if a beacon is received indicating data pending for a receiving network device, it will send a data request command to the Coordinator. In a non-beacon-enabled network, the Poll request will cause the MAC of the network device to generate a data request command to poll the Coordinator for any pending data. In the event of a loss of synchronization with the Coordinator, the MAC will generate a loss indication. The possible situation that can cause a loss of synchronization event are 1) Beacon lost—which indicates that the beacon message has not been received after the synchronization request; 2) Coordinator lost—which is a result of failure to communicate after several attempts; 3) Network ID conflict—resulting from two different Coordinators of the same ID being in range of the network device; and 4) Realignment—which indicates that the network device received a Coordinator realignment command message from the Coordinator.

For non-beacon-enabled networks, a network device will utilize the polling primitive to poll the Coordinator for pending data at the discretion of the network device. After the polling request has been transmitted, the MAC will generate a confirmation to the network layer with the results of the polling procedure.

Figure 28:
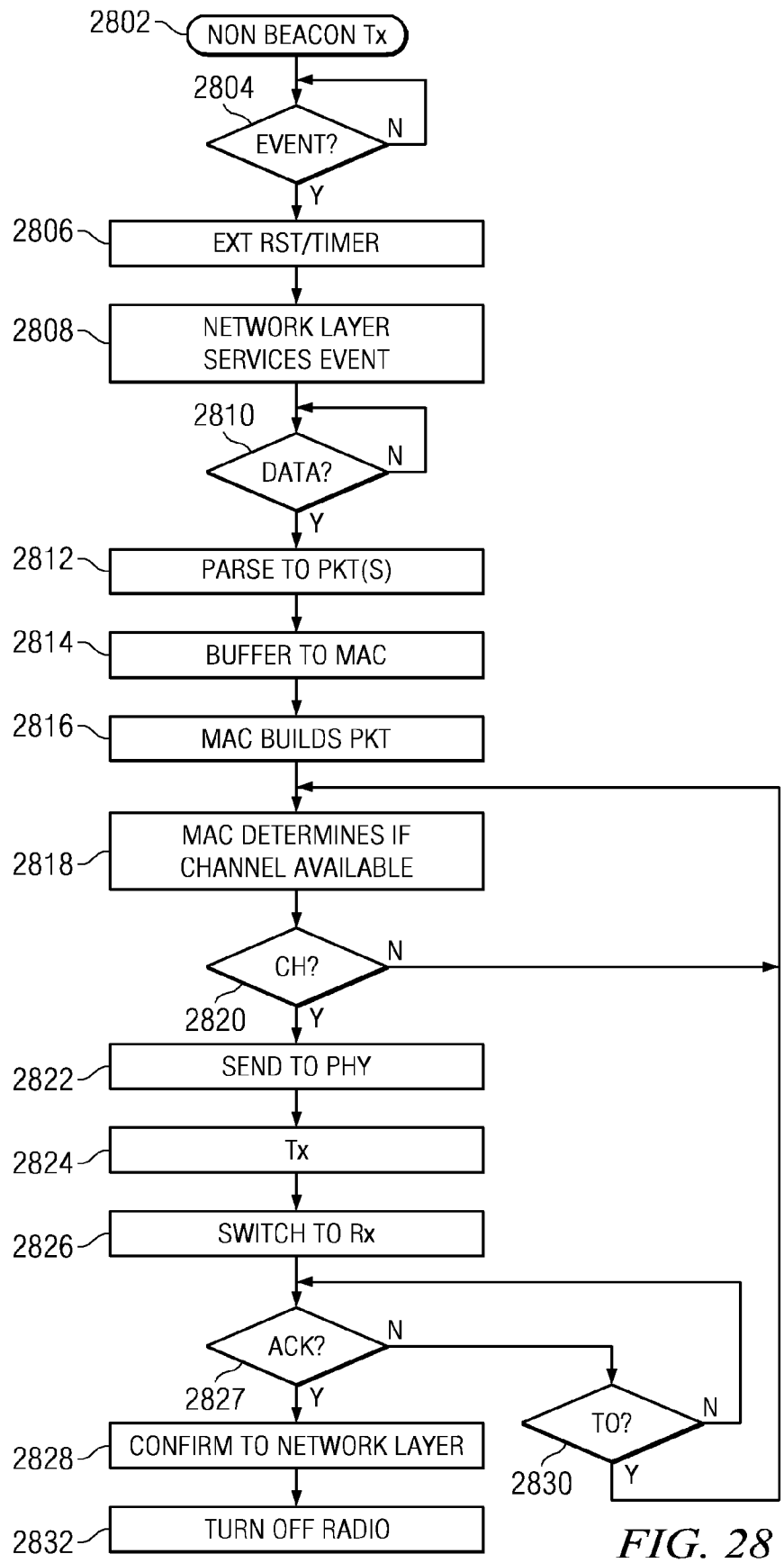
FIG. 28 illustrates a flow chart for operation of the RFD in the non-beacon mode for transmission.

Referring now to FIG. 28, there is illustrated a flow chart for one application requiring transmission of the data from the baseband module. This is a non beacon operation wherein the RFD transmits data based upon an application running local to the RFD to an FFD, this being the Coordinator. The Coordinator will typically be a part where power is not a concern. Thus, it is on all the time and is constantly "Sniffing" the channel. Since there are a plurality of RFDs in a network, the Coordinator must have listened to each of these RFDs for the transmission of data therefrom.

Data is transmitted based upon the occurrence of some type of event. There will be some type of application running local to the single chip radio that will require the radio to transmit data. The radio is typically in a power-down mode, i.e., it is in a sleep mode, prior to being required to transmit data. An external reset will be received for this purpose. This application can be actually contained within the operating system of the MCU 120, depending on the power thereof and the memory associated therewith. However, a separate application chip could be provided for running an application such as a thermostat. This additional part could perform all the operations of the thermostat, i.e., determine when a temperature has been changed, determine when information is required to be sent or when information is needed. When this occurs, this application which is running local to the RFD will then initiate a transmission. In the flow chart of FIG. 28, this is the transmission of data.

The program is initiated at a block 2802 and then proceeds to a decision block 2804 to determine if an event has occurred. The event is basically the need to transmit data. This could be just the simple movement of data past a threshold that requires this information to be sent to the Coordinator. When the event occurs, the program flows along the "Y" path to a function block 2806. This function block 2806 indicates that an external reset has been generated to the single chip radio and requires it to wake up and service the event. However, this also could be a timer based system wherein a timer on the MCU 120 periodically wakes a chip up and goes out and captures information from the external application or the internal application. In any event, there is a point in time where an event causes the transmission to be initiated for transmission of this data. The program then flows to a function block 2808 to service the event with a network layer. The network layer, as described herein above, is embedded within the MCU 120 and the operation thereof. The program then flows to function block 2810 to determine if data is present that needs to be transmitted. As a result of servicing the event, i.e., the system detects a reset operation, the system accesses the application that generated the reset to determine if data is required to be transmitted. It can be that some events do not require data to be transmitted.

If data is required to be transmitted, the program will flow along the "Y" path to a function block 2812. In this function block 2812, the data is parsed to a packet. As noted herein above, each packet is limited to a maximum of 128 bytes. Of these 128 bytes, the payload for data can only be 102 bytes. Thus, if the data is more than 102 bytes, multiple packets must be generated. When a packet is generated for transmitting to the Coordinator, each packet will indicate the length of the packet and also indicate if another packet will follow. Thus, once the data is parsed into the packet format, the data is buffered to the MAC, as indicated by function block 2814. The MAC then builds the packet, as indicated by function block 2816, this being the operation wherein the payload is attached to the various overhead bytes that are required to generate the 802.15.4 packet. The program then flows to a function block 2818 wherein the MAC determines if the channel is available. As noted herein above, the MAC is the interface between the network layer and the PHY. The PHY basically controls the radio and just transmits data. However, before the MAC passes off data to the PHY, it must be determined if the channel is available. This is facilitated with a decision block 2820. Once the channel is available, the program flows along a "Y" path to a function block 2822 wherein the data is sent to the PHY and then the data is transmitted, in accordance with a function block 2824. As noted herein above, the synchronization module basically provides this operation wherein it will control the start and stop of the frame generation module 1320, to generate the various interrupts to the MCU, etc., after data has been transmitted, then the synchronization module 1330 will cause the radio to switch to the receive operation, as indicated by function block 2826 for the purpose of receiving an acknowledgement signal. The receive operation will then be initiated, i.e., the acquisition module 1316 will be started and then it will wait for the received acknowledgement signal, as indicated by decision block 2827. During this time, the lack of an acknowledgement signal will result in the program flowing to a timeout block 2830 which, after a certain period of time, will cause interrupt(s) to be generated from the synchronization module 1330 back to the MCU to indicate that no acknowledgement signal was received. This meant that data was not received by the Coordinator. This is due to the fact that only a single packet is sent with the data and, if no acknowledgement signal is received, this indicates that the data must be resent. Therefore, if the timeout occurs, the program will flow back to the input of function block 2818. However, when the acknowledgement signal is received, before the timeout, the program will flow along the "Y" path to send a confirmation to the network layer, as indicated by a function block 2828. There is not required the transmission of an acknowledgement back to the Coordinator. After the confirmation is sent to the network layer, the network layer, operating in the MCU 120, can then turn the radio off as indicated by function block 2834.

Figure 29:
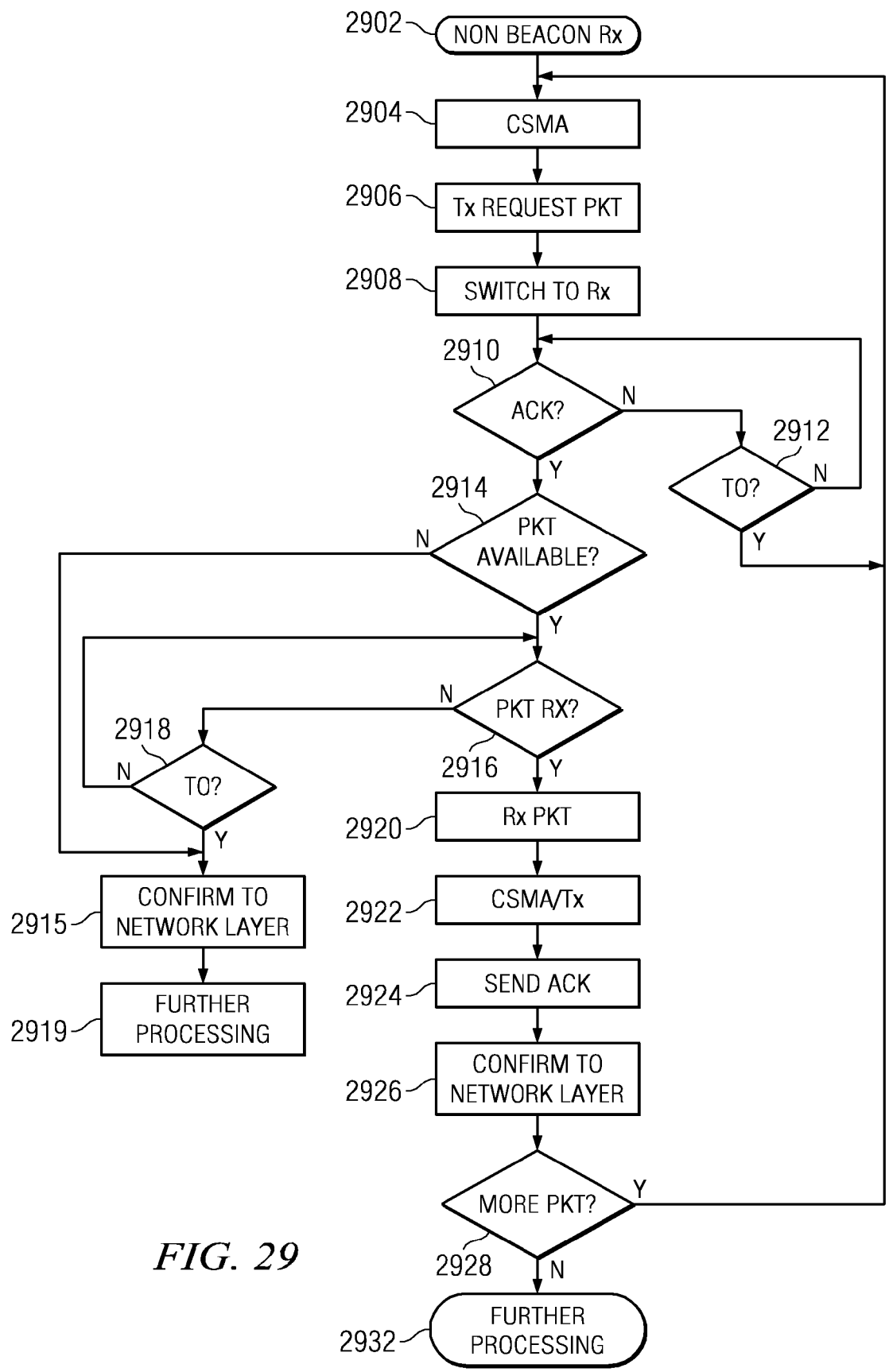
FIG. 29 illustrates a diagrammatic view for the receive operation in the non-beacon mode.

Referring now to FIG. 29, there is illustrated a flow chart for the operation wherein the application layer running at the RFD requires data to be retrieved from the Coordinator. This is basically the concept of checking for mail, i.e., the application needs to determine if the Coordinator has data that is designated for it. Of course, this means the RFD has an association with the Coordinator. This requires a request to be sent to the Coordinator and then await a packet to be received. The program is initiated at a block 2902 and then proceeds to a block 2904. This block 2904 is basically the CSMA operation wherein, prior to a transmission, it is necessary to check that the channel is clear. The term CSMA stands for "Carrier Sense Multiple Access."

After it has been determined that the channel is clear and the transmit operation has been initiated, with the use of the synchronization module 1330, a request packet is transmitted as indicated by a function block 2906. This is an operation wherein the MCU will initiate the transmission by storing the packet into the Y-data memory 1306, provide an indication to the synchronization module 1302 that the frame generation module is to initiate a transmission operation, followed by the frame generation module 1320 taking over and generating the packet with the assistance of the DSP core 1302, as described herein above. Once the packet has been transmitted, the MCU 120 receives the interrupt that the transmission is complete via the synchronization module 1330 and this is then switched over to the receive mode, as indicated in function block 2908. In the receive mode, the system awaits for an acknowledgement signal, as indicated by decision block 2910, during which a timeout decision block 2912, this being a timer based system, will indicate to the MCU 120 that an acknowledgement has not been received. If the acknowledgement has not been received, the program will flow back to the beginning of function block 2904 to again transmit the request packet and await an acknowledgment packet. This will continue until an acknowledgement packet is received, which indicates to the RFD that the Coordinator has received the request and the contents of the acknowledgement packet will indicate that a packet will be transmitted by the Coordinator and the system is to stay in the receive mode. This is indicated by the decision block 2914. If a packet is not to be sent, i.e., there is no "mail," then the program will flow along the "N" path to a function block 2916 to confirm to the network layer that no packet is available and that the radio be can turned off and then the program flows to a function block 2919 for further processing. This further processing indicates that the radio is to be turned off and that the receive mode is to be exited.

If a packet is available, the program flows along the "Y" path from decision block 2914 to a decision block 2916 to determine if the packet has been received. Again, multiple packets are transmitted on the channel from different RFDs and, therefore, there is a certain amount of time that the RFD will wait for the packet to be received. If no packet is received during a certain timeout period, as indicated by a timeout decision block 2918, the program will flow to the function block 2915 and a confirmation will be sent to the network layer that no packet has been received and then the system must go to further processing, which might be a requirement to send another request out. However, once the packet has been received, the program flows to a function block 2920 to basically receive and demodulate the packet and then to a function block 2922 to switch to the transmit mode and then send an acknowledgement that a function block 2924. The acknowledgement is sent to the Coordinator that the packet has been received and then a confirmation is sent to the network layer, at a function block 2926 to confirm that the acknowledgement has been sent and then the program flows to a function block 2928 to determine if additional packets are to be received. If so, that means the process must flow back to the input of function block 2904 to again request additional packets. When the packet is sent by the Coordinator, there will be an indication that this packet is one of multiple packets. Once all packets have been received, the program flows along the "N" path from decision block 2928 to a block 2930 for the processing.

Figure 30:
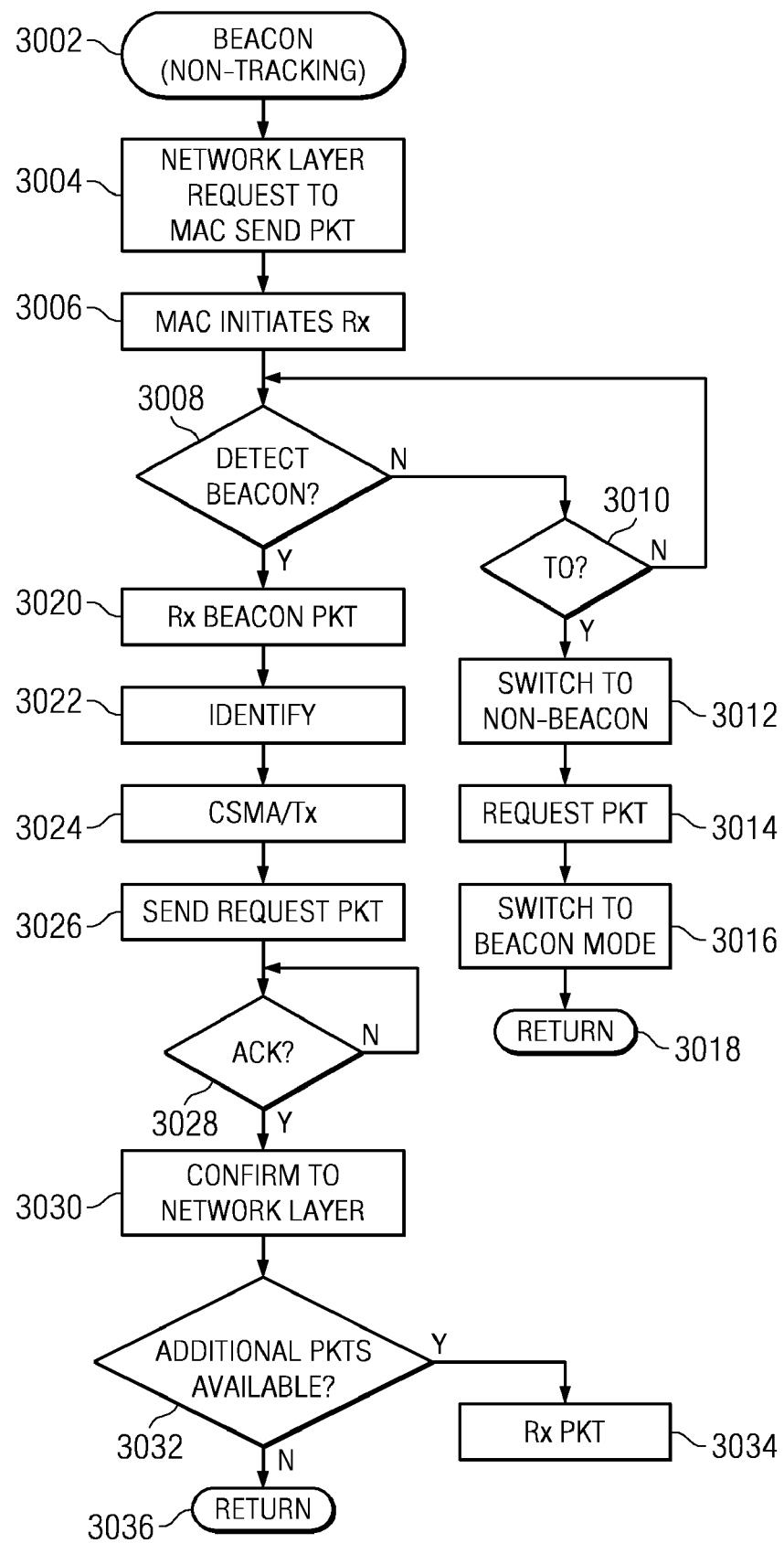
FIG. 30 illustrates a flow chart for requesting packets in the non-tracking beacon mode.

Referring now to FIG. 30, there is illustrated a flow chart for the network device (RFD) operating in a beacon-enabled system but operating in the non-tracking mode, i.e., it is not tracking the beacon and is not aware of when the beacon will occur. In this flow chart, the network device desires to send a packet to the Coordinator. The program is initiated at a block 3002 and then proceeds to a function block 3004 where the network layer requests the MAC layer to send a packet, it being noted that the network layer generated the data for transmission and the MAC converts it to a packet, thus interfacing between the network layer and the PHY. The network layer then initiates the receive operation with instructions to the PHY, as indicated in a function block 3006. The receive operation is for the purpose of detecting when the beacon occurs. This is indicated by a decision block 3008. The system Sniffs the channel to determine if a beacon occurs. The system is aware of a particular length of time, i.e., via the synchronization module, within which a beacon is to occur. If the beacon has not occurred, the program will flow to a time out block 3010 and if it times out, the program will proceed to function block 3012 in order to switch to the non-beacon mode, as described herein above, and then request a data packet, as indicated by a function block 3014 and then switch back to the beacon mode, as indicated by a function block 3016. In this manner, it does not have to detect a beacon before sending the request packet to the Coordinator. After sending the request packet, it will follow the procedure noted herein above and await for a data packet to come back. The program then flows to a return block 3018.

If the beacon has been detected, the program will flow to a function block 3020 to receive the beacon packet. The beacon packet is basically the synchronization information followed by a payload which comprises addresses of particular associated devices that have data pending. This is a broadcast such that all of the network devices will receive the information and their addresses, if contained therein, will indicate that a packet of data is pending for their receipt. The program will then flow to a function block 3022 in order to allow the network device to identify particular addresses and then the network device will switch to the transmit mode indicated by a function block 3024. The program then flows to a function block 3026 to send the request packet to the Coordinator and then the system flows to a function block 3028 in order to await the receipt of an acknowledgement packet from the coordinator. If received, the program will flow to a function block 3030 to confirm that the acknowledgement has been received from the Coordinator. However, it is noted that the Coordinator will indicate in the acknowledgement that there are packets available to be transmitted. This will be indicated to the network layer in the confirmation. This functionality is defined in decision block 3032. If additional packets are available, then the network layer will be informed of such and it will be switched into a mode where it will receive a packet, as indicated by a function block 3034—this will be described herein below. If no additional packets are available, then the program flows to a function block 3036. Again, the network device is not normally looking for the beacon and must take an action upon its own behalf to either initiate a search for packets to be sent to it, i.e., is there one available, and then retrieve the packet.

Figure 31:
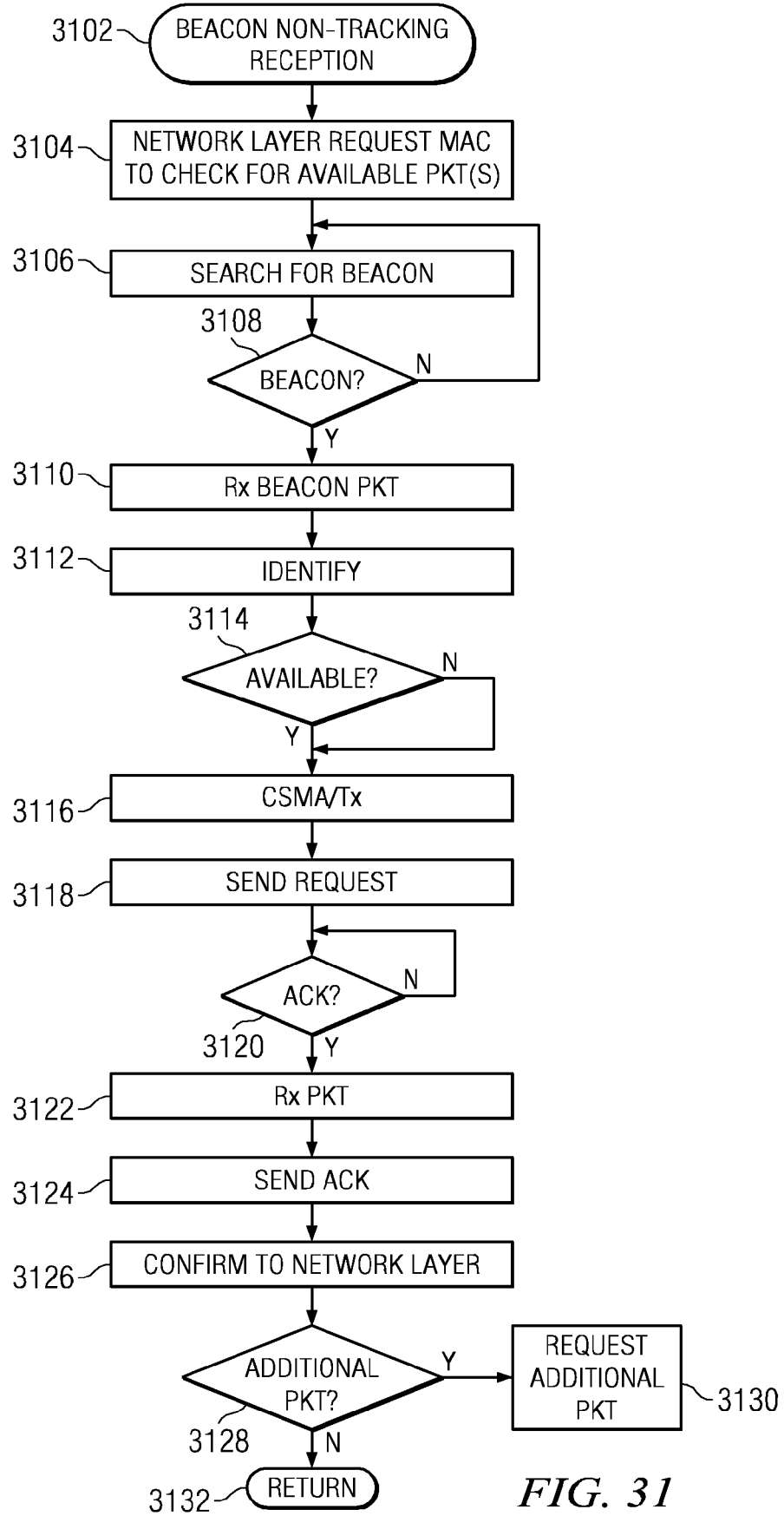
FIG. 31 illustrates a flow chart for reception in the non-tracking beacon mode.

Referring now to FIG. 31, there is illustrated a flow chart depicting the operation of receiving a packet with in a non-tracking mode in a beacon-enabled network. This is initiated at a block 3102 and then proceeds to a function block 3104 wherein the network layer requests the MAC to check for available packets. In this mode, it is known that packets are available and a packet request must be sent. The program flows to a function block 3106 to search for the beacon and determine if the beacon has been received, as indicated by a decision block 3108. The program then flows to a function block 3110 to receive the beacon packet and to a function block 3112 for the identification operation, i.e., to identify the beacon as being within the network and being a valid ID of the Coordinator in which the network device is associated. The program then flows to a decision block 3114 to determine if packets are available. However, this is not necessary, as a request for a packet is going to be sent. Therefore, whether a packet is available or not available still results in a packet request being sent. The program then flows to a function block 3116 to switch to the transmit mode via a CSMA/transmit operation, i.e., it prepares for a transmit operation, all under the control of the synchronization module. The program then flows to a function block 3118 to send the request packet and then to a decision block 3120 to wait for an acknowledgement. Once the acknowledgement has been received, a confirmation is sent to the network layer, the system is placed in the receive mode and then a packet received, as indicated by a function block 3122. The program then proceeds to a function block 3124 in order to send an acknowledgement to the coordinator and then to a function block 3126 to confirm to the network layer that the packet has been received. Again, the acknowledgement that was received from the Coordinator indicates if there are additional packets to be received. If so, the program will flow from a decision block 3128 to a function block 3130 to request additional packets or, if no additional packets are available, the program will flow to a function block 3132 in order to return to the operation.

Figure 32A:
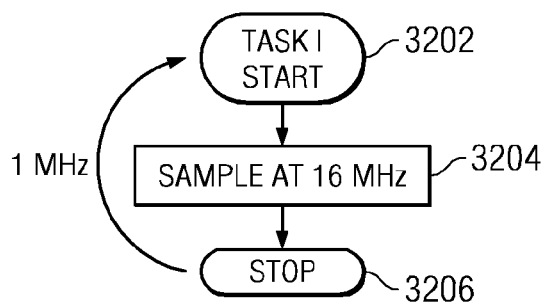
FIGS. 32a-32c illustrate flow charts for the acquisition module tasks.
Figure 32B:
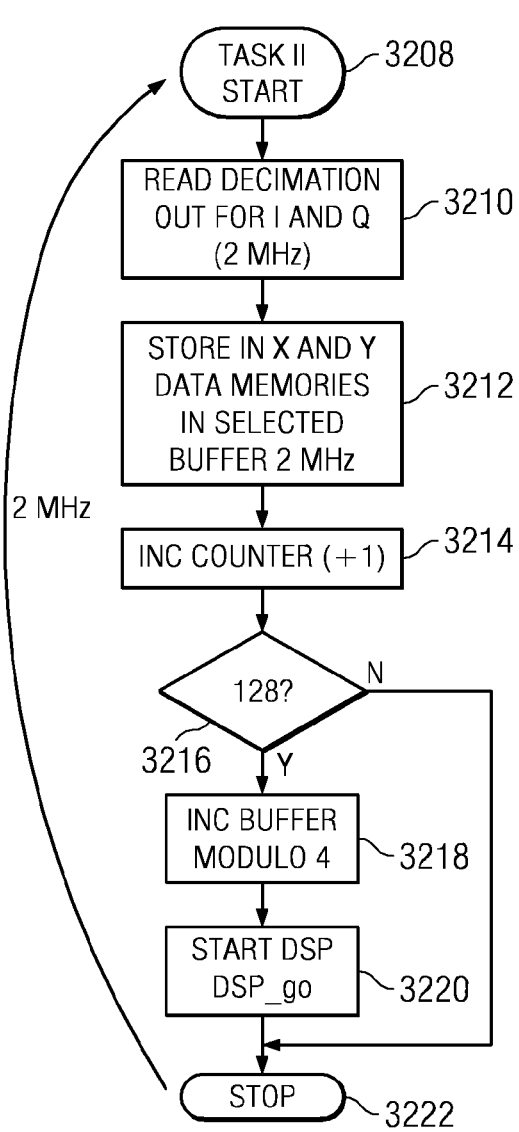
Figure 32C:
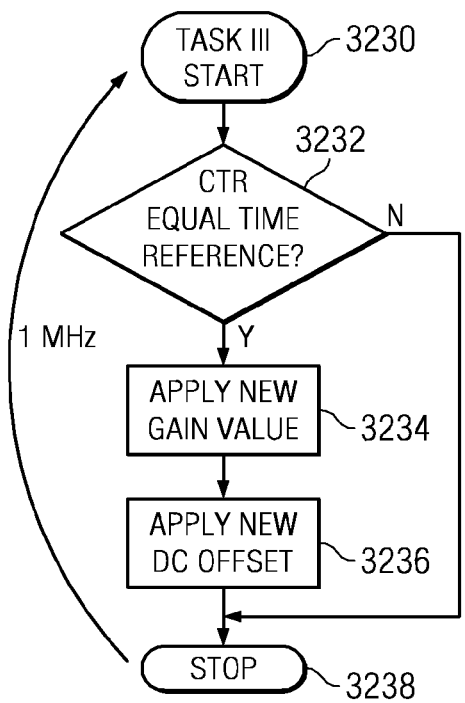

Referring now to FIGS. 32*a*-32*c*, there are illustrated flow charts for the tasks that run in the acquisition module 1316. As noted herein above, the acquisition module is a state machine Three tasks are performed, the sampling operation, the memory transfer operation and possibly the adjustment of the gain and DC offset. The first task is illustrated in FIG. 32*a*. This is initiated at a block 3202 and proceeds to a function block 3204, which indicates that the input is sampled at a rate of 16 MHz. The program then proceeds to a stop block 3206. The entire task is initiated at the edge of the 1 MHz clock and the samples occur for one cycle thereof. Both the I- and Q-channels are sampled such that 16 samples will be taken during each execution of the first task.

Referring now to FIG. 32*b*, there is illustrated a flow chart for the second task, that of storing the memory. As noted herein above, memory transfer occurs at a 2 MHz rate whereas the task cycle time is initiated at each edge of the 1 MHz clock. The program is initiated at a Start block 3208 and then proceeds to a function block 3210 to read the decimated output of the A/D converters for both the I- and Q-channels. The program then proceeds to a function block 3212 wherein the read data is stored in the X- and Y-data memories in the selected buffer. Again, this operation occurs at a 2 MHz rate, such that 2 samples will be stored for each execution of this task. After storage in the memory, the program flows to a function block 3214 wherein the counter value is incremented by a value of 1 (this not being the counter based on the 1 MHz clock in the synchronization module 1330 but an internal counter) and then the program proceeds to a decision block 3216 to determine if the count value internal to this task is equal to 128, as related to 128 samples of the I- and Q-channels. The 128 represents the maximum amount of information that can be stored in a particular buffer, this representing basically four symbols, as each symbol is comprised of 32 chips where each I- and Q-channel is comprised of 16 chips each. Since there are two samples per chip, this would be 32 samples per symbol, when multiplied by 4, will be equal to 128. Once the buffer is full, the program will flow to a function block 3218 to increment the buffer as modulo 4 and then to a function block 3120 in order to generate the DSP_go signal. The program then flows to a STOP block 3222. This is also the flow from the decision block 3216 if the value does not equal 128. This task operates in parallel with task one.

Referring now to FIG. 32c, there is illustrated a flow chart for a third task, the one for adjusting the gain and the DC offset. This program is initiated at a block 3230 and then proceeds to a decision block 3232 to determine if the counter is equal to a particular time reference, this being the time at which the gain and DC offset can be applied. If the time reference is not equal, i.e., the state machine does not determine that it is at the appropriate time, the task will stop. When the time is equal, the program will follow along the "Y" path to a function block 3234 to apply the new gain value and then to a function block 3236 to apply the new DC offset value. The new gain value and DC offset value are determined by the DSP. The program then flows to a STOP block 3238.

Figure 33A:
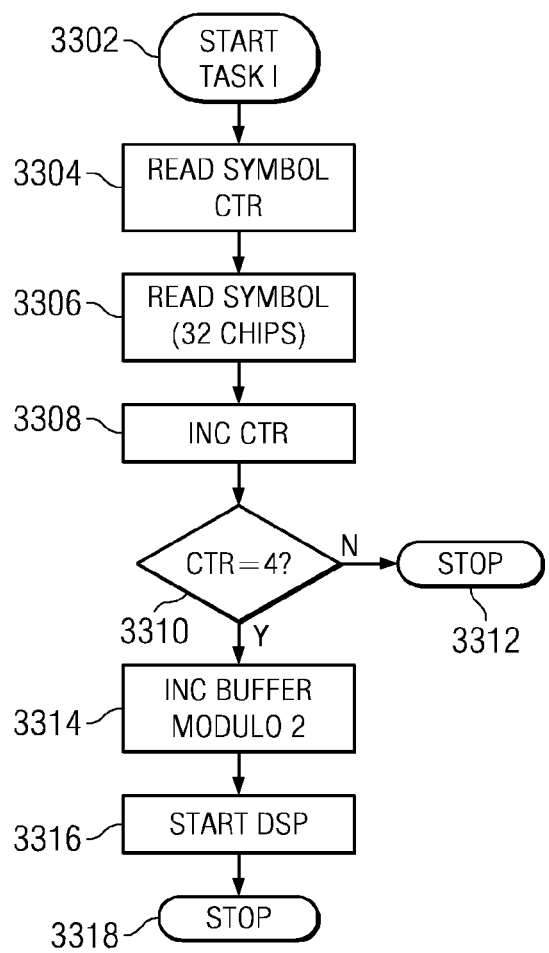
FIGS. 33a-33c illustrate flow charts for the frame generation module tasks.
Figure 33B:
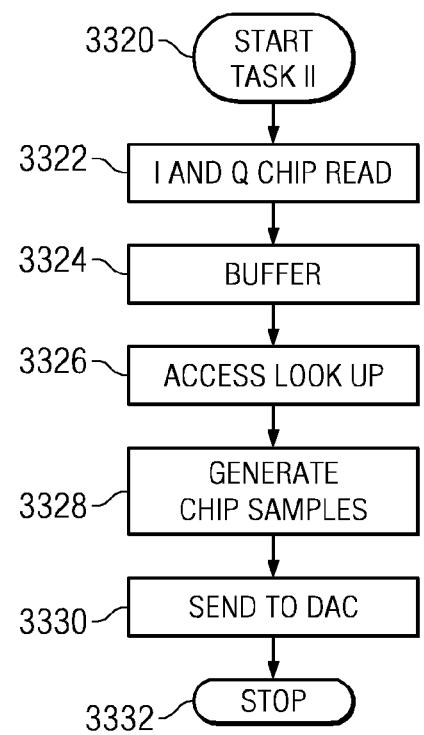
Figure 33C:
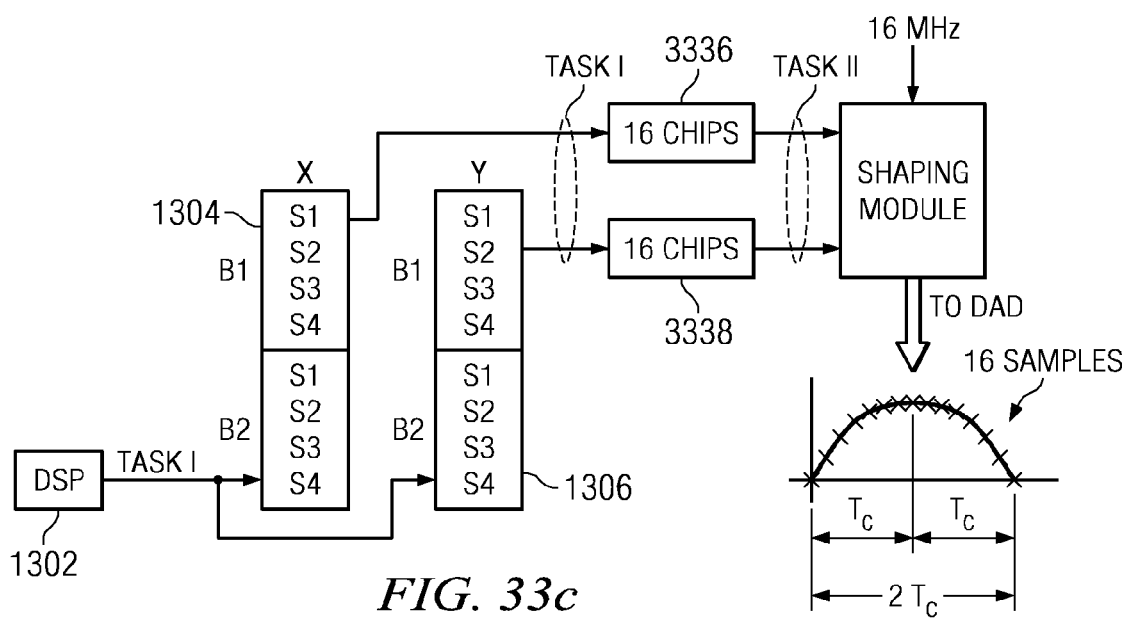

Referring now to FIGS. 33a-33c, the operation of the frame generation module 1320 will be described. As noted herein above, the frame generation module is a logic module which basically operates as a hardware device such that it does not require the processing power of the DSP 1302 in order to facilitate the generation of the digital values representing each chip that is to be transmitted to the modulator circuit for both the I- and the Q-channels. As was the case with the acquisition module, the frame generation module is realized in a hardware.

In order to generate the chips, the timing must be such that the samples of each chip are output to the VCO modulator at the appropriate time. As was stated herein above, at the 2.4 GHz frequency, the symbol data rate is 62.5 Ksymbol/s and this requires the chip rate to be 32 times the symbol data rate. Basically, one symbol is equal to 32 chips such that 32 chips must be transmitted in the same period that four bits is transmitted, i.e., the number of bits that make up a single symbol. This equates to 32 times the symbol rate (32*62,500) which provides a 2-Mchips/s chip rate to obtain a 62.5-Ksymbol/s symbol rate in the 2.4 GHz frequency band. Since the Q-phase and I-phase chips and the O-QPSK modulation scheme result in the Q-phase chip being delayed by $T_c$ with respect to the I-phase chips, where $T_c$ is the inverse of the chip rate, this means that each chip is $2T_c$ wide. This will result in the value of $T_c$ being equal to ½ Mchips/s=500 ns. The total period for a chip is therefore $2T_c$ or 1 microsecond. The sampling rate for the DAC is 16 MHz and, therefore, this will mean that each chip will be represented by 16 discrete digital values which are to be converted to analog values. All of this timing is carried out with the frame generation module merely by receiving the clock signal for the start thereof and a Start signal and a Stop signal.

With further reference to FIG. 33a, the first task is initiated at a start block 3302, this in response to both the clock signal and a start signal being received from the acquisition module. The next step of the task will be the step of reading the symbol counter which is basically reading the next pointer in the X- and Y-data memories. As was noted herein above, after the DSP has converted the data buffered by the MAC to the chip representation of a symbol, i.e., the chip representation of a 4-bit section of the data stored in the Y-memory, this will result in the spreading operation wherein the symbol will be defined in terms of 32 chips, 16 for the I-channel and 16 for the Q-channel. Each of the two 16 bit sets of chips are stored in one memory address in both of the X- and Y-data memories such that they can both be accessed with a single memory access or, alternatively, there could be two separate memories and two accesses could be required. In any event, the symbol counter or pointer will define where the symbol address is that is to be accessed when the task is initiated, this being defined in the function block 3304. The next task is to read the symbol, as represented by a function block 3306. Again, this is 16 chips for I and 16 chips for Q. The program then proceeds to a function block 3308 to increment the counter, this being basically the symbol counter to point to the next location and then the program flows to a function block 3310 to determine if the counter value is equal to 4, indicating that it has rolled over into the next buffer. If not, this indicates that another symbol in the buffer remains and must be read. If so, the task will be terminated at a block 3312. It is noted that each symbol will be output at a chip rate of 1 MHz and, as such, the 16 chips for the I-channel and the Q-channel need only be accessed once every 16 microseconds. Thus, the next time the task is initiated will be 16 microseconds from the time the last task was started. Thus, the counter value for the initiation of the particular task will be latched in the synch module such that the synch module can determine when the next task must be started, i.e., 16 microseconds after the first task.

As soon as all four symbols have been read from the X- and Y-data memories, the counter value will be equal to 4 at the decision block 3310 and the task will flow to a function block 3314 to increment the buffer modulo 2. The program then flows to function block 3316 to initiate the DSP to despread data from the MAC to the empty buffer and then to a block 3318 to stop the task at that point. In this way, the DSP can receive the DSP_go signal indicating that the next four symbols are to be despread.

Referring now to FIG. 33b, there is illustrated the task of processing the two 16-bit values representing the two 16 chip sections read out from the X- and Y-data memories. This is initiated at block 3320, in response to a start signal received from the synchronization module 1330. As noted herein above, this will run parallel with the task of reading the next symbol. The task will flow to a block 3322 indicating that the I- and Q-channel chips have been read and then to a function block 3324 indicating they have been buffered, i.e., this is the place where they are stored. The buffer is accessed and then the look up table is accessed, as indicated by block 3326. As noted herein above, the shape of a "1" symbol and a "0" symbol are prestored. It is only necessary to access the 16 values that represent these symbols and output them to the VCO. The next block 3328 indicates the generation of the chip samples, i.e., the output of the prestored values, to the modulator, as indicated by block 3330. The program then flows to a STOP block 3332 to terminate the task. The samples are generated at a rate of 16 MHz. Therefore, task one need only be generated at every 16 microseconds and task two need only be generated every 16 microseconds, as task two will require 16 microseconds to complete, i.e., one chip will be generated every 1 microsecond.

The overall flow is illustrated in FIG. 33c. The DSP is illustrated as filling buffer B2 in the X- and Y-data memories and each buffer is indicated as containing four symbols, each symbol occupying a space of 16 bits, these 16 bits representing the despread information, i.e., the chips that represent the I-channel and the Q-channel. The first task, task one, is operable to retrieve the data from the buffers and store them in temporary buffers 3336 and 3338 for the I- and Q-channels, respectively. These are then input to the shaping module that is part of the frame generation module 1320 which is facilitated with task two. The DSP operation is controlled by task one. The overall shape is illustrated at the output of the shaping module and it can be seen that the shape will be represented by 16 samples and it will have a width of $2T_c$. It is also noted that both the I- and Q-channels will be output at the same time, such that for each clock cycle of the 16 MHz clock, two samples will be generated. Since it is relatively trivial to recognize that a "1" and a "1" are generated at the same time, and the same value will be output. If it is a "1" and a "0," then the negative of the value will be output for the "0" value.

Figure 34A:
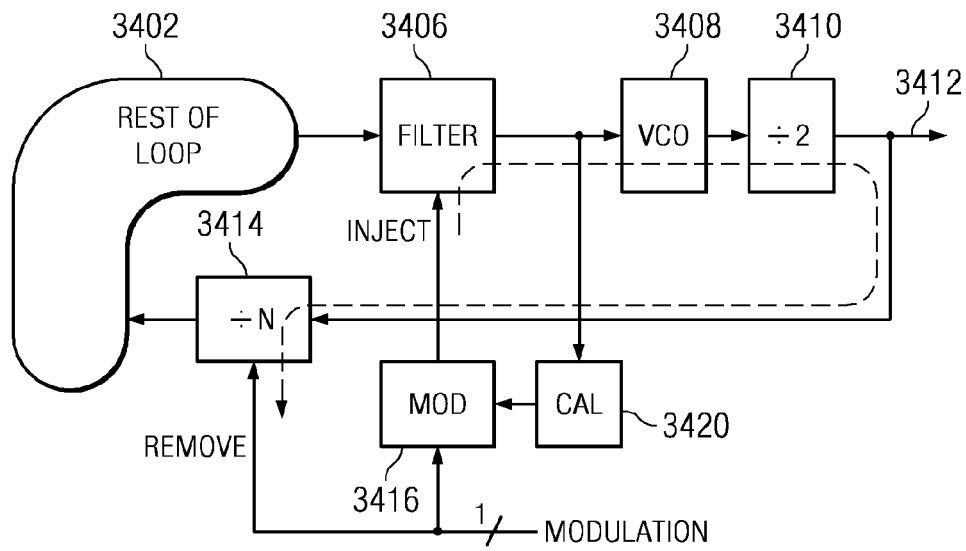
FIGS. 34a-34b illustrate diagrammatic views of the direct VCO modulation.

Referring now to FIG. 34a, there is illustrated a diagrammatic view of the modulation scheme for the VCO. This is a direct VCO modulation scheme. With this scheme, VCO modulation can be facilitated within the loop by injecting the modulation before the VCO and removing it at the divider (÷N). The general portion of the loop that receives the reference frequency, etc., is represented by a block 3402 which generates a control signal to a loop filter 3406. The output of the loop filter drives the control input on the VCO 3408. The VCO 3408 generates a frequency that is twice the channel frequency and the output thereof is divided by a factor of two with a divider 3410 to provide the VCO output on an output 3412. The output is fed back to a divide-by-N divider 3414 to complete the loop. The modulation scheme is operable to drive a modulation block 3416 which injects modulation into the filter 3406 and then removes it from the divider 3414. There is also provided a calibration block 3420 for calibrating the VCO.

With this scheme, the loop never sees the VCO frequency deviation. As such, the direct modulation settling is not limited by the loop dynamics, unlike existing systems, no preemphasis is necessary and, any low power, low-bandwidth frequency synthesizer can be utilized. This scheme is suitable for MSK(O-QPSK), BPSK,FSK and any constant-envelope modulation.

Figure 34B:
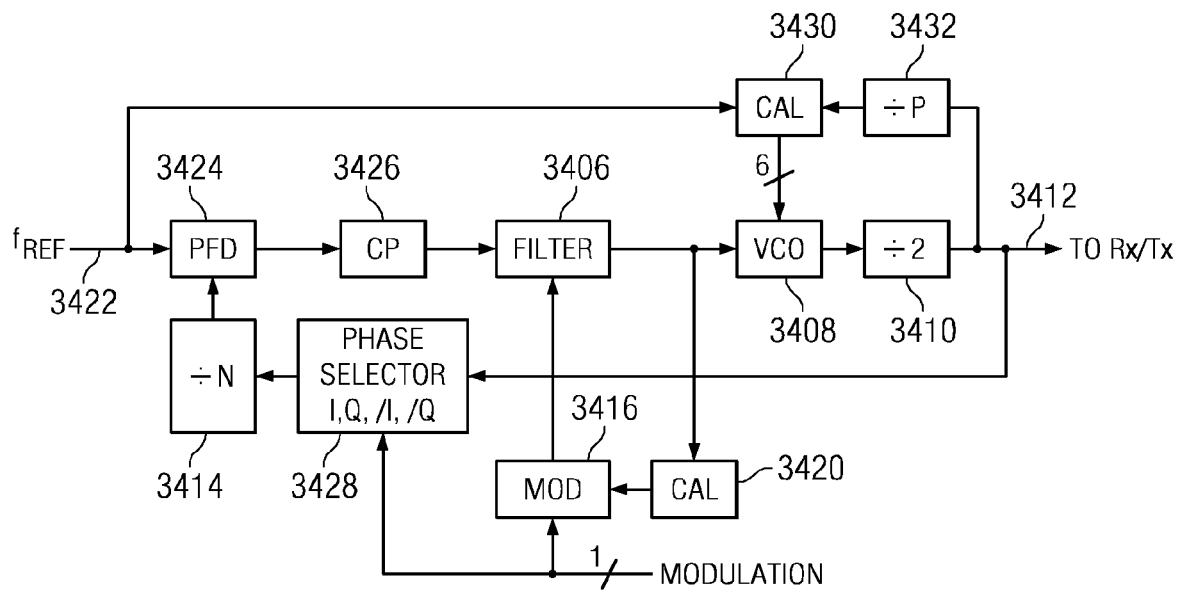

Referring now to FIG. 34b, there is illustrated a more detailed block diagram of the loop of FIG. 34a. The reference frequency is received on an input 3422, this being a 1 MHz crystal oscillator based reference. The reference frequency is input to a phase and frequency detector (PFD) 3424, the output thereof then input to a charge pump 3426. The charge pump operation can be of the type described in U.S. patent application Ser. No. 11/050,131, entitled INTEGRATED PLL LOOP FILTER AND CHARGE PUMP, U.S. Patent Publication No. 2006-01-45770, which is incorporated herein by reference in its entirety. The charge pump 3426 drives the loop filter 3406 which drives the VCO 3408 and then the divider 3410. The modulation input drives the modulator 3416 and also drives the fast phase selector 3428 in order to remove modulation injected into the filter 3406. There is additionally provided a calibration of the VCO with a calibration block 3430 which receives the reference frequency from the input 3422 and also a divided down version of the VCO output with a divider 3432. The reference frequency is 1 MHz and the direct VCO modulation results in a deviation of ±1 MHz at the VCO frequency.

Figure 35:
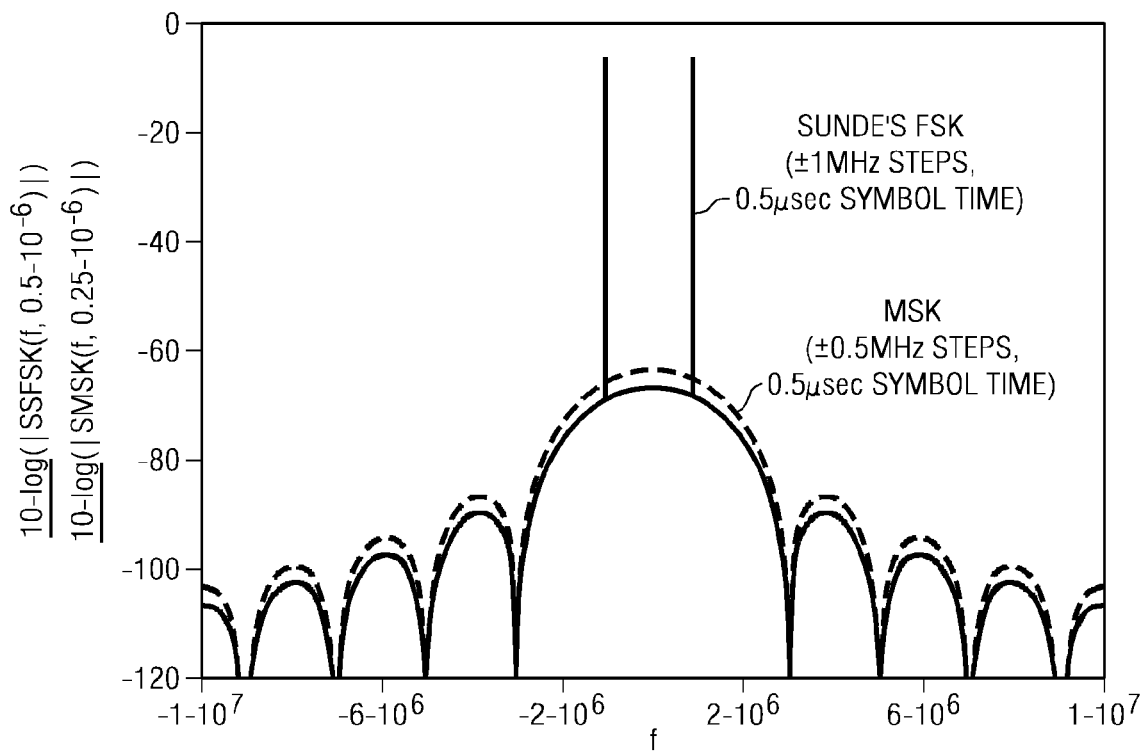
FIG. 35 illustrates a diagrammatic view of the spectrum for the VCO.

The direct VCO modulation results in minimum frequency shift key (MFK) period to retain the phase transition information after the divider 3410, the VCO is modulated with binary frequency shift key (BFSK) with ±1 MHz jumps at a symbol rate of 0.5 microseconds. This is referred to as the well known Sundee's FSK. After the division operation by the divider 3410, the frequency deviation will be cut in half but the symbol rate will remain the same, thus resulting in MSK. This is illustrated in FIG. 35.

Figure 36A:
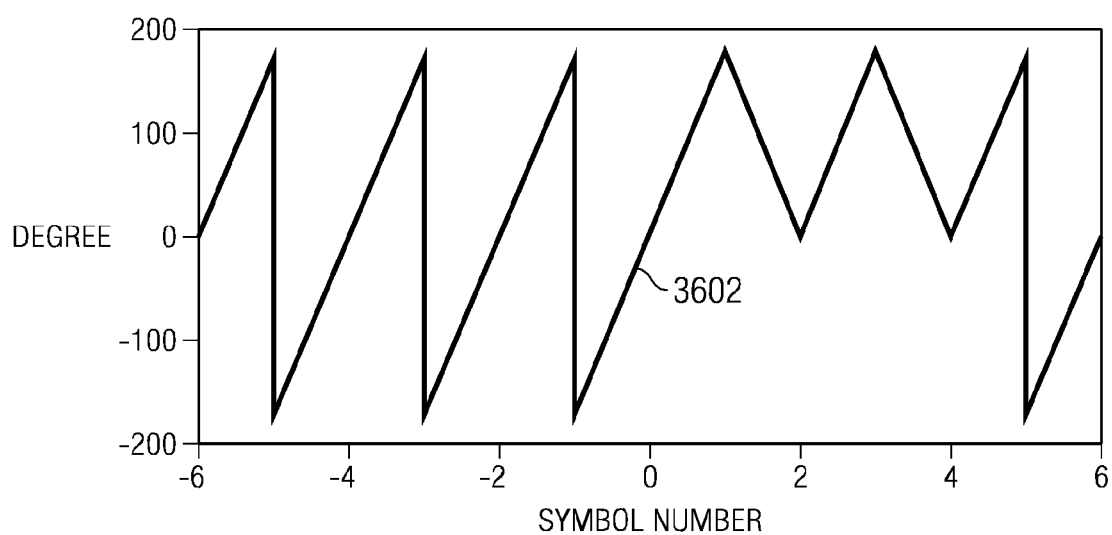
FIGS. 36a and 36b illustrate signal diagrams for the BFSK operation.
Figure 36B:
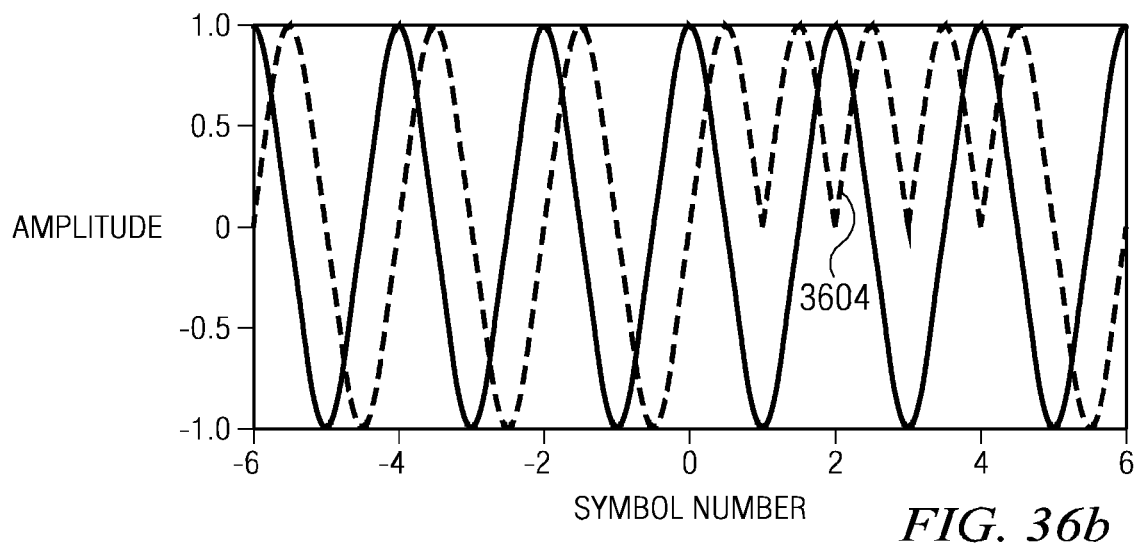
Figure 37A:
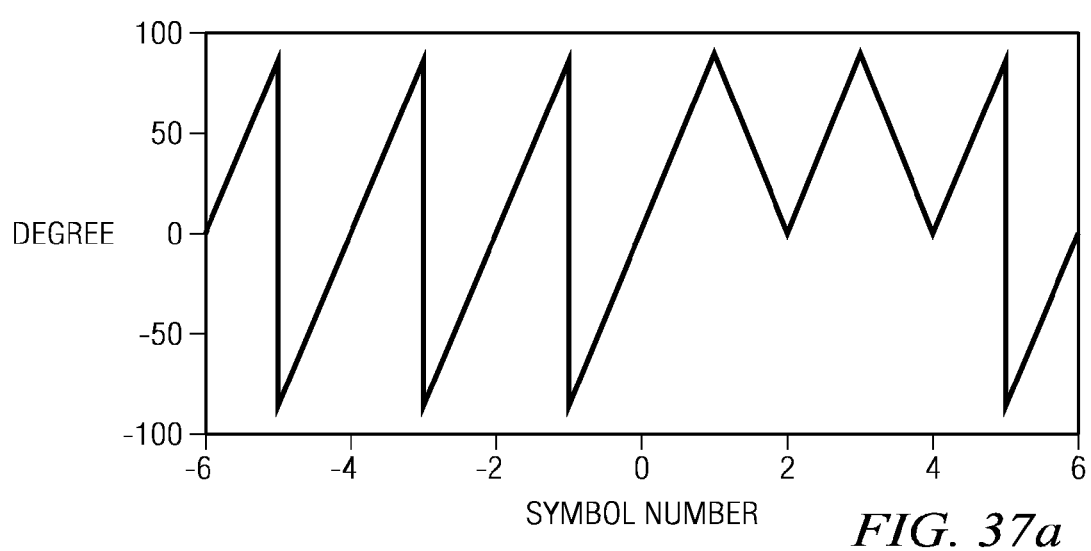
FIGS. 37a and 37b illustrate signal diagrams for the MSK operation.
Figure 37B:
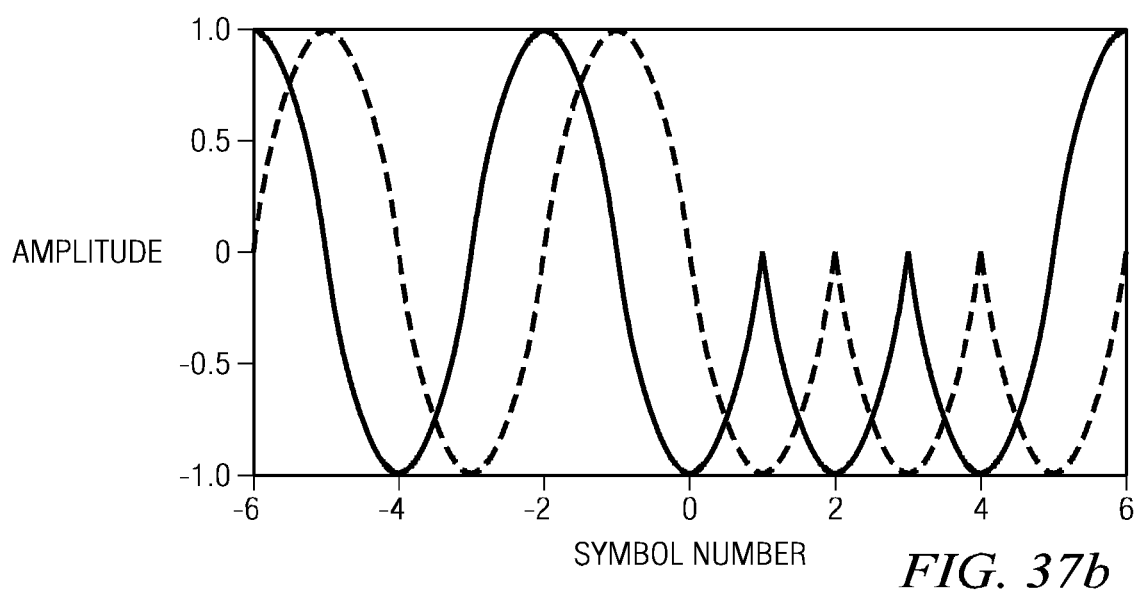

FIG. 36a illustrates the operation at the VCO 3408 where BFSK modulation occurs. FIG. 36a represents the phase of the BFSK signal in time with 180° per symbol. FIG. 36b illustrates the baseband representation of the BFSK signal in time for the I- and Q-channels. It can be seen that a phase shift occurs at a point 3602 in both the phase domain of the carrier and at a point 3604 in the time domain. In this way, the chips can be modulated onto the carrier. At the output of the divider 3410, the MSK signal is represented with FIGS. 37a and 37b wherein FIG. 37a illustrates the phase of the MSK signal in time with a phase shift of 90° per symbol and the baseband representation signal in time for the I- and Q-channels is represented in FIG. 37b.

By using the direct modulation scheme, operation is allowed in a closed loop with a narrow-band integer and synthesizer.

Demodulation

When the radio is placed in the receive mode, there are a number of operations that must be performed. The first is to detect if any data is present on the channel, keeping in mind that 802.15.4 allows only for the transmission of a single data packet with all of the information contained therein. If this packet is missed, then an entirely new operation must be undertaken to again retrieve the packet, this being in the form of a request back to the Coordinator and then rechecking the channel. Therefore, the first operation is to detect the presence of transmitted chips. Once this is determined in what is termed a "Sniff" operation, then the system will go into a synchronization operation so that frequency offset estimation, timing offset and phase offset estimation can be achieved. This is an operation wherein the system determines the boundary of a symbol. Once symbol synchronization is obtained, this typically allowing both symbol synchronization to occur and the header of the packet to be synchronized with, the system will then go into the demodulation mode. In the demodulation mode, the symbols are demodulated to extract all of the information out of the remaining symbols and store the data in the memory, after which it then notifies the MCU that the end of packet (EOP) has occurred.

Figure 38:
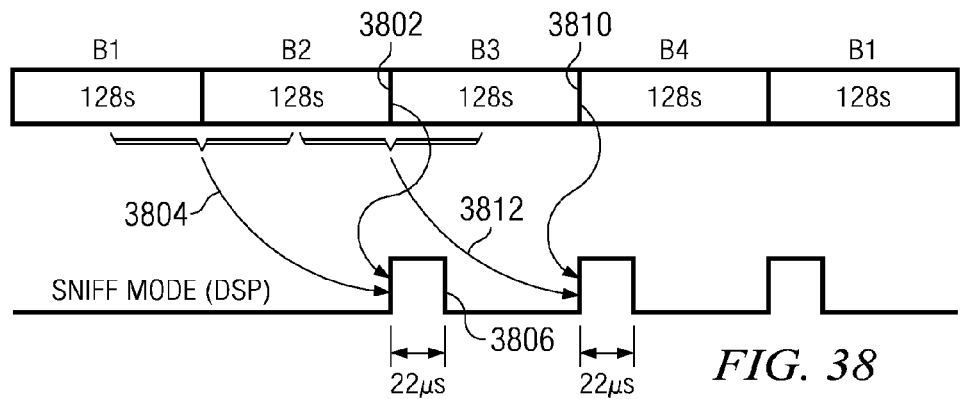
FIGS. 38 and 39 illustrate diagrammatic views for the operation of the Sniff Mode and Sync Mode.

Referring now to FIG. 38, there is illustrated a diagrammatic view of the Sniff Mode. The Sniff Mode is a mode that is initiated by the DSP when the DSP is started. As noted herein above, the acquisition module, after it fills a buffer, will generate the DSP_go signal. This will cause the DSP to begin operation. It will initially execute the Sniff Mode task. This task is set to run for a maximum of 22 microseconds out of the maximum 64 microseconds for buffer acquisition. After two buffers have been filled, the DSP is instructed to initiate the Sniff Mode, at which time it executes a detection algorithm. This detection algorithm does not operate on the currently filled buffer but, rather, operates on one-half of the currently filled buffer and one-half of the previous buffer, the entire set of data that it operates on being 128 samples. This is a recursive algorithm and, at the end of the 22 microseconds, it has not determined that synch exists, the value of the algorithm at the end of the calculation will be stored and the DSP will then go back to the IDLE mode. At the next filling operation of the buffer, the next buffer will be utilized, the first one-half of that buffer and the last half of the previous buffer. In the diagram of FIG. 38, the buffer B2 and the buffer B1 are filled at a point 3802 and this initiates the DSP to go into the Sniff Mode. This will utilize a portion 3804 of the buffer B1 and B2. At a point 3806, 22 microseconds after the initiation of the Sniff Mode in the DSP, the DSP will go to the idle mode. When buffer B3 is full at a point 3810, then the DSP will again be initiated in the Sniff Mode and process a portion 3812 representing the last half of the buffer B2 and the first half of buffer B3. This will continue onward until data is detected or when the acquisition module has the operation thereof stopped by the synchronization module.

Figure 39:
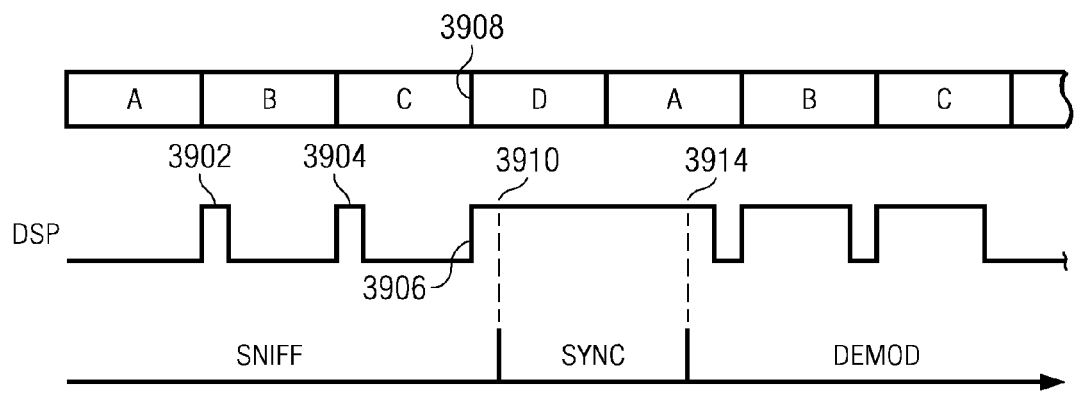

Referring now to FIG. 39, there is illustrated a timing diagram illustrating the operation of going from the Sniff Mode to the Synch Mode to the Dmod Mode. The buffers are labeled "A," "B," "C" and "D" for the four buffers. It should be noted that more buffers could be utilized, but this would require more chip area.

The Sniff Mode is initially conducted for a number of buffer fill cycles represented by DSP cycles 3902 and 3904. The Sniff Mode is illustrated as being initiated at a point 3906 which is a result of buffer C completing the fill operation at a point 3908. However, during the operation of the Sniff Mode, the algorithm indicated that chip information was detected. This occurs at a point 3910. At this point in time, the Synch Mode will be entered into in order to initiate the symbol synchronization algorithm. This will continue for a predetermined number of samples until synchronization has occurred. During the synchronization operation, the DSP runs 100% of the time and continually analyzes the samples. There can be a delay as a result of the operation in the Sniff Mode and this delay is counted for with the additional number of buffers. It should be noted that there are no more than three buffers that can be operated on by the synchronization algorithm, since one buffer will always be operated in the fill mode during the operation of the synchronization algorithm. As indicated, synchronization occurs at a point 3914 which will result in the DSP switching from the Synchronization Mode to the Demodulation Mode before going to the IDLE Mode. However, in the Demodulation Mode, the DSP is cycled from the RUN mode to the IDLE mode. This will continue until all bytes in the packets (128 max for the 802.15.4 standard) have been demodulated, in addition to the overhead.

Figure 40:
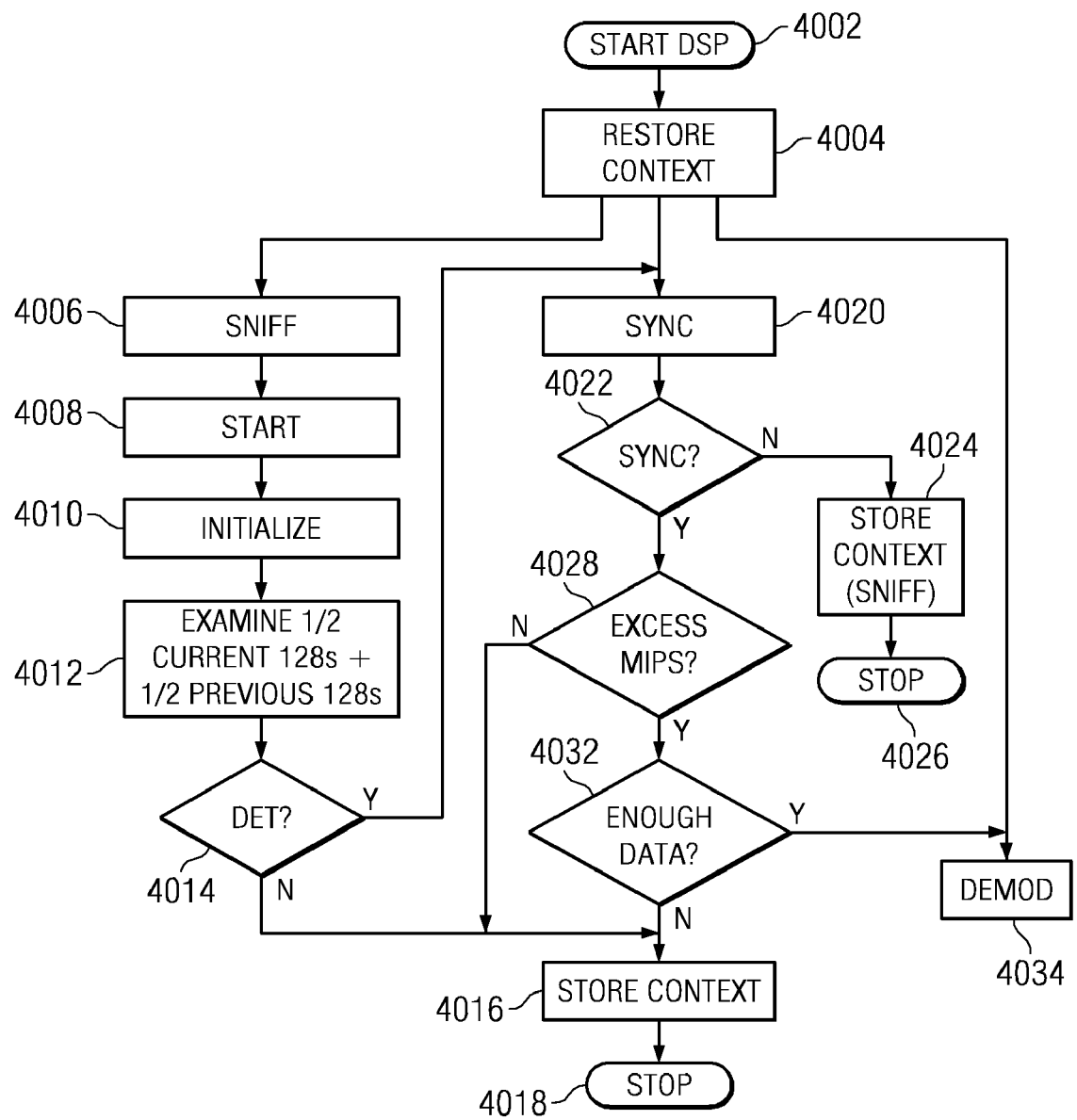
FIG. 40 illustrates a flow chart for the operation of the DSP after receiving a start command.

Referring now to FIG. 40, there is depicted a flowchart for the operation of the DSP after it is initiated. The DSP is initiated at a block 4002 and then proceeds to a block 4004. Since the acquisition module initiates the DSP with the DSP_go signal, the DSP must have some indication of the last operation after it was performed to determine whether it should continue in the Sniff Mode, operate in the Synchronization Mode or operate in the Demodulation Mode. When the receive operation is initiated, the MCU will always start the DSP in the Sniff Mode. In this mode, the program will flow to the function block 4006 indicating the Sniff Mode task. The program then flows to a function block 4008 to start the Sniff Mode, i.e., go to the RUN mode and initiate that task. The program then flows to a function block 4010 to initialize the DSP, i.e., to load information from the prior SNIFF operation, such as the value for the recursive filter. As noted herein above, the Sniff Mode will examine one-half of the current 128 samples and one-half of the previous 128 samples. This is indicated by a function block 4012. The program then flows to a decision block 4014 to determine if the algorithm has indicated a detection. If not, then the program will flow along a "N" path to the function block 4016 to store the context, i.e., store the fact that it is still in the Sniff Mode and also store the necessary values to continue in the Sniff Mode, such as the recursive filter values. Again, the Sniff Mode is maintained in operation for 22 microseconds of the total of 64 microseconds of a buffer fill time. Upon the next DSP_go signal, the DSP will start in the Sniff Mode again.

When the Sniff Mode algorithm has detected data, the program will flow from the detection decision block 4014 along the "Y" path to the input of a synchronization block 4020. Additionally, if the Synchronization Mode is indicated initially, the program will start in the Synchronization Mode. In the Synchronization Mode, the program executes the synchronization algorithm and then determines if synchronization has been achieved. As noted herein above, the synchronization algorithm runs the DSP at 100% of its processing power until a predetermined number of samples have been evaluated or synchronization has been achieved. As also noted herein above, synchronization must occur within three buffer fill times or 3×64 microseconds. If it has not occurred, then the program will flow from a decision block 4020 along a "N" path to a decision block 4022 and to a function block 4024 to store the context as the Sniff Mode, as the Synchronization Mode has failed and the system must again go into the Sniff Mode. This is due to the fact that going into the Synchronization Mode was a false alarm. The program then goes to a STOP block 4026. If synchronization has been achieved, the program will flow to a decision block 4028. The DSP has a MIPS counter which calculates the number of MIPS available. Since the demodulation algorithm, which is the next algorithm, requires a certain number of MIPS to execute a particular task, there must be an indication whether there are sufficient number of executable cycles available to run a task prior to the next DSP_go signal. Since the demodulation operation operates on the edge of a buffer fill cycle, the amount of time left before the buffer that is currently being filled is filled, it is necessary to determine this. However, in addition, it is also required that there be enough data to operate on within the demodulation algorithm. Therefore, at the decision block 4028, if it determines that there are sufficient MIPS left in the cycle to run a particular task in the demodulation algorithm, the program will flow along a "Y" path to a decision block 4032 in order to determine if there is enough data for the task. If either there are insufficient MIPS to complete the task in the cycle or there is insufficient data for completion of the task, the program will flow to the store context box 4016 to store the context as being in the Demodulation Mode and then the program will flow to the STOP block 4018. However, if there are sufficient MIPS and sufficient data, the program will flow along a "Y" path from the decision block 4032 over to a demodulation block 4034 to initiate the demodulation operation. The demodulation operation will continue for a predetermined amount of time but not the full 64 microseconds. The DSP will then turn off and go into the STOP mode, store the context of the Demod Mode in addition to the current state and set of values associated with the Demod Mode and then the DSP will be stopped. When the DSP receives another DSP_go signal, it will then restore the context to the Demod Mode from the previous cycle and continue.

Figure 41:
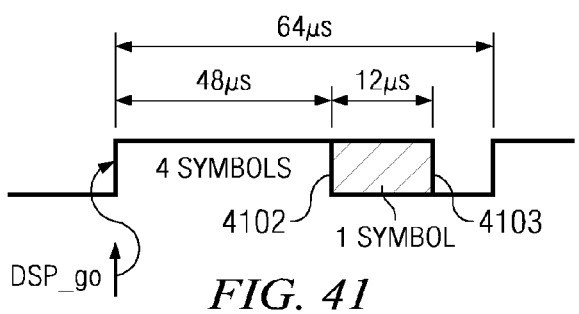
FIGS. 41 and 41a illustrate a timing diagram for the Demodulation operation and for the power budget.

Referring now to FIG. 41, there is illustrated the diagrammatic view of the power of the Demodulation Mode for a given 64 microsecond cycle during which a buffer is filled. The demodulation algorithm is operable to demodulate a minimum of four symbols after it receives the DSP_go start signal. Each symbol demodulating takes 12 microseconds. Therefore, the minimum amount of time that the DSP will be on during the demodulation operation for a given buffer fill time is 48 microseconds. However, initially there will be a delay and the DSP must run at a higher power level to process more data to "catch up." Thus, the DSP can be operated to decode up to five symbols and utilize another 12 microseconds for a total of 60 microseconds for the 64 microseconds window. Therefore, if it is demodulating only four symbols, it will stop at a point 4102 and, if it is demodulating five symbols, it will terminate the operation at a point 4103.

Figure 41A:
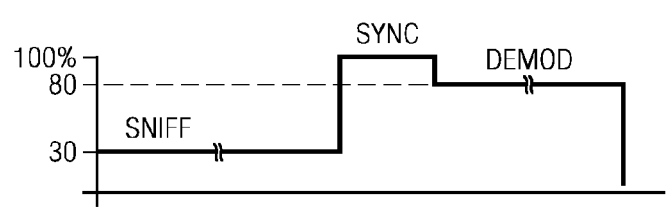

Referring now to FIG. 41a, there is illustrated the DSP processing power budget for the three different modes. The Sniff Mode operates at approximately 30% of the total power level, the Synchronization Mode operates at approximately 100% of the DSP power level and the Dmod Mode operates at approximately 80% or slightly less of the power budget.

Demodulation

Symbol Synchronization

Figure 42:
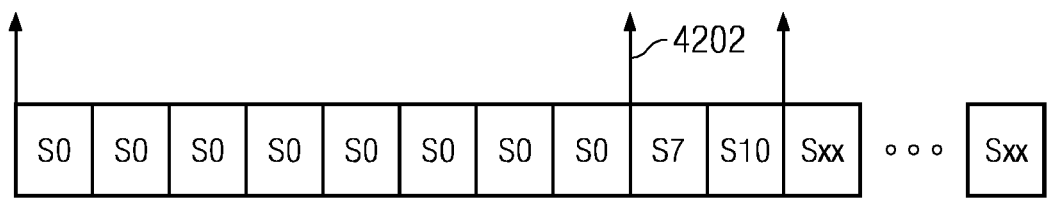
FIG. 42 illustrates a diagrammatic view of a packet.

As described herein above, the 802.15.4 2.4 GHz modulation is spreaded O-QPSK. FIG. 10 shows the steps of the signal building. Four bits are mapped to one of the 32-chips spreading sequence for each symbol. The spreading factor is 8. The 802.15.4 data are transmitted within frame that contains a preamble and an SFD. The preamble is made of 8 blocks of the first spreading sequence $S_0$. The following SFD is made of the two spreading sequences $S_7S_{10}$ indicating the end of the preamble and the beginning of the packet. This is illustrated in FIG. 42.

The symbol synchronization algorithm is designed to perform a timing synchronization at a low frequency, 2 MHz, and have a stepwise synchronization to save the maximum of current consumption. The goal of the proposed algorithm is to estimate the DataStart, at point 4202. The proposed stepwise algorithm is decomposed in following steps:

- periodical signal determination
- detection delay estimation
- symbol start estimation
- data start estimation The symbol start provides the start instant of any symbol. After this step, the beginning of each symbol is known. The Data Start instant can be written modulo the symbol duration Ts. In the 802.15.4 standard, the symbol duration is 16 µs:

DataStart=$k_1T_S+k_2$

After the symbol start estimation, $k_2$ is known and $k_1$ is unknown. After the data start estimation $k_2$ and $k_1$ are known. The proposed stepwise algorithm can be applied to any systems with a frame structure that includes:

- a periodical training sequence (preamble); and
- a synchronization word which is different than the period of the preamble.

The main advantages are:

- a\low current;
- low sampling frequency;
- the periodical signal detection is robust against ISI, and frequency offset; and
- the detection threshold can be set depending on the interferer environment.

The general principle of stepwise synchronization is to decompose the synchronization into steps in order to minimize the current consumption. A step is processed only if the preceding has been granted. In this way, the current consumption is minimized. In fact, only the first state, Periodicity Detection, is processed continuously. Referring now to FIG. 43, there is illustrated the state diagram for the semi-coherent algorithm and FIG. 44 for a purely differential synchronization algorithm. With reference to FIG. 43, the algorithm is initiated at a periodicity detection state 4302 to determine the periodicity. Once this is complete, the state diagram flows to a state 4304 to estimate the delay and then to a block 4306 to make an estimation of the symbol start. This will flow back to the block 4302 until the symbol start estimation is complete. Once complete, the program flows to a block 4308 to perform the frequency offset estimation and then to a block 4310 to perform the data start estimation. In blocks 4302 to 4310, this is the synchronization operation. Once synchronization is complete, the state will flow along a line 4312 to the data estimation block 4314, this being the demodulation operation. In FIG. 44, the difference is that the symbol start estimation block 4306 flows directly to the data start estimation block 4310 wherein the frequency offset estimation is performed by a block 4402 that occurs between the data start estimation block 4310 and the data estimation block 4314. In essence, the frequency offset estimation at 4402 (optional) is performed on the demodulation side.

In the two schemes of FIGS. 43 and 44, the arrows going back to the first states 4302 mean that the synchronization is stopped and the first step is processed again. The proposed algorithm is applicable to any communication system using a periodical preamble following by a known synchronization pattern.

Periodicity Detection

The periodicity detection of block 4302 has a primary purpose of detecting a periodical signal. In the case of the 802.15.4 standard, the periodicity is 16 µs. This signal is detected if the modulo or the square of the modulo of the sliding N order correlation C(N,k) defined by the Equation A reaches a threshold. This condition is the transition condition between the periodicity detection state 4302 and the Delay Estimation state 4304. The following discussion will build a statistical model for detection delay. For the sake of simplicity, a 16 µs period with a 2 MHz sampling frequency i.e. a 32-periodical signal, is considered.

Depending on the presence of the signal of interest the complex base band received signal can take the two following values:

H0 noise only hypothesis:

$y(k)=b(k)$ where: b(k) is the stationary circular centered white Gaussian noise with a standard deviation σ.

H1 noise and 32-periodical signal hypothesis:

$y(k)=Gx(k)e^{j2\pi_0 T_c k+j\theta}+b(k)$ where: b(k) is the circular centered white Gaussian noise with a standard deviation σE[|b(k)|²]=σ².

G is a real gain which depends on the received signal strength and the amplifiers gain.

for k∈[$k_{PStart}$, $k_{PStart}$+255], x(k) is a 32 known periodical:

$x·(k)=x(k+32)$ k∈[$k_{PStart}$, $k_{PStart}$+255−32]

where: $f_0$ is the frequency offset in Hz;

θ is a phase offset; and

Tc is the chip duration equal to 0.5 µs.

The 32-order sliding correlation is defined by:

$$C_{32}(N, k) = \frac{1}{N} \sum_{n=0}^{N-1} y(k-n) y^*(k-n-32)$$

where: N is the length of the rectangular sliding window.

Detection Probability at a Given Time

At a given instant, it is desirable to estimate the probability of detecting the preamble. kPDet defines this detection instant of the preamble. It is then necessary to calculate the probability of kPDet=$k_0$. Consider the case of a first detection strategy defined in Appendix 1.2. The probability of detecting the periodical signal at time $k_0$ is the joint probability of not reaching the threshold before $k_0$ and reaching the threshold at time $k_0$. Make the hypothesis that the receiver is on DT samples before the preamble arrived.

$$Pr(kPDet=k_0)=Pr\{R_1(N,k)<T_1, k=DT \ldots k_0-1 R_1(N, K_0) \geq T_1\}$$

Lower Bound

The assumption is made that the $C_{32}$ (N,k) are independent when k varies. This is an optimistic hypothesis that gives a lower bound on the detection time kPDet. The real detection time will be greater than this bound.

Hypothesis: $C_{32}(N,k)$ are independent when k varies:

$$PR(kPDet = k_{0\_} = Pr\{|C_{32}(N, k_0)| \geq T_2\} \prod_{k=DT}^{k_0-1} Pr\{|C_{32}(N, k)| < T_2\}.$$

This probability can be expressed with the generalized Marcum's Q function defined as:

$$Pr(kPDet = k_0) = \sum_{k=DT}^{k_0-1} \left(1 - Q_1\left(\frac{\sqrt{2} s(k)}{\Omega(k)}, \frac{\sqrt{2} T}{\Omega(k)}\right)\right) Q_1\left(\frac{\sqrt{2} s(k_0)}{\Omega(k_0)}, \frac{\sqrt{2} T}{\Omega(k_0)}\right)$$

Figure 45:
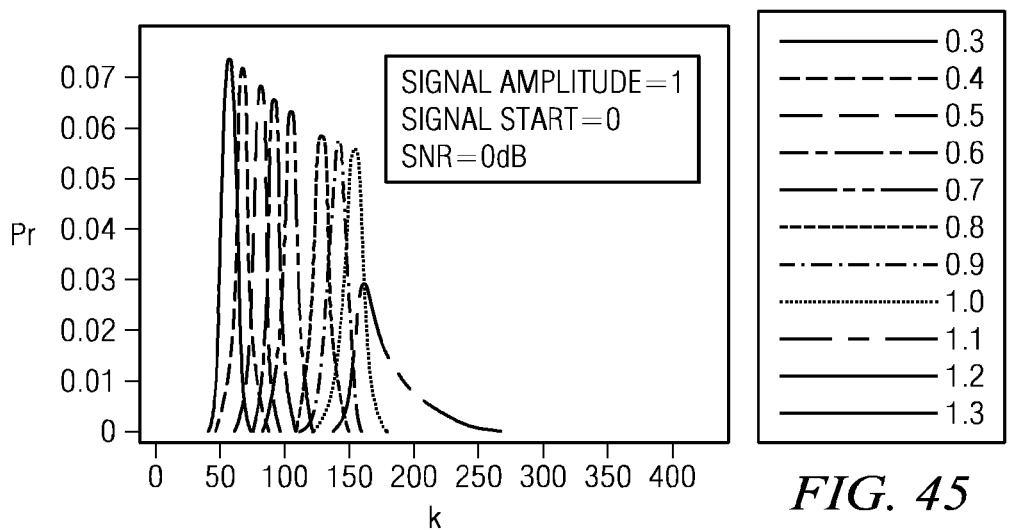
FIG. 45 illustrates a plot of the probability of detecting the preamble.

FIG. 45 shows the probability of detecting the preamble at time k with different thresholds, which illustrates the probability of detecting at time k knowing that the first sample of the preamble arrived at time 0. N=128, SNR=0 dB T1 varies, the detection variable is $|C_{32}(N,k)|$ Define $p_{Delay}(k)$ as the p.d.f. of the detection delay. $p_{Delay}$ (k) is obtained by normalizing $$\sum_{k_0=-\infty}^{k_0=\infty} Pr(kPDet = k_0)$$

to one. The mean and the variance of the detection delay are defined by the following equations:

$$\text{Mean}(T, G^2, \sigma) = \int_{k=-\infty}^{k=k_0} k p_{Delay}(k)$$

$$\text{Var}(T, G^2, \sigma) - \int_{k=-\infty}^{k=k_0} (k - \text{Mean}(T, G^2, \sigma))^2 p_{Delay}(k)$$

It can be seen from FIG. 45 that the p.d.f. of the detection delay can be approximated by a Gaussian p.d.f. if the threshold is not too big (i.e. less than 1.1 with the parameters of the FIG. 45) and then the maximum deviation of the detection delay is defined as:

$$\text{MaxDev}((T, G^2, \sigma) = 3\sqrt{\text{Var}(T, G^2, \sigma)}$$

These functions Mean(T,$G^2$,σ) and MaxDev(T,$G^2$, σ) are used to define the maximum deviation of the processing windows.

Detection Delay Modeling

The detection delay statistical properties depend on the gain G and the noise power $\sigma^2$ which includes RF noise and interferer power and the detection threshold T. If there is no interferer, the method used to model the detection delay consists of 1) Estimating the parameters G and 2) Delay estimation based on the statistical model described in the preceding paragraph.

If there is an interferer the method uses to model the detection delay consists of:
estimating the noise power σ and fix the detection threshold in order to have an unchanged statistical model;
estimating the received signal strength G; and
estimating the delay based on the statistical model described on the preceding paragraph.

Estimation of the Signal Parameters

Interferer-Free Environment

The power of the received signal is measured on the I and Q components once the detection threshold has been reached. If there is no interferer, the measured power is the sum of the RF noise and the signal of interest. As the RF noise is known, the parameter G is easily estimated.

$$\text{MeasuredPower} \approx \sigma_{2RF}^2 + G^2$$

Environment with Interferers

The measured power in base band includes the interferers and RF noise power. If the interferer is stationary, a power measurement of the received signal is performed when there is no signal of interest. In this situation the measured power is:

$$\text{MeasuredPower} \approx \sigma_{RF}^2 + \sigma_{interferer}^2$$

Figure 46A:
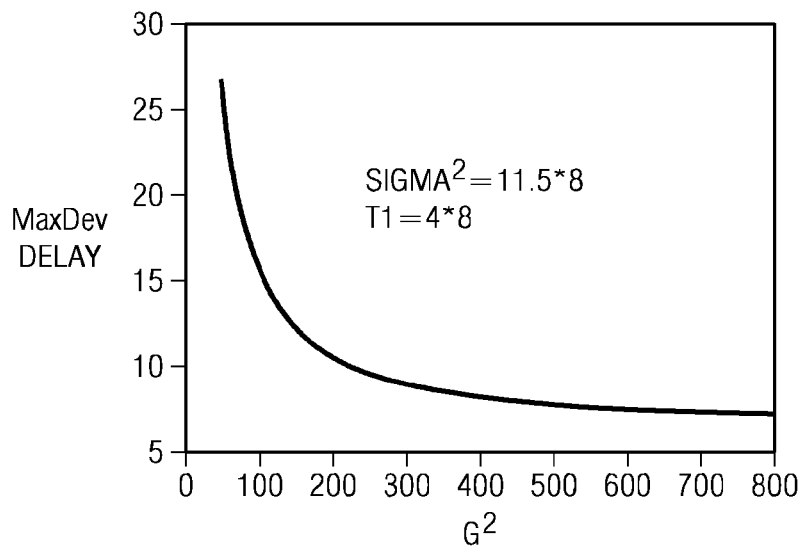
FIGS. 46a and 46b illustrate plots of the maximum and mean deviation of detection delays in the detection operation.
Figure 46B:
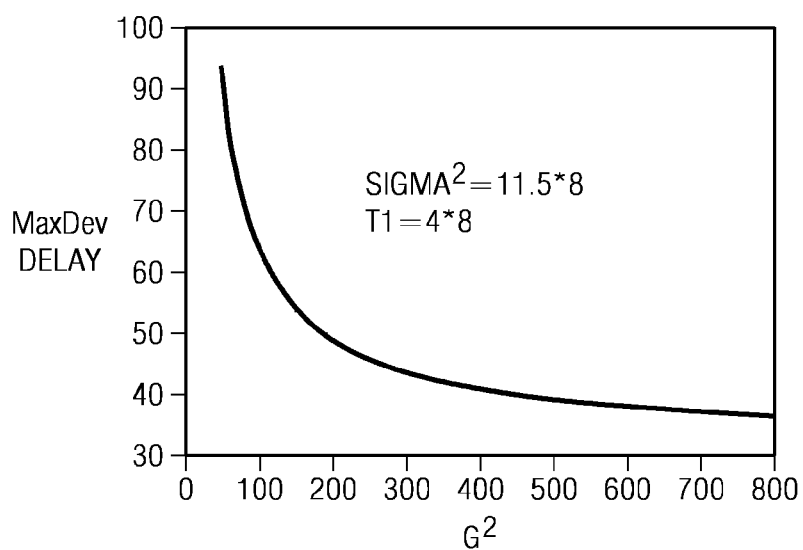

The detection threshold is set as explained in the next paragraph according to the estimation of the measured power in order to keep the same statistical modeling of the detection delay as described in the previous paragraph. It is necessary to have a constant FAP, such that the gain is set depending on the noise power (RF noise+interferer). According to the FAP derivation in Appendix 1.3.1, the threshold is multiplied by the same factor as the noise power in the first detection strategy. In the case of the second detection strategy, the threshold is multiplied by the square of this factor. FIGS. 46a and 46b illustrate when the detection threshold is tuned with this method, the detection delay mean and maximum deviation as a function of the SNR remain unchanged.

If the interferer is not stationary, an online estimation is performed of the interferer power in the band of the interferer.

Search Windows Dimensioning

Once a statistical model for the detection delay is established the mean and the maximum deviation is established. The length of the windows can be dimensioned in which the symbol synchronization and the data start estimation will be performed.

Symbol Start Synchronization Window Dimensioning

The synchronization algorithm uses the preamble, so the synchronization window should include the preamble. For example, in the 802.15.4 standard if the signal is sampled at 2 MHz, the preamble is made of 256 samples. The search window $W_1$ is then defined by the detection time KPDet and the Mean Delay and MaxDev defined in the preceding paragraph.

$$W_1 = [kPDet-\text{MeanDelay}-\text{MaxDev}, kPDet-\text{MeanDelay}+256+\text{MaxDev}]$$

It is noted that in the 802.15.4 standard, the spreading sequence are cyclic shifted. So, if the synchronization algorithm is performed on a 802.15.4 signal (which is not the preamble) it will disturb the synchronization algorithm. So a better solution is to choose W1 in order to be sure than SFD is not in the window.

$$W_1 = [kPDet-MeanDelay-MaxDev, kPDet-MeanDelay+256-MaxDev]$$

Data Start Estimation Window Dimensioning

The Data Start estimation algorithm detects the synchronization word. So the Data Start estimation window should include the synchronization word. For example, in the 802.15.4 standard the SFD follows the preamble and is made of 2 symbols i.e. 64 samples at 2 MHz. The search window $W_2$ is then defined by:

$$W_2 = [kPDet-MeanDelay-MaxDev+256, kPDet-MeanDelay+256+64+MaxDev]$$

Symbol Start Estimation

The symbol start algorithm uses the content of the preamble period to perform the first step of the timing synchronization: the estimation of the symbol start. This processing step is activated only if the previous one has been granted.

Goal of the Symbol Start Estimation

Once the preamble has been detected at time kPDet, the goal of the preamble synchronization step is to estimate the DataStart modulo the symbol duration Ts. In other words, this is equivalent to estimating $k_2$.

$$DataStart = k_1 Ts + k_2 Tc$$

Tc=0.51 μs
Ts=16 μs
$0 \leq k_2 \leq 31$

Principle and Implementation of the Symbol Start Estimation Algorithm

The receiver is not synchronized in frequency. Therefore, signal demodulation is performed differentially. The first step of the preamble synchronization is to perform a differential coding of the received signal.

$$d(k) = \operatorname{imag}(y(k)y^*(k-1)), k \in W_1$$

The differential spreading sequence is defined as associated to the preamble:

DSS0(k)=imag(S0(k)S0·(k−1)),k=0 . . . ,30
DSS0(0)=imag(DSS0(0)DSS0·(31))

Call P=[DSS0, DSS0, DSS0, DSS0, DSS0, DSS0, DSS0, DSS0]

and RP(k)=P(32*8−k−1),k=0 . . . 32*8−1, RP(.) the signal matched to the differential coding of the preamble. To estimate efficiently the parameter k2 a reduced complexity matched filter is performed inside the search window $W_1$ defined in the preceding paragraph. The performance of this implementation is equivalent to the matched filter one but with a reduced complexity. The matched filter detection principle is to perform a convolution between the received signal after a differential coding and RP(.) and take the maximum value.

$$S_i = \sum_{n}^{32*8-1} RP(n) d(i-n)$$

$$imax = \operatorname*{ArgMax}_{i}(S_i^2)$$

$$ScoreP = \operatorname*{Max}_{i}(S_i^2)$$

This search algorithm can be simplified:

$$S_i = \sum_{k=0}^{31} \sum_{l=0}^{7} RP(32l+k) d(i-32l-k)$$

The preamble is 31-periodical so RP(32l+k)=RP(k)=RDSS0(k) with RDSS0(k)=DSS0(31−k), K=0 . . . 31

$$S_i = \sum_{k=0}^{31} \sum_{l=0}^{7} RDSS0(k) d(-32l+i-k)$$

$$Score = \operatorname{Max}\{|S_i|^2\}$$

$$k_2 = \operatorname*{ArgMax}_{i}\{|S_i|^2\}$$

The advantage of this method is that the matched filter length is divided by 8.

Figure 47:
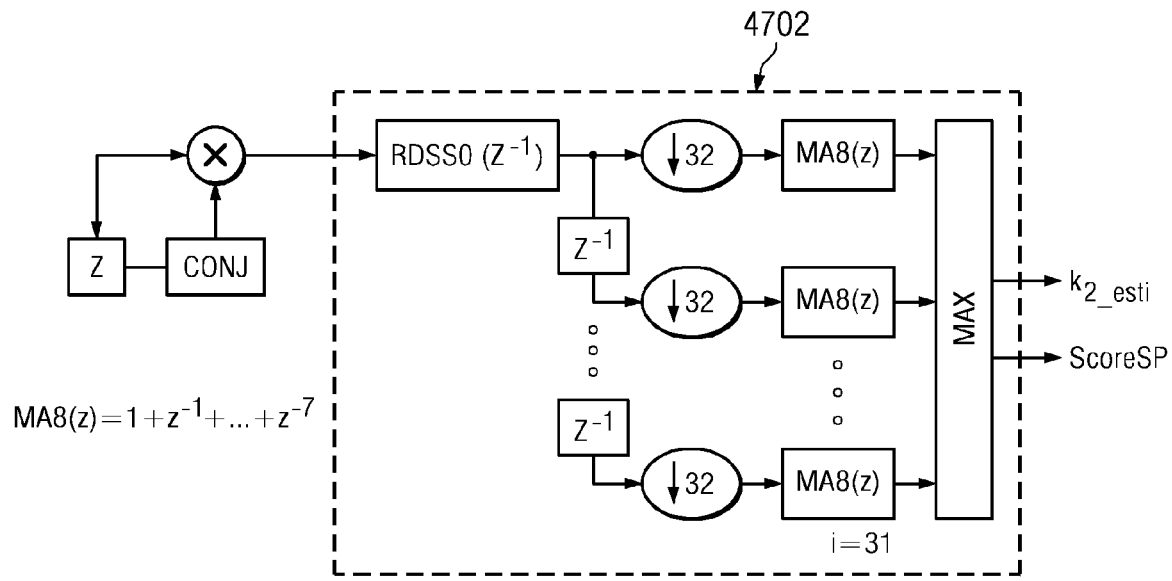
FIG. 47 illustrates a block diagram for a hardware accelerator for the match filter.

Referring now to FIG. 47, there is illustrated a hardware implementation of this search algorithm. In this diagram, a separate hardware accelerator is utilized to implement the matched filter, this noted by a box 4702 that is disposed around portion of the functionality. Of course, it could be implemented in software.

Data Start Estimation Algorithm

Once the Symbol Start Estimation has been performed, the start of symbols are known. The Data Start estimation algorithm has the task of estimating the Data Start time. There are two options to estimate the data start:

1) compute the dot products between the differential coding of the SFD and the differential coding of the received symbols inside the window W2; and
2) compute the dot products between the SFD signal and the received symbols after frequency offset correction inside the window W2.

Differential Case (Option 1)

The differential coding of a known emitted pattern is utilized that includes at least a part of the SFD plus a part of the preamble. Call ΔSFD_Det the differential coding of the pattern to be detected and LDSFD the length of this pattern. Call d(k) the differential coding of the received signal in the search window W2. The DataStart estimation algorithm computes the dot product between ΔSFD_Det and the N received symbols after a differential coding. The following pseudo code describes the algorithm. The estimation of k1, $\hat{k}_1$, is the index of the maximum of this N dot products.

Pseudo code for differential detection:

```
Max = -∞
k̂₁ = -1
FOR k = 0 : N - 1,
              L_DSD_Det
    p(k) =    Σ         ΔSFD_Det(l)d(k̂₂ + 32k + l)
              l=0

IF p(k) > Max,
        Max = p(k)
        k̂₁ = k
    ENDIF
ENDFOR
    DataStart = k̂₂ + 32k̂₁ + L_SFD_Det
```

Figure 48:
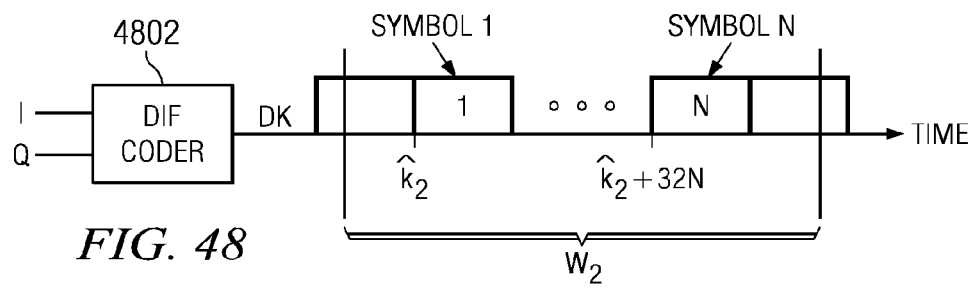
FIG. 48 illustrates a diagrammatic view of the windowing operation.

Referring now to FIG. 48, there is illustrated a diagrammatic view of the differential coding algorithm. A differential coder 4802 performs a differential coding and provides the output on d(k) at the output thereof. This is represented as a plurality of differential symbols from symbol "1" to symbol "N." Each of these starts at the instance of k2, k2+32 . . . k2+N32.

Coherent Case (Option 2)

In the coherent case a frequency offset estimation is performed based on an efficient processing of the preamble inside W1. Then a frequency offset correction (described herein) will be performed on the received samples in the window W2. Call y'(k) the received signal after frequency offset correction. Call SFD_Det the synchronization pattern that is made of the known emitted symbols (these symbols are in the SFD and the preamble) and L_SFD_Det the length of this pattern. The estimation algorithm computes the absolute values of N complex dot products between the received symbols in W2 and the conjugate of SFD_Det then searches the max. The following pseudo code describes the proposed algorithm:

```
Max = -∞
k̂₁ = -1
FOR k = 0 : N - 1,
         L_SFD_Det
   p(k) =   ∑    SFD_Det(l)y(k̂₂ + 32k + l)
         l=0

IF |p(k)| > Max,
      Max = p(k)
      k̂₁ = k
   ENDIF
ENDFOR
         DataStart = k̂₂ + 32k̂₁ + L_SFD_Det
```

Figure 49:
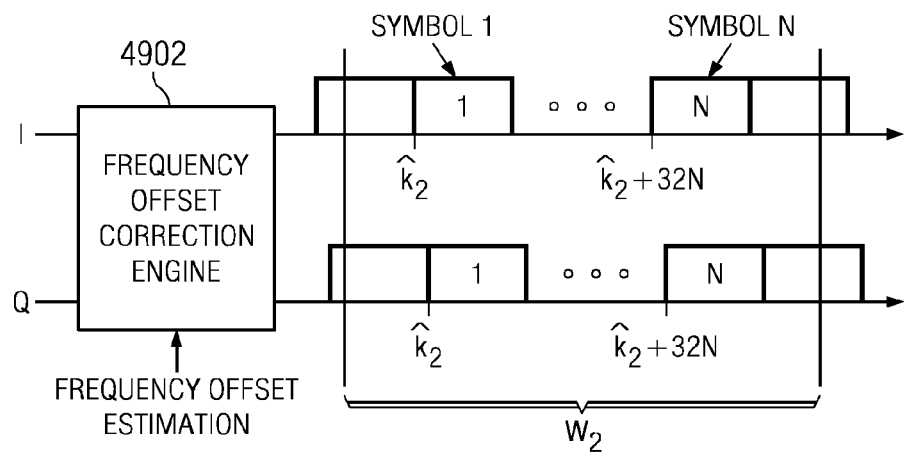
FIG. 49 illustrates an alternate embodiment of FIG. 48.

Referring now to FIG. 49, there is illustrated a block diagram representing an implementation of the reduced complexity data start estimation algorithm in the coherent case. A frequency offset correction engine 4902 is provided to receive both the I- and Q-channel data and then, on each channel, compute the N complex dot products between the receive symbols after frequency Offset Correction in the window $W_2$ and the reference signal which is at least a part of the SFD and preamble. Over this window, the search will be performed for the maximum period.

Frequency Offset Estimation

In a typical wireless communication system, imperfect up- and down-conversion caused by non-idealities in the transmitter and receiver local oscillators can result in a carrier offset at the receiver. This offset causes a continuous rotation of the signal constellation, and must be corrected for in order to achieve reliable demodulation of the received signal.

The method utilized estimates the FO independently of the timing offset. That means there is no need to be synchronized in time to perform the FO, so it is not necessary to have a front end running at a high sampling frequency which performs the TOE (time offset estimation) before the FOE. A coarse estimation is mixed with a fine one which gives a very robust estimation (against ISI and noise) with a wide range of estimation (±500 KHz) at a low sampling frequency 2 MHz.

Figure 50:
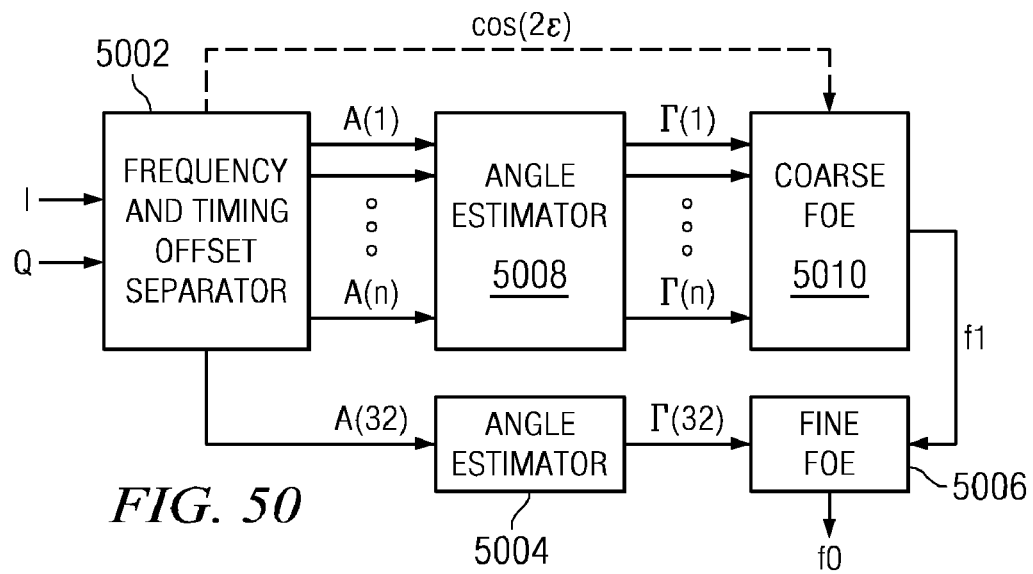
FIG. 50 illustrates a block diagram for the frequency offset estimation operation.

Referring now to FIG. 50, there is illustrated a block diagram of the FOE algorithm. The I- and Q-channels are subjected to a first step, represented by a block 5002 to form the frequency and timing offset separator. One path is directed toward an angle separator block 5004 which performs the fine FOE at a block 5006. A second path is directed toward an angle estimator at a block 5008 which then flows to a coarse FOE block 5010. The coarse FOE is utilized in conjunction with the fine FOE operation.

The emitted signal, by way of summary, is comprised of the spread symbol, as described herein above with reference to FIG. 10. By way of summary, the spreading sequence and demodulation for Offset QPSK (OQPSK) will be discussed.

Cyclic shift and conjugation properties $S0 = 1\ 1\ 0\ 1100111000011010100100010\ \underline{1110}$
$S1 = \underline{1110}\ 1\ 1\ 0\ 1\ 1\ 00\ 111000011010100100010$
...
$S7 = 10011100001101010010001011101101$
$S8 = 10001100100101100000011101111\underline{011}$
$S9 = \underline{1011}10001100100101100000011101111$
...
$S15 = 110010010110000001110111\ \underline{1011}\ 1000$ These sequences are not orthogonal.

Digital Modulation: OQPSK

Modulation: Offset QPSK $Tc = 0.5\ \mu s$ $$x(t) = \sum_k a(k)f(t - 2kTc) + j\sum_k b(k)f(t - 2kTc - Tc)$$

$a(k) \text{ and } b(k) \in \{-1, +1\}$

With:

$$\begin{cases} f(t) = \sin\left(\frac{\pi t}{2Tc}\right), 0 \leq t < 2Tc \\ f(t) = 0, \text{ otherwise} \end{cases}$$

Figure 51:
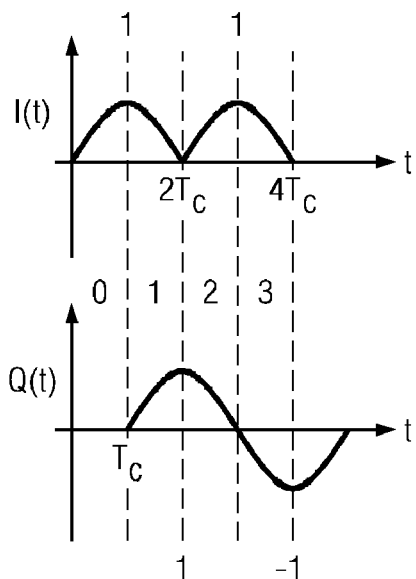
FIGS. 51 and 52 illustrate diagrammatic views of the baseband signal.
Figure 52:
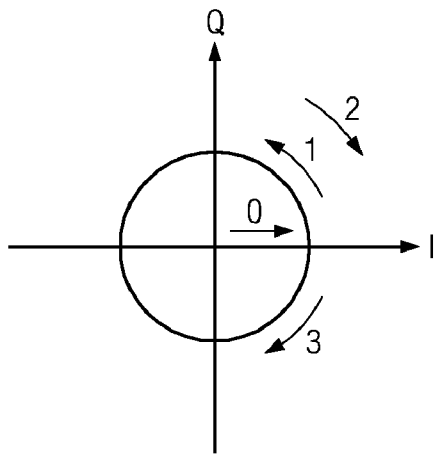

Actually, the OQPSK signal defined in the 802.15.4 standard is equivalent to a MSK signal with a differential encoding of the data. This is illustrated in FIGS. 51 and 52.

The continuous-time received baseband signal is modeled as:

$$y(t) = x(t)e^{j2\pi f_0 t + j\theta} + n(t)$$

where: F0 is the frequency offset

θ is an initial phase

N(t) is a white Gaussian noise

The sampling ΔT phase of the received signal is unknown:

$$y(kTc+\Delta T) = x(kTc+\Delta T)e^{j2\pi f_0 kTc + j\theta_0} + n(kTc+\Delta T)$$
$$\theta_0 = 2\pi f_0 \Delta T\theta$$

The pulse shape is a half sine and so it can be shown that:

$$x(2dTc + \Delta T) = a_{2k}\cos(\varepsilon) + jb_{2k+1}\sin(\varepsilon)$$

$$x((2k+1)Tc + \Delta T) = a_{2k+2}\sin(\varepsilon) + jb_{2k+1}\cos(\varepsilon)$$

$$\varepsilon = \frac{\Delta T}{Tc}\frac{\pi}{2}$$

Chips on $I$: $a_{ek=+-1}$  $a_{2k+1=0}$

Chips on $Q$: $b_{2k=0}$  $b_{2k+1=+/-1}$

Figure 53A:
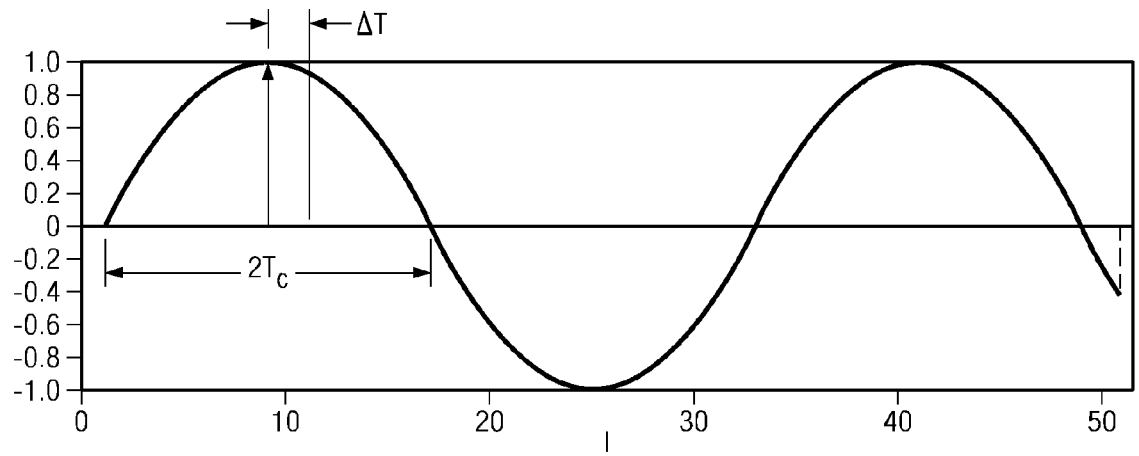
FIG. 53 illustrates a diagrammatic view of the OQPSK wave form for both channels.
Figure 53B:
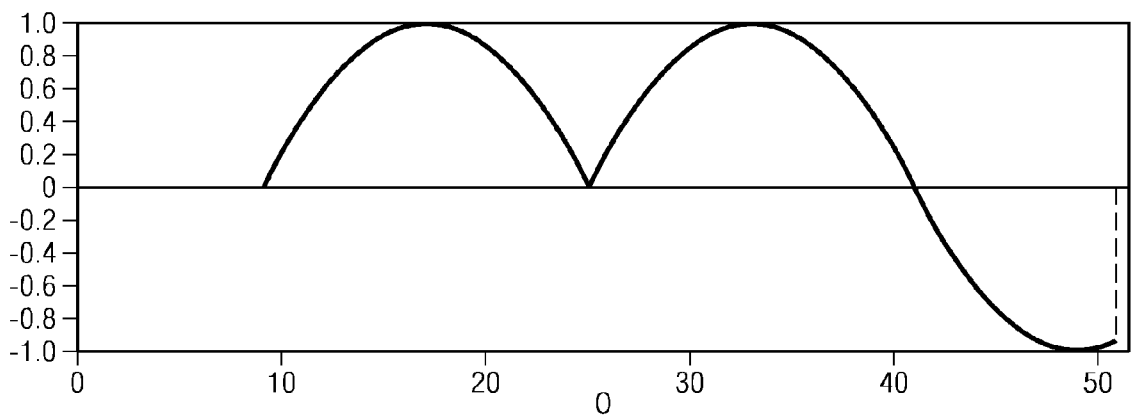

The received signal is sampled at the minimal frequency to correct the FO and demodulate the signal: 2 MHz(Tc=0.5 μs), here the signal represented without frequency offset or phase offset. The time t=0 is the beginning of the preamble. This is illustrated in FIG. 53.

Timing Offset and Frequency Offset Mixture
The products are defined as:

$$p_n(k)=y\cdot(k)y(k-n)$$

$$p_n(k)=e^{j\theta_n(k,f_0\epsilon)}+w_n(k)$$

where: Wn(k) is an additive noise
When k is even $\epsilon>0$ and n>0 the angle of the product can be written as:

$$\theta_n(2k, f_0, \varepsilon) = -(a_{2k}b_{2k+1} + a_{2k+1+n}b_{2k+n})\varepsilon + a_{2k}b_{2k+n}\frac{\pi}{2} + 2\pi f_0 T_c n + \varphi(n)$$

φ(n) is a noise This relationship contains one term depending on $f_0$ and 2 perturbations terms depending on the data $a_{2k}b_{2k+n}$ and on the timing offset ϵ. For all the k and ϵ, identical equations hold.

Timing and Frequency Offset Separation
This method is based on the properties of the 802.15.4 spreading sequences. For data compensation, it is assumed that x(k) is a chip belonging to the preamble.

$$z(k)=y(k)x\cdot(k)z(k)$$

$$q_n(k)=z\cdot(k)z(k+n)$$

Summation is done over an integer number $K_{max}$ of spreading sequence. All the x(k) must be within the preamble:

$$A(n) = \frac{1}{K_{max}}\sum_{k=k0}^{32K_{max}+k0-1} q_n(k)$$

where: $32K_{max+k0-1}$ must be <256 (end of the preamble)
n<32
k0 is the start of the summation window
After some calculation it can be demonstrated that:

$$A(n)=[K_1(n)+K_2(n)\cos(2\epsilon)]e^{j2\pi f_0 nT_c}+w(n)$$

where: w(n) additive noise
with the following values for $K_1$ and $K_2$:

| | N | | | | | | | | | | | | | | | |
| --- | --- | --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 | 14 | 15 |
| K1 | 32 | 18 | 14 | 14 | 18 | 16 | 141 | 18 | 16 | 14 | 12 | 16 | 18 | 18 | 16 | 14 |
| K2 | 0 | 14 | 18 | 18 | 14 | 16 | 18 | 14 | 16 | 18 | 20 | 16 | 14 | 14 | 16 | 18 |
| | N | | | | | | | | | | | | | | | |
| | 16 | 17 | 18 | 19 | 20 | 21 | 22 | 23 | 24 | 25 | 26 | 27 | 28 | 29 | 30 | 31 |
| K1 | 16 | 14 | 16 | 18 | 18 | 16 | 12 | 14 | 16 | 18 | 14 | 16 | 18 | 14 | 14 | 18 |
| K2 | 16 | 18 | 16 | 14 | 14 | 16 | 20 | 18 | 16 | 14 | 18 | 16 | 14 | 18 | 18 | 14 |

Timing Offset Estimation (TOE)
An estimation of the cosine of the timing offset is:

$$\cos(2\varepsilon) = \sum_{n=1}^{N_{max}} \frac{|A(n)| - K_1(n)}{K_2(n)}$$

The timing offset can be used to compute a coarse FOE as explained hereinbelow. The SNR on the angles estimation depends on ϵ.

Coarse FOE 1
Based on the angles of A(n) a coarse FOE can be estimated:

$$A(n)=[K_1(n)+K_2(n)\cos(2\epsilon)]e^{j2\pi f_0 nT_c}+w(n)$$

Several methods can be applied to obtain a coarse estimation of the FO based on the angle of A(n)—see U. Mengali, M. Morelli, "Data-Aided Frequency Estimation for bust digital transmission," IEEE trans on com. Vol 45 No 1, January 1997.

Coarse FOE 2
Following the same principle presented by Kray in "A Fast Accurate Single Frequency Estimator," IEEE trans on acoustic speech and signal processing, Vol. 37, No. 12, December 1989, an ML estimation of the FO based on the differences between the angles of A(n) could be utilized. The number of samples used to compute the A(n) is constant, but the SNR on each angle estimation depends on n and ϵ:

$$\theta(n)=\text{angle}(A(n))$$

$$\theta(n)=2\pi f_0 nT_c+w(n)$$

where: w(n) additive noise;

$$\sigma^2(n) = E[w(n)^2] \propto \frac{1}{(K_1(n) + \cos(2\varepsilon)K_2(n))^2}$$

Coarse FOE 3
The ML (maximum likelihood) FOE is a weighted average of differences between the angles of A(n) as proposed by Kray:

$$\hat{f}_1 = \frac{1}{2\pi T_c}\sum_{m=1}^{M} w_m(\Delta(m))$$

$$\Delta(m) = \text{angle}(A(m)) - \text{angle}(A(m-1))$$

$$\Delta(1) = \text{angle}(A(1))$$

$$w(\varepsilon) = \frac{1^T C^{-1}(\varepsilon)}{1^T C^{-1}(\varepsilon)1}$$

The proposed weighting is defined by:

$$C(\varepsilon) = \begin{bmatrix} G_\varepsilon(1) & -G_\varepsilon(1) & 0 & 0 \\ -G_\varepsilon(1) & G_\varepsilon(1)\_G_\varepsilon(2) & -G_\varepsilon(2) & 0 \\ 0 & ... & ... & ... \\ 0 & 0 & -G_\varepsilon(M-1) & G_\varepsilon(1M) + G_\varepsilon(M-1) \end{bmatrix}$$

$$G_\varepsilon(n) = \frac{1}{(K_1(n) + K_2(n)\cos(2\varepsilon))^2}$$

Coarse FOE 4

For reduced complexity implementation, $w\epsilon(n)$ can be simplified in two different ways:

1) Pre-compute a finite set of weights wi, corresponding to a finite set of sampling phase $\epsilon$ on this finite set.

$$0 \le \varepsilon_i \le \frac{\pi}{4}$$
$$w_i = w(\varepsilon_i)$$

2) Consider an identically distributed $\epsilon$ in $[-\pi/4 : \pi/4]$ and we consider the average value of $\cos(2\epsilon)$ i.e. $2/\pi$:

$$1\frac{\pi}{4} \le \varepsilon \le \frac{\pi}{4}$$
$$\cos(2\varepsilon)_{mean} = \frac{2}{\pi}$$

Figure 54:
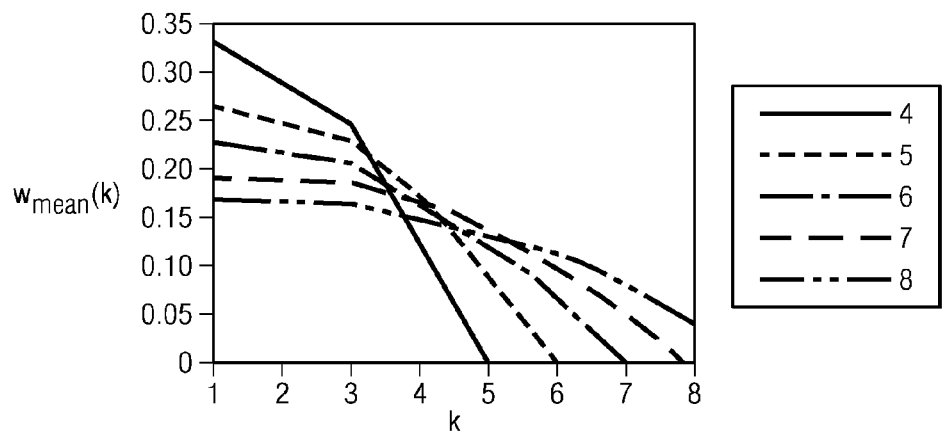
FIG. 54 illustrates a plot of the weighting function.

FIG. 54 illustrates the weighting function where M varies from 4 to 8 and $\cos(2\epsilon)$ is replaced by its average: $2/\pi$.

Fine FOE 1

Once a coarse FOE has been obtained, a fine FOE is computed based on the periodicity of the preamble. The fine FOE has the advantage of being insensitive to |ISI|. Consider the 32-order correlation computed on the received 32-periodical signal:

$$C(32) = \sum_{k=0}^{N_{max}-1} y*(k)y(k-32)$$

where: $\Gamma(32) = \text{angle}(C(32))$ $C(32) = N_{max}e^{j2\pi f_0 32 Tc} + w$ where: $w$ is an AWGN The C(32) does not depend on the sampling phase $\Delta T$ and so the SNR is optimal for the estimation $\Gamma(32):K_1(32)$ and $K_2(32)=0$. The C(32) does not depend on |ISI| because the signal $x(k)$ is 32-periodical.

Phase Wrapping Problem

Because of the phase wrapping, $\Gamma(32)$ can not be used to estimate f0 as soon as:

$|2\pi f_0 T_c 32| > \pi |f_0| > 31.25$ KHz

Thus, f1 is used to un-wrap the phase on $\Gamma(32)$.

Fine FOE 2

Call f1 the coarse FOE. $\Gamma(1)$ is then defined as the normalized FOE:

$\Gamma(1)=2\pi f_1 Tc$ where: k is the estimation of the number of turn to reach $\Gamma(32)$ starting from $\Gamma(1)$ $$k = \text{round}\left(\frac{\Gamma(32) - 32\Gamma(1)}{2\pi}\right)$$

The fine timing estimation is:

$$f_2 = \frac{1}{2\pi Tc} \frac{\Gamma(32) - k2\pi}{32}$$

Figure 55:
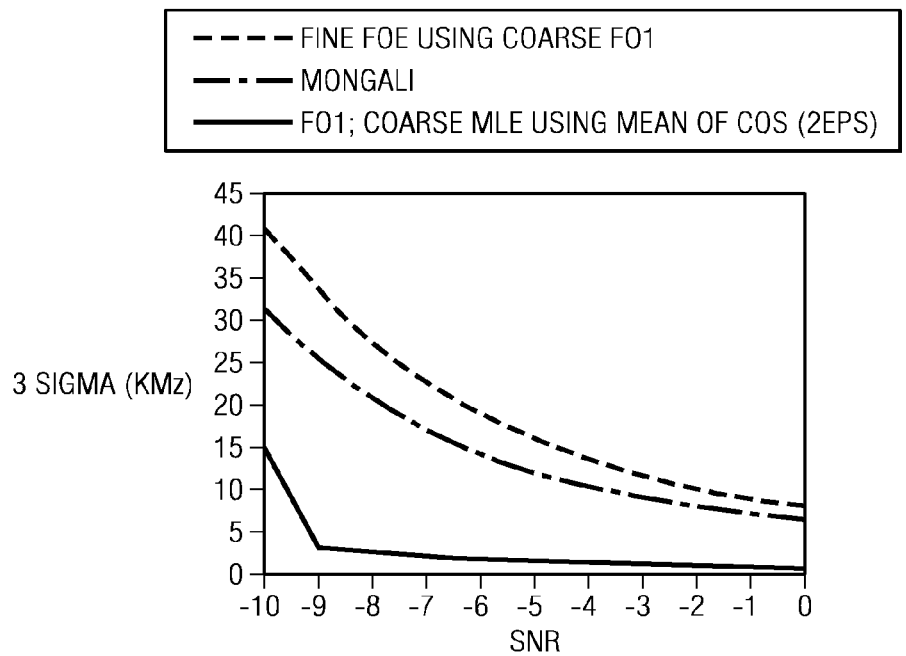
FIG. 55 illustrates a plot of the FOE maximum deviation.

FIG. 55 illustrates the maximum deviation of the discussed FOEs. A(1) . . . A(4) are used to compute the coarse FOE, where the actual FO is 200 KHz.

Reduced Complexity Adaptive Coherent Demodulator

Figure 56:
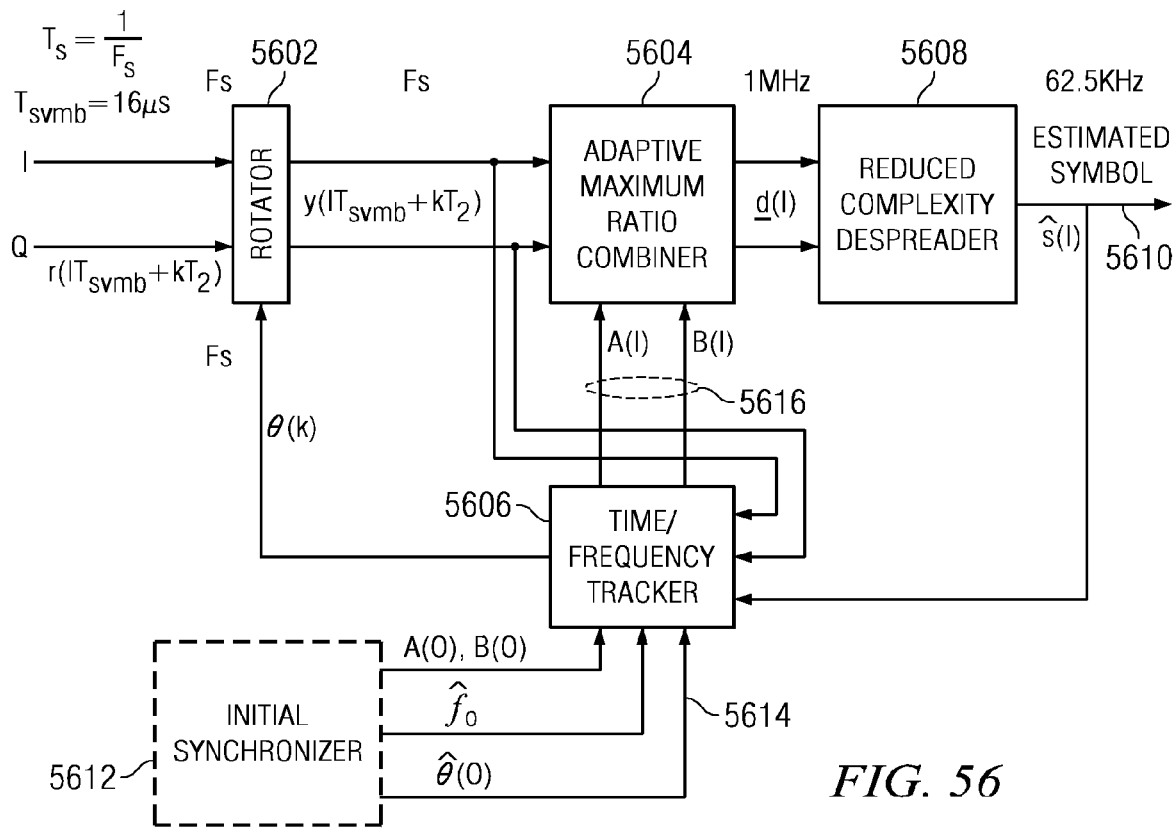
FIG. 56 illustrates a block diagram of the symbol synchronization.
Figure 57:
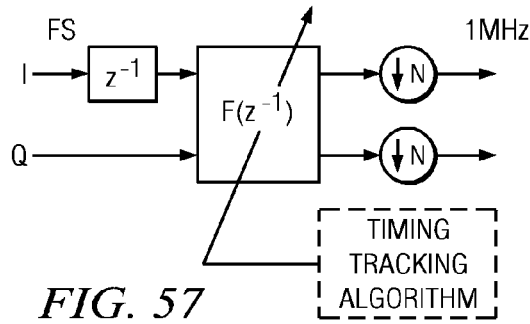
FIGS. 57 and 58 illustrates a diagrammatic view of one algorithm utilized in the adaptive maximum ratio combiner.
Figure 58:
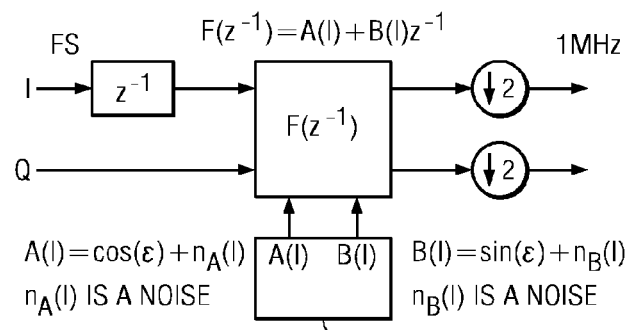

Referring now to FIG. 56, there is illustrated a diagrammatic view of the demodulator utilized in the present application. The sampled information on the I- and Q-channels is input into a rotator block 5602, the output thereof input to an adaptive maximum ratio combiner block 5604 and also to the input of a time/frequency tracker block 5606. The output of the adaptive maximum ratio combiner 5604 is input to a reduced complexity despreader block 5608, the output thereof providing the estimated symbol at a symbol rate of 62.5 KHz on a line 5610. The timer frequency tracker 5606 is also operable to receive from an initial synchronizing block 5612 information as an estimation of the angle and also an estimation of the frequency offset on a line 5614. A feedback is provided from line 5610, the output of a block 5608, for providing another input to the block 5606. The timer frequency tracker is operable to generate the sine and cosine of the timing offset on lines 5616 for input to the adaptive maximum ratio combiner block 5604.

The main advantages of the demodulator are:

High performance; it is the equivalent of a multi-chip despreader but with only one dispreading per chip;
Robustness: against time/frequency synchronization parameters; and against ISI; and
Reduced complexity therefore reduced current consumption: only one dispreading per chip, reduced complexity dispreading and therefore low sampling frequency –2 MHz Signal Model This model considers a MSK emitted signal (O-QPSK+sin pulse shape x(t):

$y(t)=x(t)e^{j\theta(t)+n(t)}$ $\theta(t)=2\pi f_0 t + \phi(t)$ where: f0 is the frequency offset
$\Phi(t)$ is a phase noise
$\theta_0$ is an initial phase
n(t) is a white Gaussian noise The chips modulated by x(t) are ak and bk respectively on I and Q components:

$$x(t) = \sum_k a(k)f(t-2nTc) + j\sum_k b(k)f(t-2nTc-Tc)a(k)$$

and $b(k) \in \{-1+1\}$ with $$\begin{cases} f(t) = \sin\left(\frac{\pi t}{2Tc}\right), & 0 \le t < 2Tc \\ f(t) = 0, & \text{elsewhere} \end{cases}$$

The signal is sampled at Fs. For the sake of simplicity Fs is considered equal to the minimal frequency, i.e., 2 MHz (the chip frequency). However, it should be understood that the algorithms presented here can be extended for higher sampling frequencies.

The sampling phase $\Delta T$ is unknown.

$y(kTc+\Delta T)=x(kTc+\Delta T)e^{j2\pi f_0 kTc+j\phi(kTc+\Delta T)+j2\pi f_0 \Delta T}+n(kTc+\Delta T)$ The pulse shape is a half sine and so it can be shown that:

$$x(2kTc + \Delta T) = a_{2k}\cos(\varepsilon) + jb_{2k+1}\sin(\varepsilon)$$

$$x((2k+1)Tc + \Delta T) = a_{2k+2}\sin(\varepsilon) + jb_{2k+1}\cos(\varepsilon)$$

$$\varepsilon = \frac{\Delta T}{Tc}\frac{\pi}{2} \text{ where: Chips on } 1: a_{2k} = +/-1 \; a_{2k}+1 = 0$$

$$\text{Chips on } Q: b_{2k} = 0 \; b_{2k}+1 = +/-1$$

This model considers that an initial synchronization had been performed on the preamble. So there exists a first estimation of the following parameters:
  The frequency offset wherein: the estimator is termed $\hat{f}_0$;
  the initial phase: $\hat{\phi}(0)$;
  the module of the received sample A(0) and B(0) equal to the cos and sin of the timing offset; and
  since the sequence acquisition had been performed this means the first sample of the spreading sequence is known.

FIG. 53 illustrates the signal x(t) and the timing offset definition.

Adaptive Maximum Ratio Combiner

The adaptive combiner 5604 performs filtering on the I and Q components and a down-sampling from Fs to 1 MHz. The minimal value for Fs is 2 MHz. The filter coefficients F(z) are computed by the time tracking algorithm in block 5702. The timing tracking algorithm provides an estimation of the cos and sin of the timing offset: A(l) and B(l) as:
  $A(l)=\cos(\varepsilon)+n_A(l)$
  $N_A(l)$ is a noise
  $B(l)=\sin(\varepsilon)+n_B(l)$
  $N_B(l)$ is a noise Time/Frequency Tracking: Assumptions Consider the spreading sequences fulfilling the following properties:
  The I and Q sequences are orthogonal
  The 802.15.4 spreading sequences fill this property $$\sum_{K=0}^{K-1} a_{2k}b_{2k+1} = 0$$

where: In the 802.15.4 standard K=16

The phase variation after the phase rotation is small during one spreading sequence (i.e. 16 μs). For a phase variation that results primarily due to frequency offset, the assumption is equivalent to an estimation error on the frequency offset less than 6 KHz.

The tracking algorithm uses the decided symbol to estimate the phase variation during gone symbol. A dispreading is performed of the complex signal with the spreading sequence decided by the despreader. Call $a_k$, 1 and $b_k$,1 the chips corresponding to the decided symbol 1 and make the assumption that the decision is correct. Therefore:

$$S_I(l) = \sum_{k=0}^{K-1} y_1(2k + \Delta T)a_{2k,l} = \cos(\varepsilon)e^{j\Delta\theta(l)} + n_I(l)$$

$$S_Q(l) = \sum_{k=0}^{K-1} y_1(2k + \Delta T)b_{2k+1,l} = j\sin(\varepsilon)e^{j\Delta\theta(l)} + n_Q(l)$$

where: $n_I(l)$, $n_Q(l)$ is noise
2K is the number of chip per symbol: 32 in 802.15.4

Note: if $\varepsilon<0$, the equivalent set of equation holds $$S_I(l)=-j\sin(\varepsilon)e^{j\Delta\theta(l)}+n_1(l)$$

$$S_Q(l)=\cos(\varepsilon)e^{j\Delta\theta(l)}+n_Q(l)$$

In practice, the outputs of the reduced complexity despreader are partially re-used to compute $S_1(l)$ and $S_Q(l)$.

The modulo of the I/Q component of the received signal is estimated. $\gamma_A$ and $\gamma_B$ are learning factors. This results in:

$$A(l)=(1-\gamma_A)A(l-1)+\gamma_A|S_I(l)|$$

$$B(l)=(1-\gamma_B)B(l-1)+\gamma_B|S_Q(l)|$$

Then the phase variation is estimated during one symbol to provide:

$$\Delta\hat{\theta}(l)=\text{angle}[S_I(l)A(l)-jS_Q(l)B(l)]$$

The performance of this estimator is independent of $\varepsilon$ providing:

$$S_I(l)A(l)-jS_Q(l)B(l)=Ke^{j\Delta\theta(l)}+n(l)$$

where: n(l) is a noise

The rotator bloc 5602 performs a phase rotation it can be implemented in HW or SW by a Cordic algorithm or a look up table type algorithm.

Reduced Complexity Despreader

Perfect frequency synchronization and no inter symbol interference are assumed then the received signal can be written as follows:

$$\underline{d}(l)=\underline{s}(i)+\underline{b}(l)$$

with the vectors notations
  $s(i)=[s_i(0) \ldots s_i(31)]$ is one of the 16 spreading sequences, $I=\overline{0} \ldots 15$
  $s_i(k)=\pm 1$
  and
  $b(l)$ is a $N(0,\sigma^2)$ white gaussian noise independent from the emitted symbols Optimal Despreader The optimal despreader has to:
  1) compute 16 32-chips-length correlations; and
  2) pick up the max value of this 16 correlations to retrieve the most probably emitted symbol i.e. 4 bits In one implementation, the Received (I,Q) signal is stored in a 32 Tc cyclic buffer. The correlation with S(1) is then computed and the signal is cyclically shifted to compute the correlations with $S(2) \ldots S(16)$. Only 8 correlations (and not 16) are computed. Dk and Ek as follows:

$$F_k = \sum_{n=0}^{31} S_k(n)d(n)$$

$$D_k = \sum_{n=0}^{15} S_k(2n)d(2n)$$

$$E_k = \sum_{n=0}^{15} S_k(2n+1)d(2n+1)$$

$$F_k = D_k + E_k$$

In this implementation of the despreader, the cyclic and conjugation properties of the spreading sequences imply as follows:

$$D_{k+8}=D_k$$

$$E_{k+8}=-E_k$$

$$\Rightarrow F_{k+8}=D_k-E_k$$

Therefore, to compute the 16 Fk we just compute 8 (Dk, Ek), k=1 ... 8. Moreover, to find the maximum, only 8 comparisons are performed. In fact Fk and Fk+8 can be compared without extra computation as follows:

$$F_k > F_{k+8} \Leftrightarrow D_k + E_k > D_k - E_k \Leftrightarrow E_k > 0$$

and $$\text{Max}(F_k, F_{k+8}) = D + |E_k|$$

Figure 59:
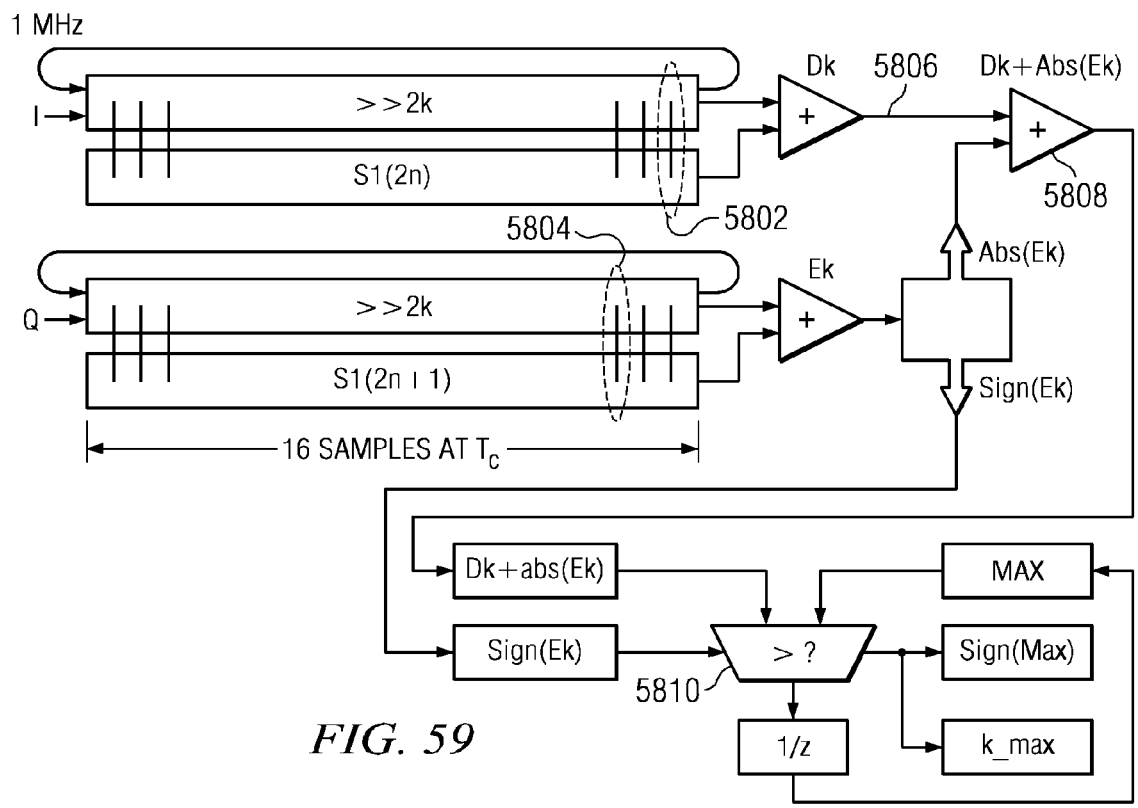
FIG. 59 illustrates a hardware accelerator for representing the reduced complexity despreader.

Referring now to FIG. 59, there is illustrated a block diagram for the reduced complexity detector engine. The first cyclic engine, an engine 5802 is operable to compute the value of $D_k$ and the second engine 5804 is operable to cyclically calculate $E_k$. The output of the first engine is provided on a line 5806 and is summed with a summer 5808 and the sum accumulated in a block 5810. This is utilized to determine the maximum of $F_k$ and $F_{k+8}$. The following will now apply:

$$S_{ML} = Sk\_\text{max, if Sign(Max)} = +1$$

$$S_{ML} = Sk\_\text{max+8, if Sign(Max)} = -1$$

To demodulate 1 symbol, i.e. 4 bits, the engine is run 8 times. The averaged Max value can be used as a link quality indicator.

Power Management

Figure 60:
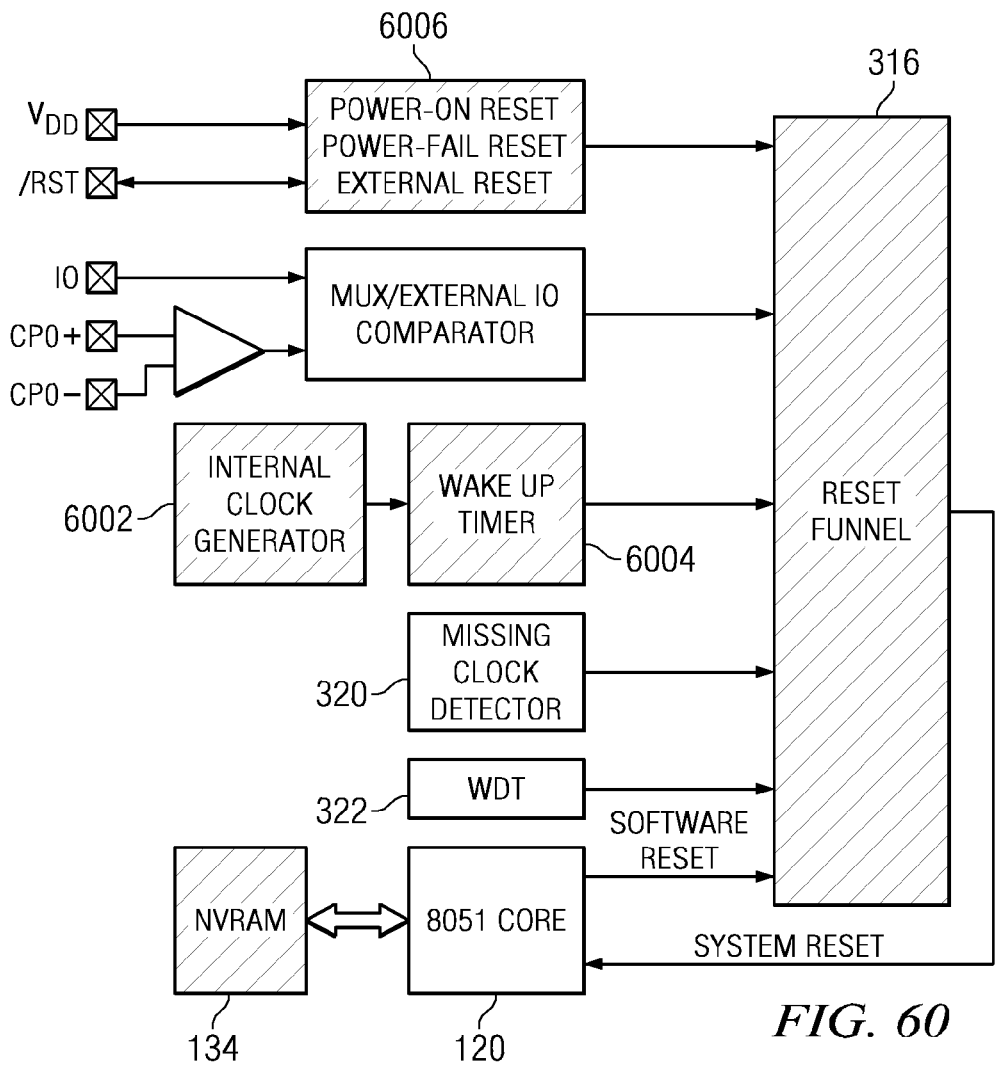
FIG. 60 illustrates a block diagram of the always powered-on blocks.

Referring now to FIG. 60, there is illustrated a block diagram similar to FIG. 3 illustrating the permanently powered on block. During sleep mode, the NV RAM 134 is continually powered, as well as the portion of the system required for waking a part up. This would include an internal clock generator 6002 and a wake up timer 6004, these being part of the block 328 in FIG. 3. In addition, a block 6006 represents the power-on reset block 314 in addition to other reset sources. When a system reset occurs, a number of events happen. The first is to power the system up and then assert a reset to the CPU 120. The CPU 120 will then access its first instruction and select as the clock, the boot oscillator.

Figure 61:
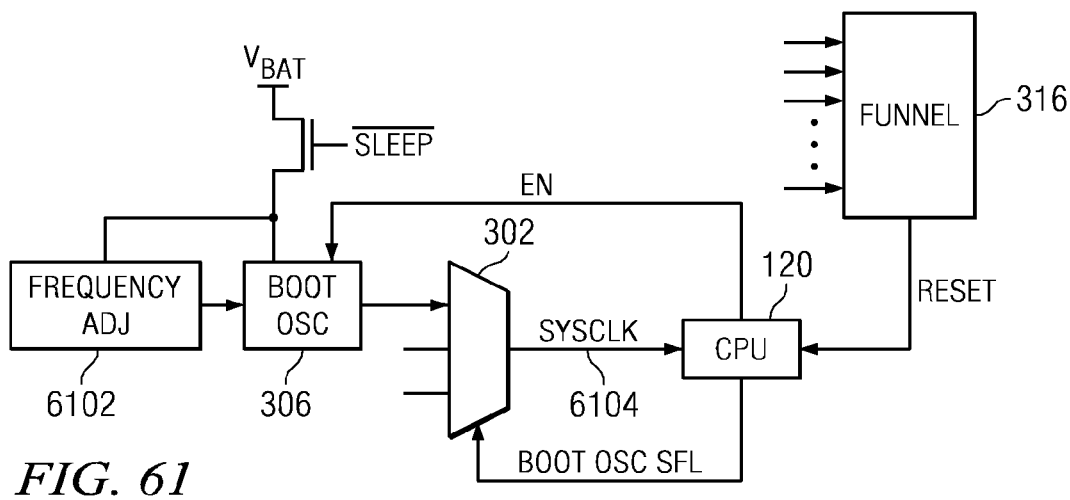
FIG. 61 illustrates a block diagram of the reset operation associated with the use of the boot oscillator.
Figure 62:
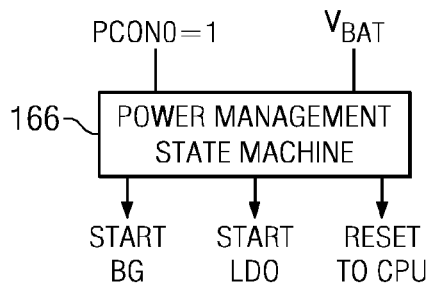
FIG. 62 illustrates a block diagram of the power state machine.
Figure 63:
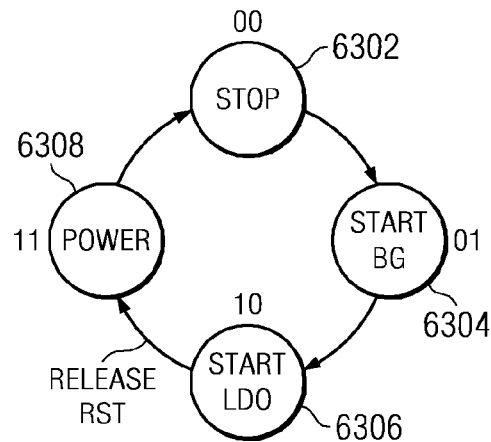
FIG. 63 illustrates a state diagram for the power management operation.

Referring now to FIG. 61, there is illustrated a diagrammatic view of the boot oscillator operation. The boot oscillator 306 is powered off in the sleep mode but, when a reset occurs, $V_{BAT}$ is applied to the boot oscillator and also to a frequency adjust register 6102. The frequency adjust register contains a value that has been placed there by the MCU 120 for the purpose of adjusting the frequency of the boot oscillator 306. The CPU 120 will enable the boot oscillator and also will control the multiplexer 302 to operate on the boot oscillator as the system clock on a system clock input 6104. However, the funnel 316 operates in response to a state machine and the reset is not necessarily applied right away. This is controlled by the power management block 166, which is basically a state machine. This operates on $V_{BAT}$. The power management state machine operates in four basic states, as illustrated in FIG. 3. The first state is the sleep state, which is the "00" state, a state 6302. When the system receives a reset, it then flows to the second state, the "01" state to start the band gap generator, this being a state 6304. However, the reset to the CPU 120 is held low for this period of time. The reason for this is that it is necessary for the LDO to come up to power level, which takes a finite amount of time. Until the power level is at a sufficient level, the circuitry powered by the LDO will not operate properly. Once the LDO comes up to power, the reset is released to the CPU 120. Of course, the boot oscillator will control the operation of the CPU during this initial state. This is when the state diagram flows to the state "11" for the power up state, the state 6308. When the power down operation occurs, the state will flow from the "11" state to the "00" state when the register PCONO is written to a "1." This will cause the state machine to go into a power down mode. In general, the boot process allows the MCU 120 to boot itself by selecting the boot oscillator for a short period of time, executing the appropriate instructions and then switching to the 16 MHz clock, this being the crystal controlled clock.

Figure 64:
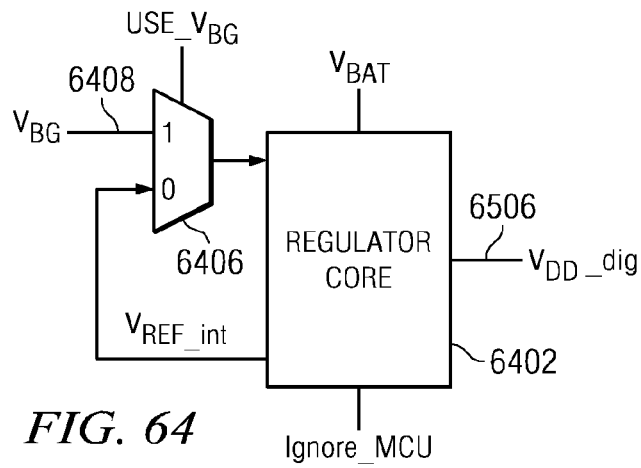
FIG. 64 illustrates a top level diagram of the LDO.

Referring now to FIG. 64, there is illustrated a block diagram of the LDO. This is the phase of the regulator that generates the digital voltage for use by the remaining circuitry such as the MCU. When the state is moved from the Stop state "00" to the state "01" to start the band gap generator, a regulator core 6402 is provided a reference voltage. This reference voltage during the initial start up is selected by a multiplexer 6406 internal to the LDO to select the output of the band gap generator on an input 6408. This multiplexer 6406 is controlled by an external signal USB_B$_{BG}$. During the same period of time, an external signal Ignore_MCU will be generated to prohibit any control being asserted by the MCU. This signal will be asserted until the power up mode "11" is present in the state diagram. After power up has been achieved for a certain period of time, the multiplexer 6406 is switched to an internal reference. The purpose for this is to allow an internal $V_{REF}$ calculation to be completed.

Figure 65:
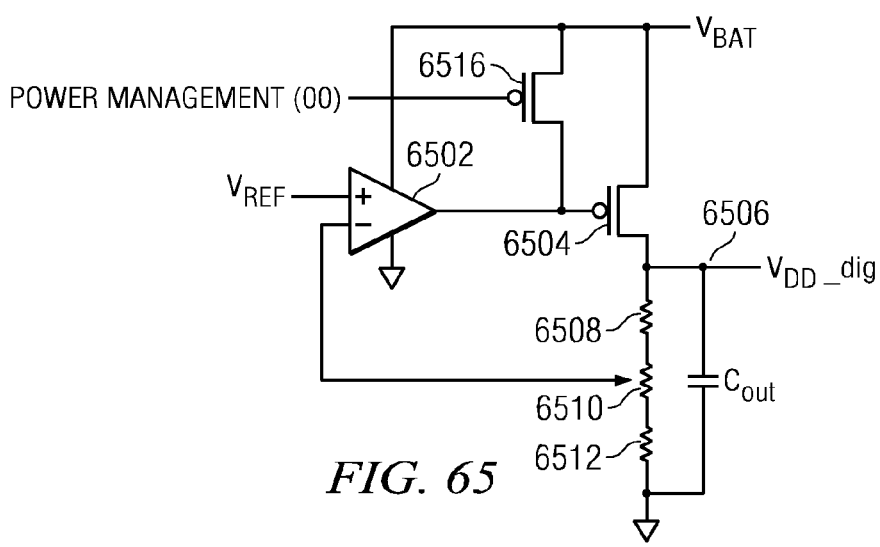
FIG. 65 illustrates a simplified diagram of the LDO.

Referring now to FIG. 65, there is illustrated a simplified diagram of the regulator core. An amplifier 6502 is provided for receiving the $V_{REF}$ signal from the multiplexer 6406 on the positive input thereof. The output drives the gate of the P-channel transistor 6504 having the source/drain path thereof connected between the $V_{BAT}$ terminal and the VDD_dig output on a node 6506. A node is provided between node 6506 and ground which is comprised of, in the illustration, three resistive loads 6508, 6510 and 6512 connected in series, with the resistor 6510 in the middle connected at some variable "wiper" to a negative input of the amplifier 6502 to provide a variable feedback voltage for calibration purposes. This is a calibration resistor. Thus, the output can be regulated with this value. During the "00" state, a P-channel transistor 6516 connected between $V_{BAT}$ and the output of amplifier 6502 will pull the gate of transistor 6504 high, disabling the output. When the state transfers from "00" to "01," this transistor 6516 will be turned off and the band gap will come up, as well as the multiplexer 6406 selecting the band gap voltage. This will start the LDO and allow it to come up to full value.

As described herein above, it is necessary to allow the chip to go to sleep to conserve power. However, the power management lock 166 contains a sleep oscillator/timer 168 therein which is operable to maintain a continuously running low frequency oscillator for the purpose of determining when to wake up. When operating in the beacon mode, for example, there may be as long as four minutes between the time that the chip is placed into the run mode and then back into the sleep mode. Therefore, it may be off for four minutes and only on for less than one microsecond. If the time base for the clock that determines when the chip turns back on, i.e., comes out of the sleep mode, is not sufficient accuracy, this means that the amount of time that the chip is turned on must increase. Therefore, the goal is to maintain this accuracy at approximately 100 ppm. If a crystal oscillator is utilized, the accuracy can be obtained. However, it is desirable not to utilize a crystal oscillator and still maintain the accuracy. This is facilitated by periodically turning on the 16 MHz crystal clock that is utilized for the DSP/MCU/RF clocks and use as an accurate time reference by which to calibrate. Once the clock has been calibrated, the power management system places the system in a power download. The low power oscillator is then allowed to operate for the purpose of providing clock signals to the various timers.

Figure 66:
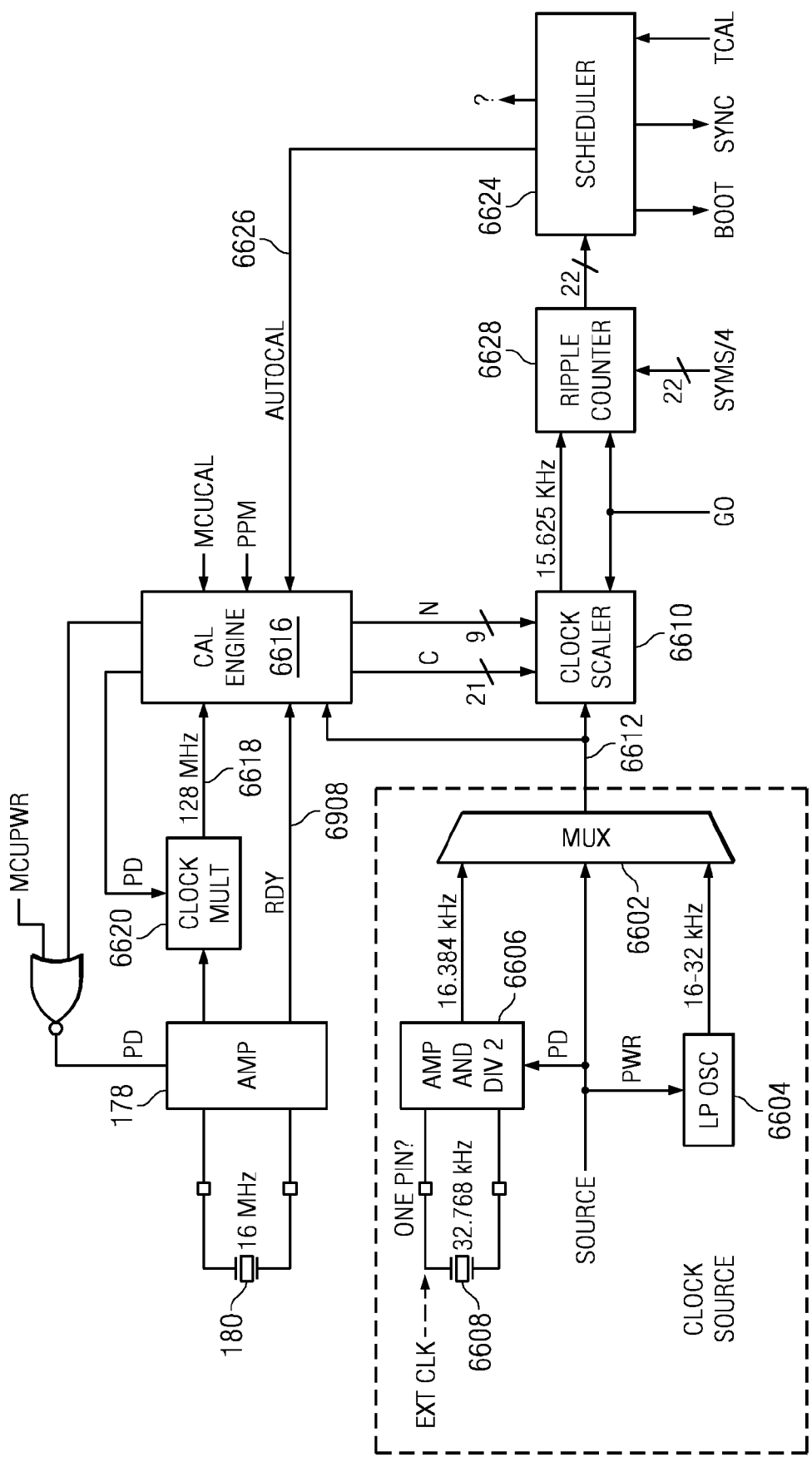
FIG. 66 depicts a block diagram of the low frequency oscillator and calibration engine.

Referring now to FIG. 66, there is illustrated a block diagram for the clock/calibration system to provide the low frequency clock. A multiplexer 6602 is provided that is operable to select between one of two sources, a free running oscillator 6604 or a crystal based oscillator 6606. The crystal based oscillator 6606 is interfaced with an external crystal 6608 and it basically provides an amplifier and a divide-by-2 function, as the crystal operates at a frequency of 32.768 kHz. This will provide a frequency of 16.384 kHz on the output thereof for input to the multiplexer 6602. The free running oscillator 6604 has a frequency that can deviate between 16 KHz to 32 KHz. This is a function of manufacturing tolerances and temperature variations associated with components from which the oscillator 6604 is manufactured. The desire is to provide a very inexpensive oscillator that operates on very low power.

The output of the multiplexer 6602 is provided on an output 6612 and is input to a clock scaler 6610. The clock scaler 6610 is operable to receive two input control signals, a C control signal that represents a number of counts of a high frequency clock that occur within a certain number of counts of the low frequency clock represented by the control input N of the clock output on the multiplexer 6602 on the line 6612.

The high frequency oscillator 178 is illustrated with the crystal 180 interfaced thereto. This operates at a frequency of 16 MHz. This is a non-permanently powered block such that it is powered down when in the sleep mode. The power can be applied as a result of the Reset wherein the MCU 120 causes the crystal oscillator 178 to be powered up or it can be a signal received from a calibration engine 6616, which is part of the low frequency oscillator calibration system. The calibration engine 6616 is a state machine that is a permanently powered block and, based upon a timer internal thereto, it will periodically turn on to calibrate the frequency of the low frequency oscillator—the sleep oscillator. The calibration engine 6616 receives a clock input on a line 6618 from a clock multiplier 6620 which is operable to multiply the output of the oscillator 178 to a frequency of 128 MHz. This is a non-permanently powered block that must be powered up by the calibration engine 6616. The frequency 128 MHz is related to the output of the clock scaler 6610. The chosen clock rate is 15.625 KHz for the low frequency oscillator, this being lower than the 16 KHz frequency of the free running oscillator 6604. The ratio of the 128 MHz clock to the output of the clock scaler 6610 is equal to 213. When the calibration is initiated by an AUTOCAL operation received from a scheduler 6624 on a line 6626, the calibration operation is initiated. As will be described herein below, the output clock frequency at 15.625 KHz is proportional to the output of the multiplexer 6612 by a factor of C\N. If, during the time the calibration operation is off, i.e., when the rest of the chip is powered down including the oscillator 178, the value of C and the value of N are latched. If the oscillator drifts during this time due to temperature variations, this ratio will no longer be valid and must be altered. This is the purpose of the calibration engine 6616.

The output of the clock scaler 6610, in addition to providing the low frequency clock, is also input into a ripple counter 6628 which interfaces with the scheduler 6624 to provide a number of scheduled output signals, as will be described herein below.

Figure 67:
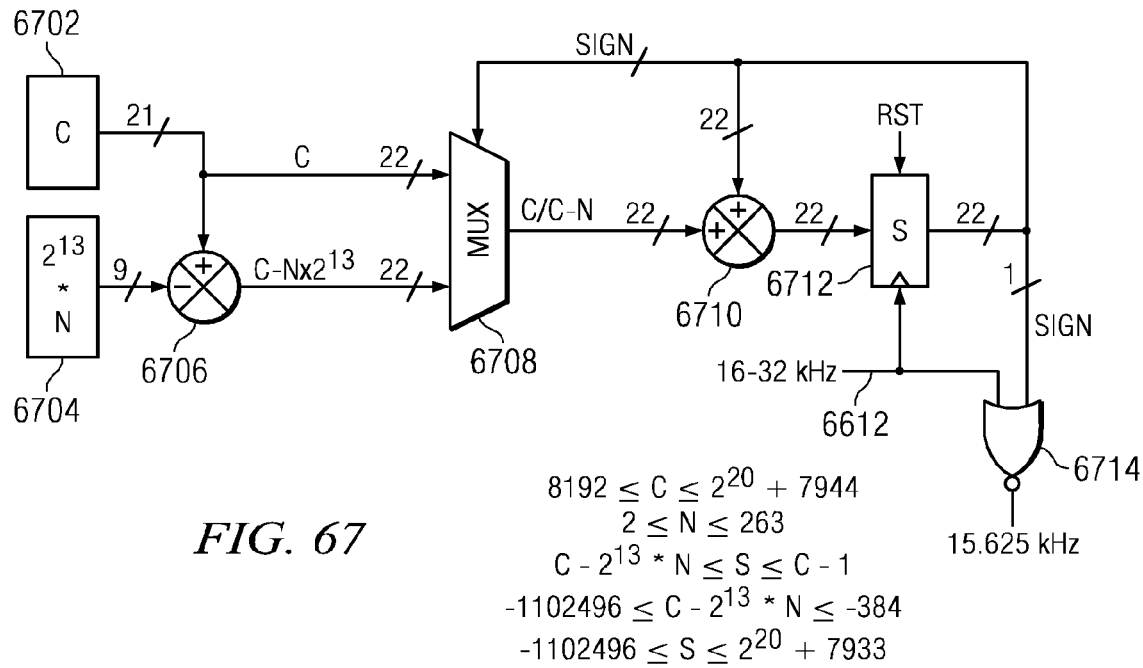
FIG. 67 illustrates a block diagram of the clock scaler.

Referring now to FIG. 67, there is illustrated a block diagram for the scaler 6610. In operation, when AUTOCAL is initiated, the clock cycles of the 128 MHz clock on line 6618 will be counted (count C) for a predetermined number (count N) of the low frequency oscillator on line 6612. This will be provided in a constantly updated register 6702. The value of N is multiplied by a factor of $2^{13}$ in a block 6704. This provides a 9-bit output value to the negative input of a subtraction circuit 6706 wherein the positive input thereof is received from the block 6702. Therefore, the output of block 6706 provides a 22-bit output that is equal to $C-N*2^{13}$, and this is input to one input of a multiplexer 6708. The other input of the multiplexer is connected to the output of block 6702. Therefore, the output of the multiplexer will be equal to C or $C-N*2^{13}$. The output of the multiplexer 6708 is input to one input of a summing circuit 6710, the output thereof input to a reset latch 6712. The output of the latch is input back to the other input of the summer 6710. In addition, the sine of the output from latch 6712 is input to the selection input of the multiplexer and it is also input to one input of a NOR gate 6714. The other input of the NOR gate 6714 is connected to the output of the multiplexer 6602 on the line 6612 to provide the free running low frequency oscillator 6604 which oscillates over a frequency of 16 KHz to 32 KHz.

In the AUTOCAL operation, as will be described herein below, before the calibration is initiated, at least two counts of the 128 MHz clock are taken, as such that the minimum value of C will be 8192 and the minimum value of N will be 2. The count will continue upwards to a value of 120+7944 and the value of N will be limited to 263. The value of $C-2^{13}*N$ will be the lower limit on the output value of the latch 6712 with maximum being C−1. Latch 6712 is clocked with the clock on line 6612.

In operation, the NOR gate 6714 operates on a pulse skipping method. Whenever the SIGN input represents a positive sign or value, this will cause a pulse to be skipped. This will also cause the output of the subtraction circuit 6706 to be selected. The value of $C-N*2^{13}$ is a negative number that is considerably less than the value of C. When the output of the subtraction circuit 6708 is selected, the SIGN output will be low causing the NOR gate to pass the pulses from line 6612. When the accumulated value in latch 6712 accumulates to a value to "flip" the sign causing the NOR gate 6714 to block pulses from line 6612, i.e., ship pulses, and this will cause the value of C on the output of register 6702 to be selected, added to the value in the latch until the SIGN again changes the value once again to allow the pulses through NOR gate 6714. This count operation will continue to occur until the value of N has reached a maximum value, this being a predetermined value. At that time, the value of C will be latched and the value of N will be latched and the system will go into a power down mode. At this point, the output of NOR gate 6714 will be substantially equal to 15.625 KHz, this being the ratio of 128 MHz\15.625 KHz=$2^{13}$.

Figure 68:
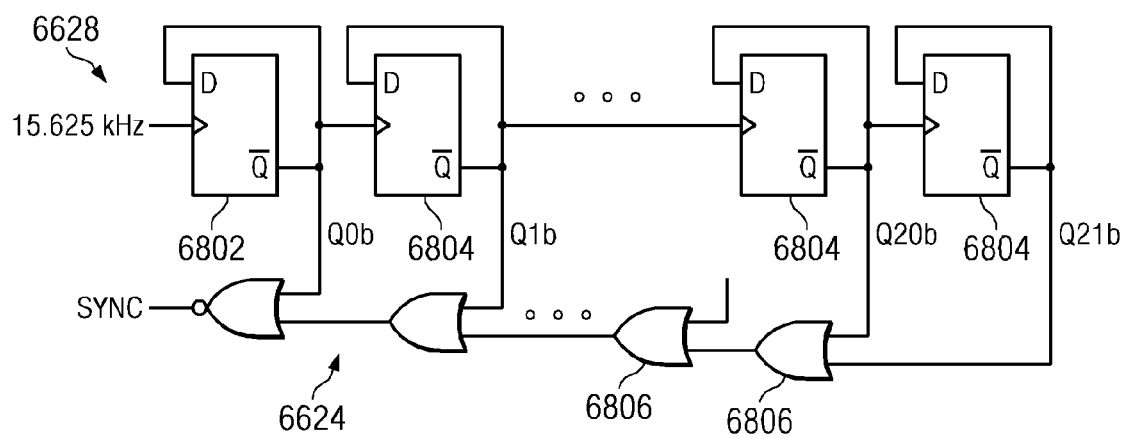
FIG. 68 illustrates a block diagram of the counter/scheduler.

Referring now to FIG. 68, there is illustrated a block diagram of the ripple counter 6628 and scheduler 6624 illustrating the generation of the SYNC signal, one of the scheduled tasks. The ripple counter is basically a plurality of D-type flip-flops 6802 connected in a daisy chain manner, with the 15.625 KHz clock signal on the output of scaler 6610 provided as an input to the clock input of the first of the of the D-type flip-flops 6802 in the chain. The D input of each of the flip-flops is connected to the associated Q-Bar output, and this output is input to the clock input of the next of D-type flip-flops 6804 in the chain. This provides basically a sequential divide-by-2 operation. The scheduler is basically a multi input OR gate that selects the outputs of one or all of the flip-flops 6804. In this depiction, there are provided a plurality of OR gates 6806 each having two inputs, one input connected to an Nth one of the D-type flip-flops 6804 and the other one threof connected to the N−1 flip-flop. The next OR gate 6806 closer to the input of the ripple counter will have one input connected to the output of the previous OR gate 6806 and the other input thereof connected to the output of the N−2 flip-flop 6804. This will continue up to the first flip-flop 6802. The configuration of the logic that selects the outputs of respective ones of the flip-flops 6802 can determine the time that different events will occur. The SYNC signal, for example, will occur when the output of all of the flip-flops 6802 go high. This is a hardware function.

Figure 69:
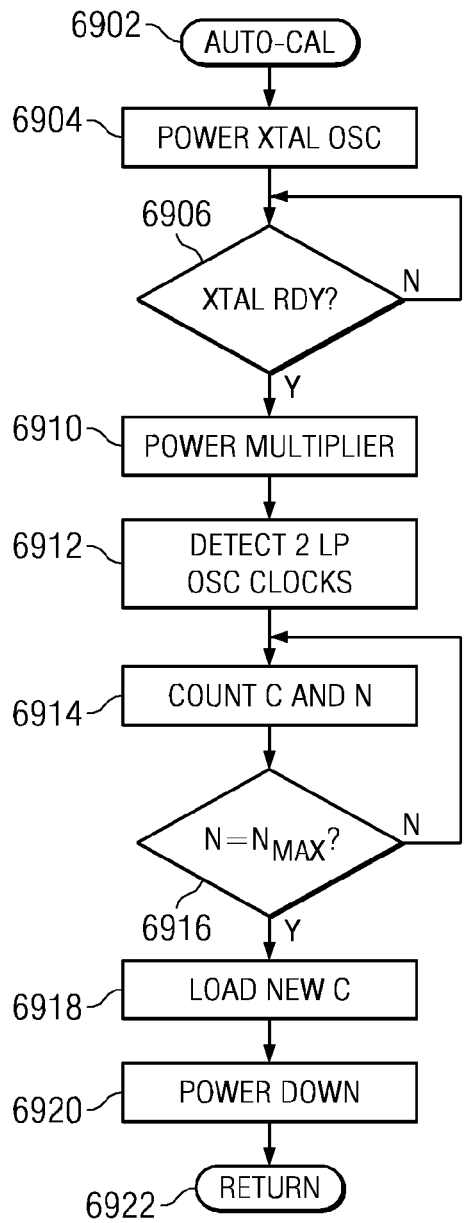
FIG. 69 illustrates a flow chart for the AUTOCAL operation.

Referring now to FIG. 69, there is illustrated a flow chart for the AUTOCAL program, which is initiated by the scheduler 6624. This is initiated at a block 6902 and then proceeds to a function block 6904 to power up the oscillator 178. The program then flows to a decision block 6906 to wait for a Ready (RDY) signal on a line 6908 indicating that the oscillator is completely powered up and in a substantially stable mode of operation. The program then flows to a function block 6910 to power up the multiplier 6620. At this time, the 128 MHz signal is provided on the input 6618. The program then flows to a function block 6912 to detect two low frequency clocks on the line 6612. Once two clocks have been detected, the value of C and the value of N are then output to the scaler 6610 for the count operation. This is indicated at a block 6914. This will continue until the value of N equals a predetermined value $N_{MAX}$, as indicated in a decision block 6916. Once this occurs, this indicates the end of the calibration cycle and the determined value of C is latched, as indicated in a function block 6918. The value of N, of course, is the value of $N_{MAX}$. The program then flows to a function block 6920 to power down the oscillator 178 and multiplier 6620 and then flows to a return block 6922.

Figure 70:
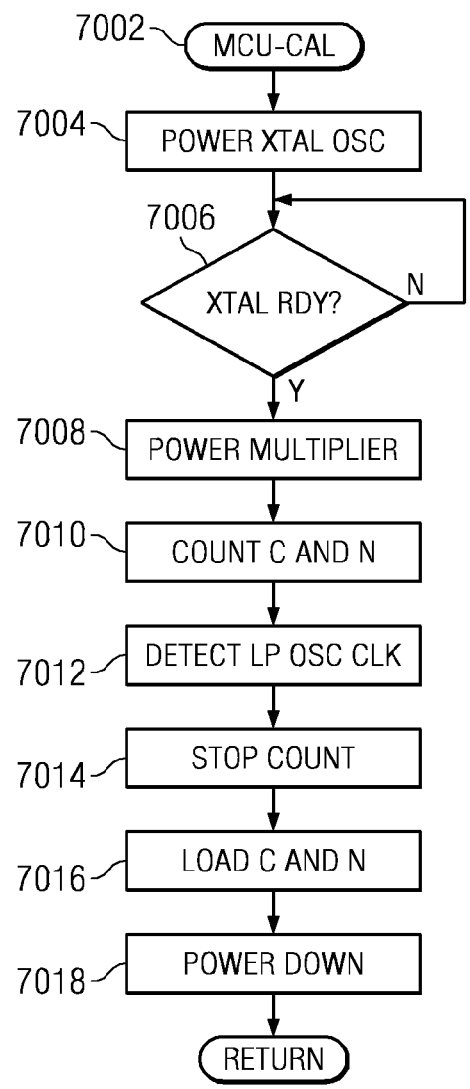
FIG. 70 illustrates a flow chart for the MCU CAL operation.

Referring now to FIG. 70, there is illustrated a flow chart for initiating the calibration operation from the MCU. This is initiated at a block 7002 and then proceeds to a function block 7004 to power up the crystal oscillator 178. As noted herein above, unless the radio is operating, the oscillator 178 is not necessarily powered up. In the power up operation, as described with respect to the AUTOCAL operation, a decision block 7006 determines if the crystal is ready and, when ready, the multiplier 6620 is powered up, as indicated by a block 7008 and then the values of C and N are counted in a block 7010. The output of the low frequency clock 6604 is then evaluated in a block 7012 until a predetermined estimation of the accuracy is made. Then the count will be stopped at a block 7014 and the values of C and N loaded, as indicated in a block 7016. The oscillator will then be powered down, as indicated by a block 7018. The MCU count will provide a value of N that is sufficient to provide the appropriate accuracy and this will be the value of $N_{MAX}$. This will be the value that is stored in the calibration engine 6616 for the AUTOCAL operation. Additionally, there is also determined a threshold C such that at least a certain number of counts must be made before the accuracy is within the appropriate ppm level. This ppm sets the threshold count $C_T$ and is an input to the calibration engine.

Appendix 1.0 Probability Density Functions of the Sliding Correlations

Figure 71:
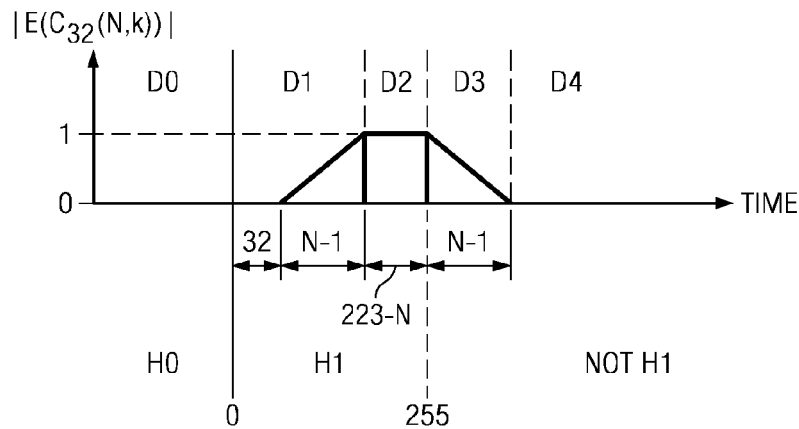
FIGS. 71-75 are associated with the Appendix.

In this paragraph we derive the p.d.f. of the sliding correlation defined by Equation 6-1 sampled at 2 MHz on I and Q, i.e. Msamples/s. These p.d.f. depends on the input signal y(k) and so is non-stationary. We call Di, i-0 . . . 4, the intervals within which we compute these p.d.f. FIG. 71 shows the definition of the Di.

Figure 72:
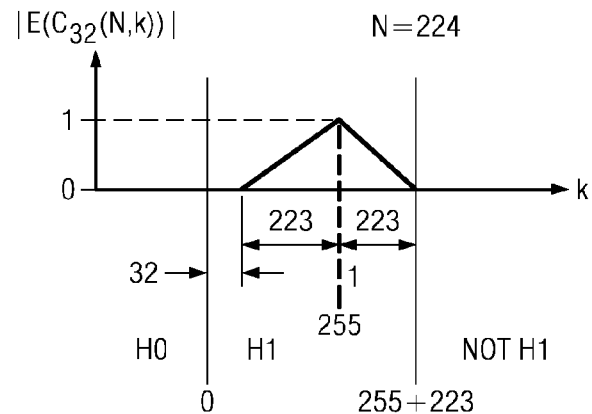

The variation of $|E(C_{32}(N,k))|$ is given by FIG. 71 and by FIG. 72 for N=224, where FIG. 72 illustrates a module of the detection variable in the noiseless case with a maximum length filter. Hypothesis Not H1 means that the input signal is not 32-periodical.

1.1.1 p.d.f Within D0

The $C_{32}(N,k)$ is the sum of N independent circular random variables with the same p.d.f. According to the central limit theorem when N is large enough (greater than 6 in practice) $C_{32}(N,k)$ is a circular white Gaussian random variable. The mean and variance of $C_{32}(N,k)$ are:

$$E[C_{32}(N, k)] = 0$$

$$E[|C_{32}(N, k)|^2] = \frac{\sigma^4}{N}$$

1.1.2 p.d.f. within D1

$C_{32}(N,k)$ is a sliding sum of N samples. So when a part of the summed samples fills H0 and other part fills H1 the detection variable $C_{32}(N,k)$ is in a transient mode. Let's suppose that H0 is filled for k<0 and H1 is filled for k>=0. To simplify the writing, we state that:

$$x(k)=0, k<0$$

1.1.2.1 First Part

For k = 0 ... 31, $$C_{32}(N, k) = \frac{1}{N}\sum_{n=0}^{k} b^*(k-n-32)x(k-n)e^{j2\pi f_0 T_c(k-n)} + \frac{1}{N}\sum_{n=0}^{N-1} b(k-n)b^*(k-n-32)$$

If N is big enough, this is a white circular Gaussian non stationary random variable:

$$\aleph\left(0, \frac{(k+1)\sigma^2}{N^2} + \frac{\sigma^4}{N}\right), \_k = 0 \ldots 31$$

1.1.2.2 Second Part

For k = 32 ... 32 + N − 1, $$C_{32}(N, k) = \frac{k-31}{N}e^{j2\pi f_0 T_c 32} + \frac{1}{N}\sum_{n=0}^{k-32} b(k-n)x^*(k-n-32)e^{-j2\pi f_0 T_c(k-n-32)} +$$

$$\frac{1}{N}\sum_{n=0}^{min(k,N-1)} b^*(k-n-32)x(k-n)e^{j2\pi f_0 T_c(k-n)} +$$

$$\frac{1}{N}\sum_{n=0}^{N-1} b(k-n)b^*(k-n-32)$$

If N is big enough this is a white circular Gaussian non stationary random variable:

$$\aleph\left(\frac{k-31}{N}e^{j2\pi f_0 T_c 32}, \frac{(k-31\sigma^2)}{N^2} + \frac{Min(k+1,N)\sigma^2}{N^2} + \frac{\sigma^4}{N}\right),$$

k = 32 ... 32 + N − 1 − 1

1.1.3 p.d.f. Within D2

The $C_{32}(N,k)$ is stationary, and this value is $$y(k) = x(k)e^{j2\eta f_0 T_c k} + b(k)$$

The detection variable is:

$$C_{32}(N, k) = \frac{1}{N}\sum_{n=0}^{N-1} y(k-n)y^*(k-n-32)$$

$$C_{32}(N, k) = e^{j2\eta f_0 T_c 32} + \frac{1}{N}\sum_{n=0}^{N-1} b(k-n)x^*(k-n-32)e^{-j2\eta f_0 T_c(k-n-32)} +$$

$$\frac{1}{N}\sum_{n=0}^{N-1} b^*(k-n-32)x(k-n)e^{j2\eta f_0 T_c(k-n)} + \frac{1}{N}\sum_{n=0}^{N-1} b(k-n)b^*(k-n-32)$$

Analyze of the terms:

1.

$$\frac{1}{N}\sum_{n=0}^{N-1} b(k-n)x^*(k-n-32)e^{-j2\eta f_0 T_c(k-n-32)}$$

is the average of N Gaussian $N(0,\sigma^2)$ so it is a Gaussian variable $$\aleph\left(0, \frac{\sigma^2}{N}\right)$$

2.

$$\frac{1}{N}\sum_{n=0}^{N-1} b^*(k-n-32)x(k-n)e^{j2\eta f_0 T_c(k-n)}$$

is the average of N Gaussian $N(\sigma^2,0)$ so it is a Gaussian Variable $$\aleph\left(\frac{\sigma^2}{N}, 0\right)$$

3.

$$\frac{1}{N}\sum_{n=0}^{N-1} b(k-n)b^*(k-n-32)$$

is the average of N independent centered identically distributed random variables so according to the central time limit theorem when N is large enough it is a Gaussian variable $$\aleph\left(\frac{\sigma^4}{N}, 0\right)$$

So the detection variable is the sum of three Gaussian independent circular random variables and it's a circular Gaussian random variable $$\aleph\left(\frac{\sigma^4}{N} + \frac{2\sigma^2}{N}, e^{j2\eta f_0 T_c 32}\right)$$

1.1.4 p.d.f. Within D3

At the end of the preamble the received signal is made of non periodical data and noise so the p.d.f. of the observation variable is slightly different. Let's suppose that the preamble length is 256 and that N is smaller than 224=256−32.

For $k = 255 \ldots 254 + N$, $$C_{32}(N, k) =$$

$$\frac{N-(k-255)}{N}e^{j2\eta f_0 T_c 32} + \frac{1}{N}\sum_{n=0}^{N} b(k-n)x^*(k-n-32)e^{-j2\eta f_0 T_c(k-n-32)} +$$

$$\frac{1}{N}\sum_{n=0}^{N} b^*(k-n-32)x(k-n)e^{j2\eta f_0 T_c(k-n)} + \frac{1}{N}\sum_{n=0}^{N-1} b(k-n)b^*(k-n-32)$$

If N is big enough this is a Gaussian non stationary random variable defined by the following parameters:

$$\aleph\left(\frac{N-k+255}{N}e^{j2\eta f_0 T_c 32}, \frac{2\sigma^2}{N} + \frac{\sigma^4}{N}\right), k = 255 \ldots 254 + N - 1$$

1.1.5 p.d.f. Within D4

Within D4 the received signal is made of random modulated data and noise.

For $k > 254 + N$, $$C_{32}(N, k) = \frac{1}{N}\sum_{n=0}^{N} b(k-n)x^*(k-n-32)e^{-j2\eta f_0 T_c(k-n-32)} +$$

$$\frac{1}{N}\sum_{n=0}^{N} b^*(k-n-32)x(k-n)e^{j2\eta f_0 T_c(k-n)} + \frac{1}{N}\sum_{n=0}^{N-1} b(k-n)b^*(k-n-32)$$

Applying the same result as in 1.1.3 for a non periodical signal x(.) the detection variable is sum of three Gaussian independent circular random variables and it's a circular Gaussian random variable $$\aleph\left(\frac{\sigma^4}{N} + \frac{2\sigma^2}{N}, 0\right).$$

1.1.6 Sum-Up

Table 2 sums up the evolution with the time of the mean and variance of the detection variable.

TABLE 2

Mean and variance evolution of the p.d.f. of C32(N,k)

| | $k < 0$<br>D0 | $k = 0, \ldots, 31$<br>D1 | $k = 32, \ldots, 31 + N$<br>D1 | $k = 32 + N, \ldots, 255$<br>D2 | $k = 256, \ldots, 255 + N$<br>D3 | $k > 255 + N$<br>D4 |
|---|---|---|---|---|---|---|
| $m(k) = E[C_{32}(N,k)]$ | 0 | 0 | $\frac{k-31}{N} e^{j2\pi f_0 T_c 32}$ | $e^{j2\pi f_0 T_c 32}$ | $\frac{N-k+255}{N} e^{j2\pi f_0 T_c 32}$ | 0 |
| $\Omega^2(k) = E\lfloor |C_{32}(N,k)|^2 \rfloor$ | $\frac{\sigma^4}{N}$ | $\frac{(k+1)\sigma^2}{N^2} + \frac{\sigma^4}{N}$ | $\frac{(k-31)\sigma^2}{N^2} + \frac{\text{Min}(k+1,N)\sigma^2}{N^2} + \frac{\sigma^4}{N}$ | $\frac{2\sigma^2}{N} + \frac{\sigma^4}{N}$ | $\frac{2\sigma^2}{N} + \frac{\sigma^4}{N}$ | $\frac{2\sigma^2}{N} + \frac{\sigma^4}{N}$ |

Note: if N > 224, D2 is an empty set and the Table 2 is unchanged.

1.2 Detection Strategies

There are two possibilities for the detection of a 32-periodical signal. The first one is to compare the module of the 32-order sliding correlation to a threshold. The second one is to compare the square of the module of the 32-order sliding correlation to a threshold. These two strategies lead to different false-alarm and detection probabilities.

Call $R_i(N,k)$ where: i=1, 2, the detection variables associates to the strategy i.

Strategy 1 (S1):
Signal is detected if $R_1(N,k) = |C_{32}(N,k)| \geq T_1$

Strategy 2 (S2):
Signal is detected if $R_2(N,k) = |C_{32}(N,k)|^2 \geq T_2$

1.2.1 Implementation

Strategy 1:

The computation of $|C_{32}(N,k)|$ can be done with a multiplier-free HW engine. Indeed $|C_{32}(N,k)|$ can be approximated by $M_{32}(N,k)$ defined as follows:

$$M_{32}(N,k) = a\text{MAX} + b\text{MIN}$$

$$\text{MAX}(N,k) = \text{Max}\{|Re(C_{32}(N,k))|, |Im(C_{32}(N,k))|\}$$

$$\text{MIN}(N,k) = \text{Min}\{|Re(C_{32}(N,k))|, |Im(C_{32}(N,k))|\}$$

The coefficients a and b are chosen in order to minimize the approximation error.
$J = E\lfloor ||C_{32}(N, k)| - M_{32}(N,k)|^2 \rfloor$. For example for Gaussian component a good choices of (a,b) is (1.0.301). An other efficient implementation is to use a CORDIC HW engine to compute $|C_{32}(N,k)|$.

Strategy 2:

The strategy 2 is well suited to an SW implementation. The computation of $|C_{32}(N,k)|^2 = Re(C_{32}(N,k))^2 + Im(C_{32}(N,k))^2$ can be done by a 1 multiplication and 1 MAC (Multiply and Accumulate) instruction usually available in the DSP processor.

1.3 False-Alarm and Detection Probability of the One-Shoot-Detection-Algorithm In this section the FAP and DP are derived for a one shoot algorithm. That means the FAP and DP are derived of the detection algorithm that tests at time k if the detection variable reaches the threshold. In practice $R_i(N,k)$ is tested as long as the demodulator is in Periodicity Detection mode.

1.3.1 False-Alarm Probability

The false-alarm probability (FAP) is the probability of detecting a 32-periodical signal whereas this signal is not present.

Call $p_1^0(N,k,r)$ the p.d.f and $F_1^0(N,k,r)$ the c.d.f of the random variable $R_1^0(N,k) = |C_{32}(N,k)|$ when the 32-periodical signal is not present.

In the same way, call $p_2^0(N, k, r)$ the p.d.f. and $F_2^0(N, k, r)$ of the c.d.f. of the random variable $R_2^0 (N, k) = |C_{32}(N, k)|^2$ when the 32-periodical signal is not present.

In both detection strategies S1 and S2, the FAP can be linked with the cumulative density function (c.d.f.) as:

$$FAP_i(N, k, T) = Pr\{R_i^0(N, k) \geq T / not(H_1)\}$$

$$FAP_i(N, k, T) =$$

$$\int_T^{+\infty} p_1^0(N, k, r) dr = 1 - \int_0^T p_1^0(N, k, r) dr = F_1^0(N, k, T), i = 1, 2$$

1.3.2 Detection Probability

The detection probability (DP) is the probability of detecting a 32-periodical signal when he is effectively present.

Call $p_1^1(N,k,r)$ the p.d.f. and $F_1^1(N,k,r)$ the c.d.f of the random variable $R_2 (N, k) = |C_{32}(N, k)|^2$ when the 32-periodical signal is present.

In both detection strategies S1 and S2 the DP can be linked with the cumulative density function (c.d.f.) as:

$$DP_i(N,k,T) = Pr\{R_i^1(N,k) \geq T/H_1\}$$

1.3.3 False Alarm Probability as a Function of the Detection Threshold

State that the $R_i(N,k)$ is in a steady state and that the 32-periodical signal is not present but a modulated signal plus noise is received. This is the case for $k > 254 + N - 1$.

Strategy 1:

The detection variable $|C_{32}(N,k)|$, is a Rayleigh r.v. with a c.d.f. defined by:

$$F_1(r) = 1 - e^{\frac{r^2}{\Omega^2}}, r \geq 0 \text{ with } \Omega^2 = \frac{2\sigma^2 + \sigma^4}{N}.$$

The $FAP_1$ is defined in the paragraph 11.3.1.

$$FAP_1(T) = e^{\frac{T^2}{\Omega^2}}, T \geq 0$$

Strategy 2:

The detection variable $|C_{32}(N,k)|^2$, is a centered Chi-square r.v. with a c.d.f defined by:

$$F_2(r) = 1 - e^{\frac{r^2}{\Omega^2}}, r \geq 0 \text{ with } \Omega^2 = \frac{2\sigma^2 + \sigma^4}{N}.$$

The FAP$_2$ is defined in the paragraph 11.3.1

$$FAP_2(T) = e^{\frac{T}{\Omega^2}}, T \geq 0$$

1.3.3 Detection Probability as a Function of the Detection Threshold

State that $C_{32}(N,k)$ is in steady state and that the received signal is made of an AWGN plus a 32-periodical signal. This is the case for 32+N−1<k<256.

Strategy 1:

$C_{32}(N,k)$ is a non-centered circular complex Gaussian random variable $\aleph(m_1+jm_2,\sigma^2)$ then $|C_{32}(N,k)|$ is a Rice random variable it c.d.f is:

$$F_1(r) = 1 - Q_1\left(\frac{\sqrt{2s}}{\sigma}, \frac{\sqrt{2r}}{\sigma}\right)$$
$$s^2 = m_1^2 + m_2^2$$

$Q_1(a,b)$ is the first order generalized Marcum's Q function defined by:

$$Q_1(a, b) = e^{-\frac{a^2+b^2}{2}} \sum_{k=0}^{\infty} \left(\frac{a}{b}\right)^k I_k(ab), b > a > 0. \quad \text{Equation 11-1}$$

The DP$_1$ is defined in the paragraph Detection probability 1.3.2, $$DP_2(T) = Q_1\left(\frac{\sqrt{2s}}{\Omega}, \frac{\sqrt{2T}}{\Omega}\right)$$
$$s = 1$$
$$\Omega^2 = \frac{2\sigma^2 + \sigma^4}{N}$$

Strategy 2:

$C_{32}(N,k)$ is a non-centered circular complex Gaussian random variable $\aleph(m_1+jm_2,\sigma^2$ then $|C_{32}(N,k)|^2$ is a non-central Chi-square random variable with 2 degrees of freedom its c.d.f. is:

$$F_2(r) = 1 - Q_1\left(\frac{\sqrt{2s}}{\sigma}, \frac{\sqrt{2r}}{\sigma}\right)$$
$$s^2 = m_1^2 + m_2^2$$

The DP$_2$ is defined in the paragraph Detection probability 1.3.2, $$DP_2(T) = Q_1\left(\frac{\sqrt{2s}}{\Omega}, \frac{\sqrt{2T}}{\Omega}\right)$$
$$s = 1$$
$$\Omega^2 = \frac{2\sigma^2 + \sigma^4}{N}$$

1.3.5 Variation of FAP and DP With Time

Figure 73:
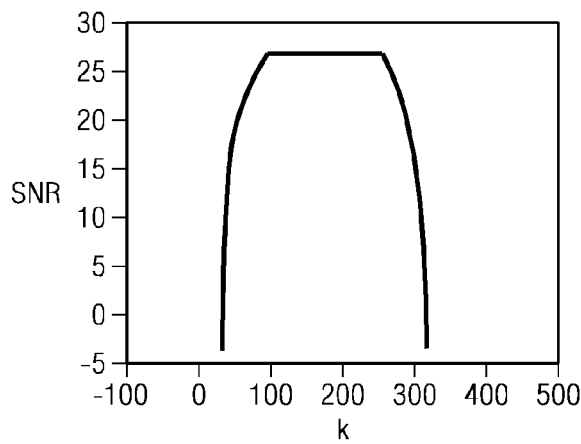
Figure 74:
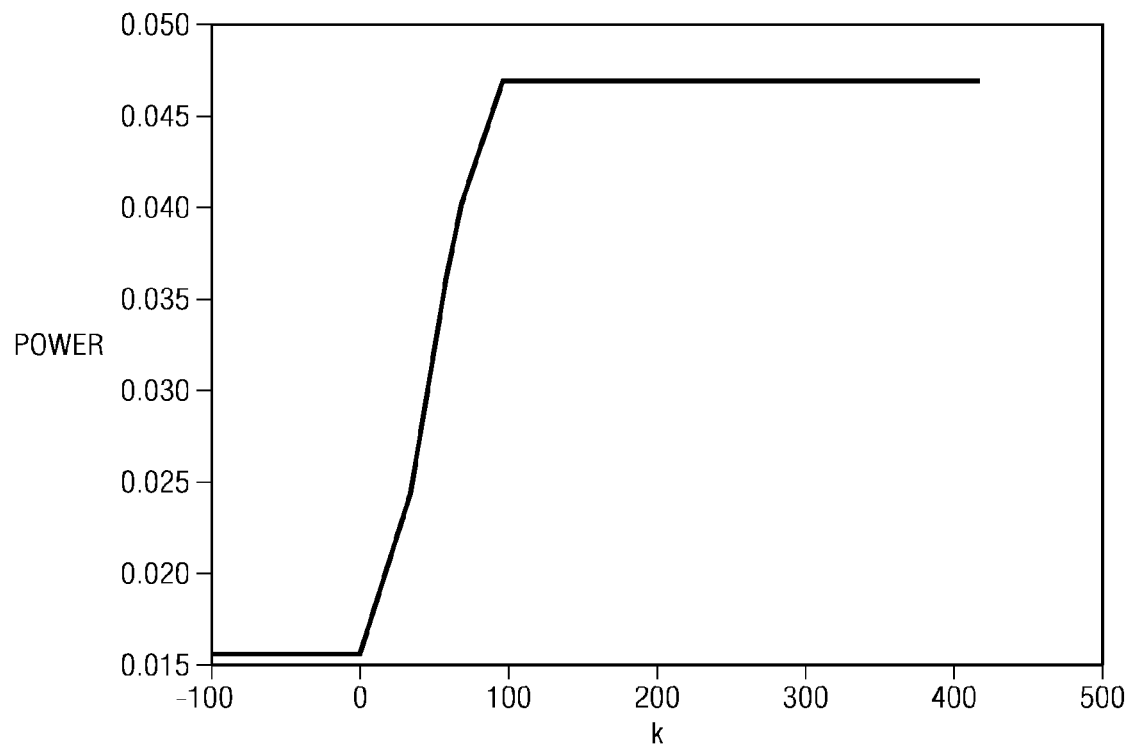
Figure 75:
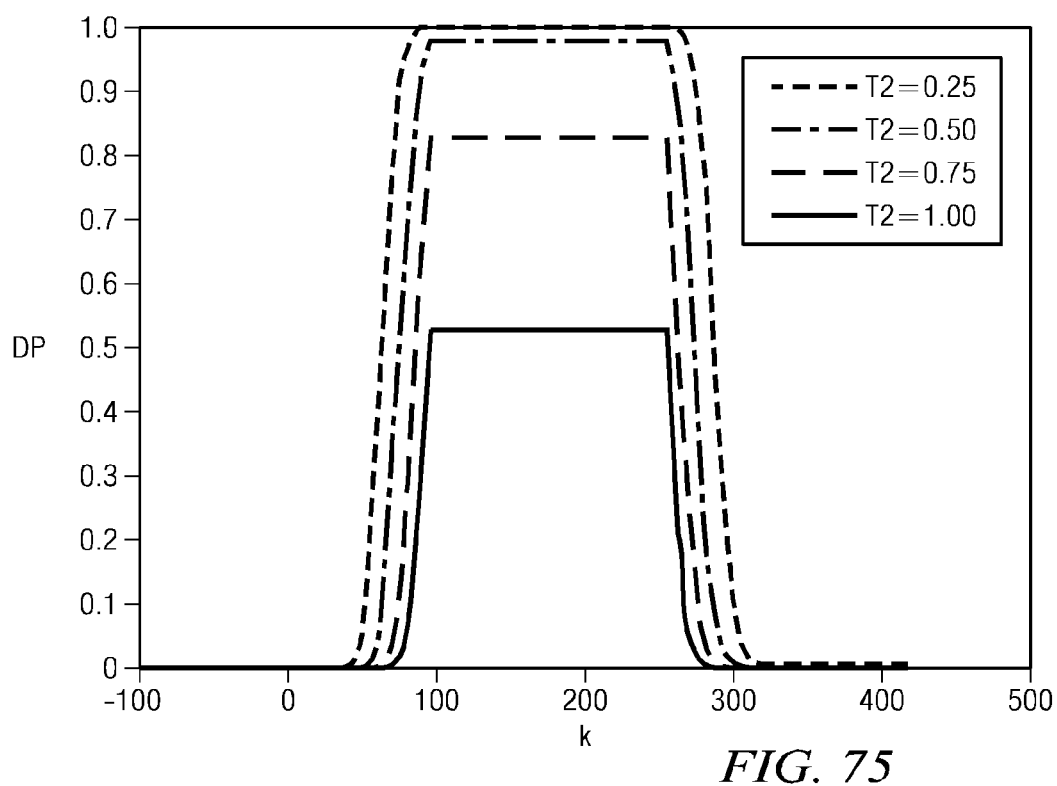

FIG. 73 shows the evolution in time of $R_1(N,k)$ in the noiseless case. FIG. 74 shows the evolution in time of the noise power. As the p.d.f. of $R_1(N,k),k=1,2$ vary with time, the FAP and DP vary with time. FIG. 75 shows the evolution of the SNR_Det of detection process defined as:

$$SNR\_Det = 20\log10\left(\frac{m}{\Omega}\right)$$

It is noted that SNR_Det shape is not symmetrical because only noise is present before the preamble whereas after a non-32-periodical signal is present.

It will be appreciated by those skilled in the art having the benefit of this disclosure that this single chip low power fully integrated 802.15.4 radio platform provides a single chip solution with an analog RF front end combined with a DSP to realize the PHY. The MAC is configured with an MCU. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A single chip radio platform for communicating with an RF channel operating at a channel frequency and using OQPSK data modulation employing a spreading sequence and containing radio platform layers associated with a physical layer (PHY), a media access layer (MAC), a network layer and an application layer, comprising:

an RF front end having a receive/transmit capability to receive in a receive mode an RF carrier modulated with digital data and convert the data to analog baseband data, and in a transmit mode, modulate an RF carrier with baseband data;

a digital signal processor (DSP) engine for interfacing with said RF front end to form in conjunction therewith the PHY layer, and interfacing with the MAC layer in the receive mode to demodulate the baseband data and in the transmit mode to generate the baseband data for modulation and transmission by said RF front end;

a microcontroller unit (MCU) performing the functionality of the MAC, network and application layers and interfacing with the DSP;

clock circuitry including a stable reference clock for generating a first fixed clock for the MCU for providing MCU clocks for the operation of the MCU, and for providing a reference for a local oscillator at substantially the channel frequency for use by said RF front end and a DSP clock for use by said DSP, which said local oscillator and DSP clocks are not fixed frequency, both said MCU clocks, said local oscillator and said DSP clock having the stability of said first fixed clock; and periodic power management circuitry for controlling the operation of the radio platform to operate in a sleep mode to power down said RF front end, said DSP and said MCU and in a run mode for powered operation thereof, and to control switching from the sleep mode to the run mode at specific times based on a continuously running internal clock so as to be able to receive an RF signal generated at periodic and defined times.

2. The radio platform of claim 1 wherein said DSP clock is divided down from said local oscillator.

3. The radio platform of claim 1 wherein said spreading sequence is a direct sequence spread spectrum (DSSS) service.

4. The radio platform of claim 1, wherein said RF front end is operable to receive modulated RF data and convert it to baseband and receive baseband data and modulate an RF carrier therewith.

5. The radio platform of claim 1, including power management circuitry for controlling the operation of transitioning from the sleep mode to the run mode in a sequence of steps.

6. The radio platform of claim 1, wherein said periodic management circuitry includes timer circuitry to define an accurate length of time between a first event and a second event, the event being the change of modes.

7. The radio platform of claim 1, wherein said periodic management circuitry has a low power oscillator associated therewith to provide a continuous time base that is free running.

8. The radio platform of claim 7, wherein said periodic management circuitry includes calibration circuitry to calibrate the frequency of the clock in response to the platform being in the sleep mode.

9. The radio platform of claim 8, wherein said periodic management circuitry is operable to wake up at least a portion of the RF front end, at least a portion of the DSP or at least a portion of the MCU to assist in the operation thereof.

10. The radio platform of claim 9, wherein the operation for which to assist is the calibration operation.

* * * * *